US012744875B2

(12) United States Patent
Chen

(10) Patent No.: US 12,744,875 B2
(45) Date of Patent: Sep. 22, 2026

(54) VIRTUAL IMAGING METHODS AND DISPLAYS FOR REAL WORLD SCENES

(71) Applicant: John Youngfu Chen, Hillsborough, CA (US)

(72) Inventor: John Youngfu Chen, Hillsborough, CA (US)

( * ) Notice: Subject to any disclaimer, the term of this patent is extended or adjusted under 35 U.S.C. 154(b) by 502 days.

(21) Appl. No.: 17/300,605

(22) Filed: Sep. 7, 2021

(65) Prior Publication Data

US 2025/0142044 A1 May 1, 2025

Related U.S. Application Data

(63) Continuation-in-part of application No. 16/602,573, filed on Nov. 1, 2019, now Pat. No. 11,151,911.

(51) Int. Cl.

*H04N 13/322* (2018.01)
*H04N 13/189* (2018.01)
*H04N 13/361* (2018.01)

(52) U.S. Cl.

CPC ......... *H04N 13/322* (2018.05); *H04N 13/189* (2018.05); *H04N 13/361* (2018.05)

(58) Field of Classification Search

CPC .. G02B 3/0068; G02B 5/0875; G06T 19/006; G06T 15/205

USPC ..................................... 472/61, 63; 396/1, 2

See application file for complete search history.

(56) References Cited

U.S. PATENT DOCUMENTS

| | | | |
|---|---|---|---|
| 8,837,926 | B2 | 9/2014 | Deering |
| 9,071,834 | B2 | 6/2015 | Yett |
| 2019/0272793 | A1 | 9/2019 | Huang |

*Primary Examiner* — Justin W Rider

(74) *Attorney, Agent, or Firm* — John Y. Chen

(57) ABSTRACT

A display of real world scenes comprising one or more optical mirror film surfaces having one or more selected deformations on said surfaces comprising one or a plurality of selected extended line indentation ordered deformations forming facets, including a selected plurality of selected disordered and ordered deformations forming a plurality of flat mirror facets, a plurality of folded mirror ridges, and a plurality of mirror vertices capable of capturing and transforming said scenes into other-worldly virtual images for recorded play back video image of said virtual images and other applications; including a method of imposing one or more selected ordered and disordered deformations on said mirror film surface irreversibly as a means of forming surfaces useful for the function of said virtual imaging display.

3 Claims, 167 Drawing Sheets
(166 of 167 Drawing Sheet(s) Filed in Color)

©2021 John Y. Chen

©2021 John Y. Chen

©2021 John Y. Chen

©2021 John Y. Chen

©2021 Jenn Y. Chen

©2021 John Y. Chen

©2021 John Y. Chen

©2021 John Y. Chen

©2021 John Y Chen

©2021 John Y. Chen

©2021 John Y. Chen

©2021 John Y. Chen

©2023 John Y. Chen

©2021 John Y. Chen

©2021 John Y. Chen

©2021 John Y. Chen

©2021 John Y. Chen

©2021 John Y. Chen

©2021 John Y. Chen

©2021 John Y. Chen

©2023 John Y. Chen

©2023 John Y. Chen

©2021 John Y. Chen

©2021 John Y. Chen

©2021 John Y. Chen

©2021 John Y. Chen

©2021 John Y. Chen

©2023 John Y Chen

©2021 John Y. Chen

©2021 John Y. Chen

©2021 John Y. Chen

©2021 John Y. Chen

©2021 John Y. Chen

©2023 John Y. Chen

©2021 John Y. Chen

©2023 John Y Chen

©2021 John Y. Chen

©2021 John Y. Chen

©2021 John Y. Chen

©2023 John Y. Chen

©2021 John Y. Chen

©2021 John Y. Chen

©2021 John Y. Chen

©2021 John Y. Chen

©2021 John Y. Chen

©2021 John Y. Chen

©2021 John Y. Chen

©2021 John Y. Chen

© 2023 John Y. Chen

©2021 John Y. Chen

©2023 John Y. Chen

©2023 John Y. Chen

©2021 John Y Chen

©2021 John Y. Chen

©2021 John Y. Chen

©2021 John Y. Chen

© 2021 John Y. Chen

©2021 John Y. Chen

©2021 John Y. Chen

©2021 John Y Chen

VIRTUAL IMAGING METHODS AND DISPLAYS FOR REAL WORLD SCENES

CROSS-REFERENCE TO RELATED APPLICATIONS

This application U.S. Ser. No. 17/300,605 having a filing date of Sep. 9, 2021 is a continuation-in-part of application: US Serial. No. U.S. Ser. No. 16/602,573, filed Nov. 1, 2019.

COPYRIGHT STATEMENT

A portion of the disclosure of this patent document contains material which is subject of copyright protection, the copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

STATEMENT REGARDING PRIOR PUBLIC DISCLOSURES BY THE INVENTOR

An acrylic print entitled: "Fractal Dimension and Visual Complexity No. 8671 (measuring 16 inch by 24 inch) of a derivative version comprising in-part the bottom lower right quadrant of FIG. 29 was exhibited at the 97 Anniversary Exhibition of the Pacific Art League (PAL) located at 668 Ramona Street, Palo Alto, Calif. 94301 from the 2$^{nd}$ to the 29$^{th}$ of November 2018 opened to the public and sold at the Opening Reception first Friday, Nov. 2, 2018 from 5:30 pm to 8:00 pm. Later, a watercolor print entitled: "Broken Symmetry Upon Broken Symmetries" (measuring 9.5 inch by 11 inch) of a derivative version of FIG. 22 was exhibited from Jun. 7 to 26, 2019 at the PAL. Afterward, the PAL transferred it to a faculty member of the Department of Art History at Stanford University. A different acrylic print entitled: "Fractal Dimension and Visual Complexity No. 9838 (measuring 16 inch by 24 inch) of a derivative version of FIG. 29 was exhibited at the Grifin Museum of Photography (GMP) located at 67 Shore Road, Winchester, Mass. 01890 from Nov. 29, 2018 to Jun. 13, 2019, which also was displayed at the passageway linking Macy's with the Hyatt Regency Hotel 2 Ave De Lafayette Boston, Mass. 02111 Lafayette City Center Passageway. The reception for the Griffin Museum's "Abstraction Attraction" Exhibition was held on May 5, 2019 from 4 pm to 6 pm. Afterwards, the inventor donated the acrylic print to the Griffin Museum.

On about 10/2/08/020 a United States Domestic California incorporated Nonprofit Corporation exhibited a video presentation with accompany piano music by way of Zoom Cloud Meeting teleconferencing for sharing and fund raising purposes (at about 4:30 pm Pacific Time) of approximately 32 images selected from the color Drawings of patent application U.S. Ser. No. 16/602,573 including selected color Drawing Figures of this Continuation-in-part application of U.S. Ser. No. 16/602,573.

BACKGROUND OF THE INVENTION

(1) Field of the Invention

The field of the present novel invention encompasses virtual imaging methods and displays for virtual reality imaging, virtual augmented reality of virtual and real objects imaging including methods of making said displays and production of original one of kind artistic real images from said virtual and augmented imaging of real world scenes.

(2) Related Invention

This specification is base upon subject matters described in earlier filed and copending (RELATE APPLICATION cited above), which entired copending application is specifically incorporated herein by reference.

BRIEF SUMMARY OF THE INVENTION

The present invention solves all the aforementioned Deering '926 patent imaging method disadvantages and inherent deficiencies that's out of focus, devoid of any fine details, and lacks artistic control and distinguishes over the disadvantages of Deering '926 wind generating imaging method by (1) utilizing novel means including selected tools to form irreversible deformations on the surface of optical mirror films for virtual imaging display use thereby (2) achieving novel images exhibiting great complexity with very fine details involving selectively (3) controlling visual elements forming textures, design patterns, indentions, shapes, folds, including creases for (4) forming ordered and disordered deformations on the surfaces of said mirror films capable of (5) achieving large to smaller than 1 millimeter size detailed complex visual elements appearing in novel virtual image displays of real-world scenes transformed into (6) otherworldly images comprising reflections useful in the realm of (7) virtual reality, (8) augmented reality, and (9) real-world artistic images including imaging and art production uses.

BRIEF DESCRIPTION OF THE DRAWING(S)

The file of this patent contains at least one drawing/photograph executed in color. Copies of this patent with color drawing(s)/photography(s) will be provided by the office upon request and payment of the necessary fee.

All the drawings figures described in the specification comprising FIG. 1 through FIG. 29, including FIG. 1 through FIG. 31, including FIG. 1 through FIG. 46, including FIG. 1 through FIG. 167 (i.e. drawing FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 28, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161,

162, 163, 164, 165, 166, and FIG. 167) are all photographs of disordered and ordered deformations imposed on mirror films and of other-worldly virtual image displays transformed real world scenes having attributes corresponding to their respective mirror deformation surface topology embodiments and methods of forming deformations of the claimed invention are described below.

Both FIG. 30 and FIG. 46 are photographs displaying representative materials, implements and tool means for imposing indentations, creases, folds and controlled ordered deformations on mirror film surfaces described below.

These photographs comprising Drawing FIGS. 1 through FIG. 167 of U.S. Ser. No. 17/300,605 are the only practicable medium for illustrating the novel process, methods, and use of the invention. FIGS. 1-46 of parent U.S. Ser. No. 16/602,573 and CIP Ser. No. 17/300,605 are identical.

DETAILED DESCRIPTION OF THE INVENTION

The present invention relates to virtual reality imaging, virtual augmented reality imaging, virtual imaging displays and methods of said displays, including recording, playback, transforming, and use of said virtual images created from said virtual imaging displays and methods for the production of higher ordered virtual imaging displays and creating special effects based on other-worldly said virtual images of transformed real-world scenes including selected photon illuminations effects.

The established canon that humans create art that isn't of Nature and Nature isn't art is overturned by the instant invention using selected deformation forming tools to control photon reflections transforming real-world scenes into other-worldly artistic virtual images corresponding to true reality (appearing in mirror displays) composed of bits and pieces of real-world scenes deconstructed by a plurality of myriad small individually orientating shaped reflective planes comprising ordered and disordered deformations on a continuous mirror film surface, which deformations function independently reflecting photons from different parts of the same real-world scene (of objects) and in many different directions recorded by a camera's optical-electronic detector including selected image recording means, viewed by an observer's eyes through said camera's lens system, and in said camera's screen projection means appearing in new positional relationships resulting in captured virtual images impossible for a human to imagine that's outside of his/her own objective visual experience looking at said real-world scene transformed into other-worldly virtual encompassing images having no corresponding physical existence representing visual physical nothingness, nevertheless mirror reflections of a real-world scene's reality no matter how the resulting virtual images appears mingled and deconstructed by said shaped reflective (deformation) mirror planes of said displays. It is well known errors of seeing distortions lie: ". . . in the brain and not the eyes . . . " (ref. page 83), "The Intelligent Eye," by R. L. Gregory @ 1970 Library of Congress Catalog Card No. 72-97117 24663 Pub. McGraw-Hill Book Company, which book is incorporated herein by reference.

Theory notwithstanding, a restatement in terms of quantum photons (created by a selected illumination source) being wave information reflected off of a real-world scene and in each of the myriad shaped reflective deformation planes comprising said display transforming same incident photons' wave properties' information of the real-world scene and reflected photons appearing captured by an imaging recording and storing means, preserving transformed virtual images (photons' wave properties' information) of the same real-world scene deconstructed and mingled as virtual images formed in the display and projected appearing before an observer's eyes, through a lens of said recording means, and on a screen of a selected quantum photon wave property recording means for processing, conversion, and transmission for broadcasting uses.

The term "other-worldly" encompass selected real-world photons' illuminated scenes comprising incident and reflected photons' wave properties' forming virtual images deconstructed by said display's shaped deformation planes formed in said imaging displays comprising virtual imaging mirror reflection films and resulting virtual images both being suitable for transfer by imaging recording and storage means for use in production at any time and anywhere of created picture images, augmented reality picture images, and real picture images of other-worldly virtual images selected real-world scenes. Virtual images are reflections created from objects appearing in mirrors. The adjective antecedent modifier "other-worldly" identify all invention virtual images created by the invention method using the invention displays. There are "two worlds" appearing in all "other-worldly virtual images" being integral component parts of the workings of the invention's defined optical mirror displays.

The real world virtual imaging display is capable of transforming a real world scene into "other-worldly virtual images" encompassing the composite components of both (a) the real image of the real world scene of virtual image (reflections) in the display and (b) the real image of imposed topological shaped mirror surface deformations' shaped mirror planes both being real images (pictures) captured by optical system recording means.

Inherent of the invention's encompassing display is an observer seeing reflections of other-worldly virtual images (in the blink of an eye) the physical real world and the display's imposed mirror planes at the very same instance in time seeing "other-worldly virtual images" in the physical display's reflections creating the "other-worldly virtual images" by the physical display. This is because the real world display is displaying "in" its plurality of imposed shaped deformation mirror planes' surfaces of all the plurality of imposed shaped deformation mirror reflections encompassed by the "other-worldly virtual images" that includes all those physical real world imposed reflection planes facing a real-world scene reconstructed by the mind of (a): the composite components of virtual pictures located behind the mirror being not congruent with the objects' reflections, but symmetrical to it with respect to the reflecting plane or planes and (b): pictures reconstructed by the mind of the composite components facing imposed shaped mirror deformations' shaped mirror planes. Both composite components (a) and (b) comprises reflection spectrum being the proportion of incident light that is reflected as a function of wavelength. The distinction between optical real images (pictures captured by optical recording means) and virtual images (images of things) being that real images and pictures are both intercepted on a screen; whereas, virtual images (images of things) are seen at the vertices of cones of light reaching the eye.

"A DEFINITION OF SEEING," The information that we have about the visual world, and our perceptions of objects and visual events in the world, depend only indirectly upon the state of the world. They depend directly upon the nature of the images formed on the backs of our eyeballs, and the images are different in many important ways from the world itself. It is certainly true that the state of the observer plays a fundamental role in determining the things he sees . . . , but the relationship between our perceptions and the world itself depends first of all upon the nature of our retinal images", Chapter III, the Physics of Light at page 27 and also at page 208 Chapter VII "COLOR VISION 1—DISCRIMINATIONS AMONG WAVELENGTH MIXTURES," at page 208, see: Table 9.1. A brief Review of the Kinds of Spectra discussed at line 4: Reflection spectrum: The proportion of incident light that is reflected as a function of wavelength, "VISUAL PERCEPTION," by Tom N. Cornsweet (Stanford Research Institute), Second Printing, 1971, Pub. By Academic Press, Inc., Library of Congress catalog card No.: 71-107570, which book is herein incorporated by reference.

In accordance with "OPTICS, The Science of Vision," by Vasco Ronchi at Section 132 pages 129-130, Pub. By New York University Press 1957 Library of Congress catalogue card No.: 57-5640, which book is herein incorporated by reference states: "In the standard language of optics it is customary to say that an observer sees an object when his eyes receive waves directly from the sources. It is also said that the aggregate of the centers of the waves reflected by a plane mirror constitutes the image of the object. It is therefore said that when an observer receives these reflected waves, he sees the image of the object given by the mirror . . . . This phraseology . . . has been accepted throughout the world for centuries. Yet in reality it implicitly contains dangerous ideas and hypotheses . . . . To say an observer sees the image of an object given by a mirror may lead the reader to think that the mirror gives an image even before the observer intervenes. This is absolutely not true. A mirror deviates incident waves, and that is all it does. Moreover, the reader may be induced to believe that when an observer looks at a mirror, he sees an image behind it. This too is false. It is the observer who places the effigy behind the mirror. Before he intervenes, so far as optics is concerned, there is nothing behind it . . . . The reflected waves are not only deviated by the mirror but also weakened. Their amplitude is smaller than that of the incident waves . . . any material body reflects only a fraction of the radiant flux which it receives . . . . As a result, the effigy created by an observer who receives the reflected waves must have a brightness inferior to what he would have created had he received the waves directly from the source. Also, the hue and saturation may be different."

The novel embodiments, aspects and features of the present invention useful for forming a complexity of fine details of visual elements comprises an optical mirror display having: (1) a releasably abutting and positionally adjustable structural support backing for securely attaching one or more selected thin, flexible, elastic optical plane mirror films having a selected film thickness and surface topology shaped area characterized by a selected continuous specularly reflective metal-coated surface comprising: (2) a plurality of selectively formed integrally irreversible three-dimensional deformations of selectively formed shaped reflective deformation planes over said surface topology shaped area including a plurality of substantially flat mirror facets, a plurality of folded mirror ridges, and a plurality of mirror vertices; (3) wherein said display selectively positioned facing a selected three-dimensional real-world scene illuminated by one or more selected photon illuminations for recording with one or more selected imaging recording means by an observer viewing reflections in said display comprising: (4) other-worldly encompassing virtual images of varying directional orientations appearing ever changing with respect to said observer's movements and changing viewing positions no matter the scope of said observer's gaze being wide or narrow over different areas of said deformation planes facing said real-world scene being transformed in said display comprising: (5) a selected complexity of other-worldly imaging areas of fine details including a plurality of large to a myriad of smaller than about one millimeter size selected visual elements of colors, objects, patterns, areas, shapes, textures, including mingling of said elements of said real-world scenes, displaced, rearranged, reversed, symmetrical, scattered in different directions appearing in said display unrecognizable, surprisingly abstract, entirely outside of said observer's viewing experiences, and a complete departure away from said observer's objective views of said facing real-world scenes into other-worldly virtual images; (6) wherein said other-worldly virtual images having no physical existence arising from realms of other-worldliness encompassing: (7) a realm of virtual reality other-worldliness, augmented reality other-worldliness, including encompassing a realm epitomize abstractions of artistic other-worldliness virtual images transformed in said display of said real-world scene providing various uses of said other-worldly virtual images comprising: (8) one or more selected reducible tangible real-world images having utility in virtual reality imaging, augmented reality imaging, and capable of being formed into real-world images comprising: (9) one or more real-world abstract artistic images created from said other-worldly virtual imagery appearing in said display in combination with employing selected adjustable characteristic workings of one or more selected virtual imaging recording means and one or more selected real imaging production enabling means comprising: (10) one or more selected camera system recording means including digital cameras, film cameras, video cameras, phone cameras capable of capturing, recording, using, storing said virtual images and real images of said surface topology for playback, and creating selected tangible said real-world images from said other-worldly virtual image recordings of virtual image reflections appearing in said displays selected for augmented reality uses, virtual imaging recording uses, and said abstract artistic other-worldliness imaging production uses; (11) wherein said selected deformations formed by one or more selected force-displacement means of stretching, buckling, crumpling, forming one or more selected folds, and using one or more selected tools forming deformations including extended lines selected indentations and creases on said mirror films' surfaces comprising: (a) a plurality of develop ordered deformations, (b) a plurality of develop disordered deformations, (c) a plurality of arbitrary develop ordered geometric deformations, (d) a plurality of ordered in-plane deformations, (e) a plurality of ordered out-of-plane deformations, (f) a plurality of localized strain deformations, (g) a plurality of imposed long ranging ordered deformations upon disordered deformations, (h) a plurality of imposed long ranging ordered deformations upon ordered deformations, (i) a plurality of selected sequential disordered deformations, (j) a plurality of selected sequential develop ordered deformations upon ordered deformations, (k) a plurality of develop ordered deformations upon disordered deformations, (l) a plurality of disordered deformations upon ordered deformations, (m) a plurality of disordered in-plane and out-of-plane said deformations comprising said substantially flat mirror facets, folded mirror ridges, and mirror vertices, (n) a plurality of drawn selected extended line indentation impressions, (o) a selected plurality of facets drawn extended line ordered deformation indentation impressions, and (p) a plurality of selected drawn extended line indentation impressions comprising over lapping loops, circles, intersecting straight and curved lines, extended lines of sharp angle turns, extended quick starts and stops drawn lines, line turning back arounds, lines ending abruptly left off forming indentation impressions of very fine ending tips (characteristics of vertical, horizontal, diagonals, opposed diagonals, triangle, circle, including curving line directions in combinations) are capable of forming pictorial patterns and space whereby, transforming virtual images of objects' appearing in selectively formed shaped reflective deformation planes into pictures intercepted on a screen captured in optical camera means, see extended lines representative pictures FIGS. 47-167); (12) wherein said selected deformations including selected 1st through 10th mirror topologies of said develop disordered deformations formed by selected tool means.

The said selected photon illuminations comprising: (a) an outdoor sunlight illuminated selected real-world scene, (b) an indoor sunlight illuminated selected real-world scene, (c) an indoor selected one or more said different photons illuminated selected real-world scene, (d) a selected night time surround real-world scene facing one or more selectively positioned displays situated in said surround real-world scene having said displays independently illuminated by one or more selected night time photon illumination sources of sufficient photon intensity including digital stroboscopes for example GR 1546 Strobotac® capable of flash rates from about 100 fpm to 28,000 fpm directed at selected surface areas of each said mirror displays for providing specular reflections off of each said displays' photon illuminated surface areas used for illuminating said facing real-world scenes in proximity of each said display causing diffuse reflections from said real-world scene appearing in corresponding said facing displays creating special effects of other-worldly virtual images appearing in corresponding facing said displays, see FIGS. 64, 78-80, 99-102, 114, 120, and 128-134, (e) a selected real-world scene illuminated by one or more different laser photon emissions, (f) a fire works illuminated selected real-world scene, (g) a chemical luminance illuminated selected real-world scene, (h) a microwave illuminated selected real-world scene comprising said mirror film having a selected metal coating thickness suitable for said display and capable of selective reflection of microwave photons illumination, (i) a selected night time surround real-world scene facing one or more selectively positioned displays situated in said surround real-world scene having said displays independently illuminated by one or more selected night time photon illumination sources of sufficient photon intensity directed at selected surface areas of each said displays for providing specular reflections off of each said displays' photon illuminated surface areas used for illuminating said facing real-world scenes in proximity of each said display causing diffuse reflections from said real-world scene appearing in corresponding said facing displays creating special effects of other-worldly virtual images appearing in corresponding facing said displays; and (14) wherein virtual image reflections in said display of said one or more real-world scenes comprising: (a) a selected stationary real-world scene, (b) a selected moving real-world scene, (c) a recorded video playback images of one or more selected real-world scene, (d) a live video of a selected real-world scene, (e) a television screen image of a selected real-world scene, (f) a walk around real-world scene in substantially face-apart relation with one or more selectively positioned portable displays comprising one or more three dimensional shaped real objects securely attached on a selected area of said displays for creating an augmented view of said real objects encompassed on said displays by said other-worldly virtual images including fine detailed visual elements appearing in said displays viewed by an observer at a selected viewing position using a selected said recording means situated in substantially space-apart relation arrangements facing said displays for recording real-world images of said real objects positioned over one or more said other-worldly virtual imaging areas appearing in said displays, as exemplified in representative views of the Drawings of FIGS. 14, 31, 33, 38, 82-90; (g) a surrounding real-world scene in substantially face apart relation with one or more selectively positioned displays comprising transformed other-worldly virtual images including fine detailed visual elements appearing in said displays for viewing by an observer at a selected viewing position using a selected recording means situated in substantially space-apart relation arrangements facing said displays for recording reflections of other-worldly virtual images appearing unrecognizable in said displays as exemplified in representative views of the Drawings of FIGS. 11, 20-23, 25-27, 29, 32, 34-36, and 47-167; and (h) a plurality of selected real-world scenes of virtual imaging elements appearing in said displays for recording of other-worldly virtual images as exemplified in said representative views of the Drawings of FIGS. 11, 14, 16, 17, 19-23, 25-29, and 47-167 exhibiting said other-worldly virtual imaging areas comprising complexities of fine details appearing in said displays recorded by said observer using said recording means for production of said figures of the Drawings.

In a multiple displays embodiment, a real-world scene having at least two displays selectively positioned and situated in the following said real-world scene facing displays arrangement relationships and the number of resulting virtual images produced in said displays' relationships, comprising: a facing a single display produces one virtual image, two displays facing at 90 degrees produces three virtual images, two displays facing at 60 degrees produces more than three virtual images, and two displays facing at zero degrees (displays being in parallel facing relationship) produces infinite number of virtual images.

In another embodiment, a method comprising forming one or more selected mirror topology deformations on a selected thin, flexible, elastic optical mirror film display surface by: (a) imposing one or a plurality of indentations on said mirror film display surface into one or more selected soft materials at a selected indentation depth forming one or more selected ordered said mirror topology deformations having substantially flat mirror shapes, in combination with or without (b) imposing develop disordered in-plane and out-of-plane said mirror topology deformations on said mirror display surface, in combination with or without (c) imposing one or more selected ordered deformation pattern mirror folds having mirror ridges of a selected separation distance from one another spanning on said mirror film display surface imposing upon said develop disordered topology deformations, said pattern mirror folds selected from one or more ordered folds comprising: parallel horizontal straight line accordion folds, slanting folds, checkered folds, crisscrossing folds, and one or more other Origami folds; said develop disordered topology deformations capable of forming one or more integrally irreversible three-dimensional networks of said mirror topology deformations having a plurality of substantially straight mirror folded develop mirror ridges emanating from a plurality of develop mirror vertices and intersecting other said develop mirror ridges characterized by a plurality of substantially flat develop mirror facets of substantially triangular shapes distributed on said mirror display surface by force-displacement; (d) using said mirror topology deformations for displaying and transforming of one or more real-world three-dimensional scenes into one or a plurality of other-worldly virtual images including using said virtual images for producing a higher ordered virtual imaging display; (e) recording one or more real images of said virtual images including storing said real images of said virtual images recordings for play back and (f) printing one or more selected said real images of said virtual images for selected uses comprising (i) printing said real images of said virtual images of one or more selected virtual images of another one or more selected virtual imaging displays positioned in face-to-face relation with one or more selected presentations of a real-world scenes; (ii) printing said real images of one or more said virtual images of one or more selected real image of one or more same said virtual images; and (iii) printing said real images (i)-(ii) on one or more selected fabrics materials.

In still another embodiment, a method comprising: forming one or more selected mirror topology deformations on a selected thin, flexible, elastic optical mirror film display surface comprising: (a) imposing one or a plurality of indentations on said mirror film display surface into one or more selected soft materials at one or more selected indentation depths for forming said selected mirror topology deformations, in combination with or without (b) imposing one or more develop disordered deformations on said mirror display surface by one or more selected means of crumpling said film for forming said selected mirror topology deformations, in combination with or without (c) imposing one or more selected ordered deformation mirror folds on one or more said selected mirror topology deformations; said elastic mirror film being capable of stretching and buckling by one or more selected means of imposing said indentation depths by a selected amount of force on said elastic film generating a compressive stress in said elastic film for forming one or more integrally irreversible three-dimensional networks of said selected mirror topology deformations having a plurality of substantially flat mirror facets, a plurality of substantially straight folded mirror ridges, meeting at a plurality of mirror vertices and distributed spanning a wide range of size scales on said mirror display surface for use in producing virtual imaging effects comprising: using said mirror topology deformations on said mirror display surface for transforming one or more real-world three-dimensional scenes into one or a plurality of other-worldly virtual images, recording one or more said virtual images of said scenes, storing said recording of said virtual images for play back, transmitting said virtual images or recording of said virtual images for selected uses, including using said virtual images, and said recording of said virtual images for forming higher ordered virtual imaging displays, producing special effects using said other-worldly virtual images of real-world scenes, combining said virtual images with visual (real-world) reality scenes, using said virtual images with real-world scenes for experiencing augmented reality, printing said images on paper; fabrics, and on other materials' surfaces.

There are various methods of forming disordered deformations on the mirror film surface irreversibly by crumpling, including forming a mirror film sheet into a crumpled sheet in the form of a pancake, a ball, a cube, into a small volume of selected shapes, a irregular shaped column, a bent column, a column flatten at its middle, a twisted rolled up column, a square sheet held at its center point and crumpled toward its outer corners, a column flattened from both ends. Irreversible creases and folds can be formed in selected patterns, including parallel, slanting, checkered, crisscrossing, circular, and comprising Origami folds.

Imposed indentation deformations on the surface of a mirror film can be formed using any indenter (see representative indenters and representative soft materials shown in FIG. 30 and FIG. 46 by using an indenter such as a point, a line, a selected shape to push said surface downwards into an opening or a selected sized tube, into a selected soft material including a gel, a putty, or a foam generates compressive stress in the film resulting in radial ridge deformations. In highly flexible films, in the stress state, the flat film is changed by forming ridges deformations, which relaxes the stress in the direction perpendicular to said ridge deformations. These ridge deformations caused by the force-displacement response depends only on its geometry and physics occurring in the process. Such deformation ridge patterns created is a means of generating surfaces with functional patterned topology of substantially flat triangular shape characterized by a plurality of substantially straight folded mirror ridges, $R_1$, meeting at a plurality of said mirror vertices, $V_1$, and disorderly distributed spanning a wide range of size scales on said surface for use in producing virtual imaging effects. Dominated by bending stresses during large displacement, the sheet is forced to stretch over a horizontal region, which stretching induces a stain that depends on indentation depths. Typically of first mirror topology, on increase in the applied load resulted in greater deformation of the elastic sheet and the hoop stress becomes increasingly compressive ultimately leads to ridge formations. When the compression become large enough, the sheet relieves itself by buckling out of plane with radial ridges forming, which onset is a function of the mechanical bend ability determining both the critical indentation depth require to bring about ridge formations, and the number of develop ridges forming triangular shapes emanating from vertices distributed on said surface being observed at onset.

Bendable sheet with well-developed ridge number evolves with both indentation depth and radial position of deformations. The behavior framework scenarios are applicable to explain a wide range of deformation phenomena from ultra thin mirror films to geological loading and break up of ice sheets and tectonic plates also of substantially triangular patterns.

An optical display of transformed real-world three-dimensional scenes comprising: one or more selected scenes transformed by said display into a plurality of other-worldly virtual images. Said display having one or more selected optical films characterized by a specularly reflective metal-coated continuous plane mirror surface of a selected shaped area with a selected mirror topology comprising one or more integrally irreversible three-dimensional networks of mirror deformations having a plurality of substantially flat mirror facets, a plurality of folded mirror ridges, and a plurality of mirror vertices; said mirror surface attached to a selected releasably abutting and positionally adjustable structural support backing in space apart relation with a first said mirror surface facing towards said scenes comprising: a stationary said scene, a moving said scene, a recorded play-back video image of said scene, a scene of a virtual image of a same said scene in a second different said mirror surface spaced apart in face-to-face relation with said first said mirror surface facing towards said scene, a mirror image of a different mirror image of a moving same said scene, a live video of said scene, a television screen image of said scene, a mirror first image of a different mirror second image (reflection off of another partially facing deformation mirror reflection) of said first image, a stationary same said scene, a first and second mirrors facing towards each other having said first mirror facing towards said scenes, a second said mirror surface attached to an independent said support backing with a smaller said shape area than said first said mirror, both said first and said second mirror surfaces in space apart relation with said first mirror surface facing towards said scene and facing said second said mirror facing away from said scene and towards said first said mirror, a light scene comprising photons emissions (including: lasers, fire works, chemical luminance, and microwaves); said first mirror selected from scenes of the group (comprising: a stationary said scene, a moving said scene, a recorded play-back video image of said scene, a mirror image of said scene, a scene of a virtual image of a same said scene in a second different said mirror surface spaced apart in face-to-face relation with said first said mirror surface facing towards said scene, a mirror image of a different mirror image of a moving same said scene, a live video of said scene, a television screen image of said scene) facing said second mirror selected from scenes comprising said group; and one or more selected light illumination sources of said scenes.

In still another embodiment, a method comprising: forming one or more selected mirror topology deformations on a selected thin, flexible, elastic optical mirror film display surface comprising: (a) imposing one or a plurality of indentations on said mirror film display surface into one or more selected soft materials at one or more selected indentation depths for forming said selected mirror topology deformations, in combination with or without (b) imposing one or more develop disordered deformations on said mirror display surface by one or more selected means of crumpling said film for forming said selected mirror topology deformations, in combination with or without (c) imposing one or more selected ordered deformation mirror folds on one or more said selected mirror topology deformations; said elastic mirror film being capable of stretching and buckling by one or more selected means of imposing said indentation depths by a selected amount of force on said elastic film generating a compressive stress in said elastic film for forming one or more integrally irreversible three-dimensional networks of said selected mirror topology deformations having a plurality of substantially flat mirror facets, a plurality of substantially straight folded mirror ridges, meeting at a plurality of mirror vertices and distributed spanning a wide range of size scales on said mirror display surface for use in producing virtual imaging effects comprising: using said mirror topology deformations on said mirror display surface for transforming one or more real-world three-dimensional scenes into one or a plurality of other-worldly virtual images, recording one or more said virtual images of said scenes, storing said recording of said virtual Images for play back, transmitting said virtual images or recording of said virtual images for selected uses, including using said virtual images, and said recording of said virtual images for forming higher ordered virtual imaging displays, producing special effects using said other-worldly virtual images of real-world scenes, combining said virtual images with visual (real-world) reality scenes, using said virtual images with real-world scenes for experiencing augmented reality, printing said images on paper, fabrics, and on other materials.

With reference to the figures of the Drawings, small scale square divisions of the graph paper of FIG. 1, FIG. 2, FIG. 3, FIG. 4, FIG. 5, FIG. 6, FIG. 7, FIG. 8, FIG. 9, FIG. 10, FIG. 12, FIG. 13, FIG. 15, FIG. 18, FIG. 24, FIG. 28 and FIG. 38 is 5 mm by 5 mm. The large scale square divisions are 2.5 by 2.5 cm.

FIG. 1 comprises a set of three mirror films at top left, at top right, and at center bottom with develop ordered mirror circle deformations having attributes of a seventh mirror topology of corresponding virtual image FIGS. 16, 17, 50, 78, 84, 99, 100, 101, 114-116, 118, 119, 120, 141, 142, 144, 146, 149, 155, 156, and 162 representative embodiments of the claimed invention.

FIG. 2 comprises a set of two mirror films at left and at right with develop ordered mirror square (a quadrilateral shape) deformations having attributes of a third mirror topology of corresponding virtual image FIGS. 38, 47-49, 51-59, 79, 83, 114-116, 126, 127, 129, 131, 133, 134, 140, 145, 146, 149, 154, and 159, representative embodiments of the claimed invention.

FIG. 3 comprises a set of two mirror films at left and at right with develop ordered mirror deformations having attributes of a second mirror topology of corresponding virtual image FIGS. 11, 14, 19, 20, 22, 50, 64-74, 76, 98, 99, 100, 101, 102, 103, 104, 105, 106, 114, 115, 116, 117, 118, 128, 130, 132, 134, 152, 153, 155, 156, 157, and 158 representative embodiments of the claimed invention.

FIG. 4 comprises a set of two mirror films at left and at right with develop ordered mirror deformations having attributes of a third mirror topology embodiment of the claimed invention.

FIG. 5 comprises a set of two mirror films at left and at right with develop ordered mirror deformations having attributes of a seventh mirror topology and of a sixth mirror topology embodiments respectively of the claimed invention.

FIG. 6 comprises a set of two mirror films at left and at right with develop ordered mirror deformations having attributes of a second mirror topology embodiment of the claimed invention.

FIG. 7 comprises a set of two mirror films at left and at right with develop ordered mirror deformations having attributes of a sixth mirror topology and of a seventh mirror topology embodiments respectively of the claimed invention.

FIG. 8 comprises two mirror films at left and at right with develop ordered mirror deformations having attributes of a sixth mirror topology and of a seventh mirror topology embodiments respectively of the claimed invention.

FIG. 9 comprises a set of two mirror films at left and at right having attributes of developed ordered mirror deformations of a seventh said mirror topology and of a third mirror topology embodiments respectively of the invention.

FIG. 10 comprises a 7 cm by 18 cm mirror film of develop ordered deformations having attributes representative of a sixth mirror topology of corresponding virtual image FIG. 11, FIG. 152, FIG. 155 and partial virtual image along the right vertical edge of FIG. 31.

FIG. 11 comprises a virtual image of corresponding mirror film FIG. 10.

FIG. 12 comprises five 9 cm diameter disks array mirror films of corresponding five disks array virtual images positioned at top of FIG. 14.

FIG. 13 comprises six 9 cm diameter disks array mirror films of corresponding six disks array virtual images at bottom of FIG. 14.

FIG. 14 comprises at the top five 9 cm diameter disks array of corresponding virtual images of the top five disks array mirror films of FIG. 12 and at the bottom six 9 cm diameter disks array of corresponding virtual images of the bottom six disks array mirror images of FIG. 13, and at the middle lens shaped area (extending outward behind and beyond the top and bottom disks arrays) of virtual images corresponding to partial mirror film FIG. 41.

FIG. 15 comprises mirror film corresponding to virtual images FIG. 16, FIG. 17, FIG. 21, FIG. 23, FIG. 50 and center virtual image of FIG. 31.

FIG. 16 comprises u virtual image corresponding to mirror film FIG. 15.

FIG. 17 comprises a virtual image corresponding to mirror film FIG. 15.

FIG. 18 comprises the mirror film corresponding to virtual images FIG. 19, FIG. 20, FIG. 22 and FIG. 158.

FIG. 19 comprises a virtual image corresponding to mirror film FIG. 18.

FIG. 20 comprises a virtual image corresponding to mirror film FIG. 18.

FIG. 21 comprises a virtual image corresponding to mirror film FIG. 15.

FIG. 22 comprises a virtual image corresponding to mirror film FIG. 18.

FIG. 23 comprises a virtual image corresponding to mirror film FIG. 15.

FIG. 24 comprises a 21.6 cm by 27.9 cm mirror film of develop disordered deformations representative of a first said mirror topology having six equal width ordered vertical Origami mountain-valley fold deformations.

FIG. 25 comprises a partial virtual image corresponding to mirror film FIG. 38.

FIG. 26 comprises a partial virtual image corresponding to mirror film FIG. 38.

FIG. 27 comprises a partial virtual image corresponding to mirror film FIG. 40.

FIG. 28 comprises a 13 cm by 24.5 cm mirror film with develop disordered and parallel fold ordered deformations.

FIG. 29 comprises a partial virtual image corresponding to mirror film FIG. 44.

FIG. 30 is the same cutting board appearing in FIG. 46. The cutting board having rule scale-divisions displaying representative materials and implements useful as tools for imposing indentations on mirror film surfaces.

FIG. 31 comprises virtual images corresponding to mirror films FIG. 15 at center and partial virtual images FIG. 10 along right vertical edge respectively.

FIG. 32 comprises a partial virtual image corresponding to mirror film FIG. 45.

FIG. 33 comprises a virtual-image corresponding to partial mirror films FIG. 42 (background view at left and bottom edges) and FIG. 39 (foreground view at middle and upper right).

FIG. 34 comprises a partial virtual image corresponding to a partial area of mirror film FIG. 42.

FIG. 35 comprises a partial virtual image corresponding to a partial area of mirror film FIG. 42.

FIG. 36 comprises a partial virtual image corresponding to a partial area of mirror film FIG. 43.

FIG. 37 comprises a selected enlarged area corresponding to both virtual image FIG. 29 and mirror film FIG. 44.

FIG. 38 comprises mirror film with Origami folds corresponding to virtual images FIG. 25 and FIG. 26.

FIG. 39 comprises mirror film corresponding to virtual image FIG. 33 (at foreground center right).

FIG. 40 comprises partial mirror film corresponding to partial virtual image FIG. 27.

FIG. 41 comprises partial mirror film corresponding to partial virtual image FIG. 14 (at the middle lens shaped area and extending outward behind and beyond the tops and bottoms of said virtual image disks arrays to the image's outer edges).

FIG. 42 comprises the mirror film corresponding to partial virtual images FIG. 33 (at background left and bottom), FIG. 34 and FIG. 35.

FIG. 43 comprises partial mirror film corresponding to partial virtual image FIG. 36.

FIG. 44 comprises a partial mirror film corresponding to partial virtual images FIG. 29 and FIG. 37.

FIG. 45 comprises a partial mirror film corresponding to partial virtual image FIG. 32.

FIG. 46 comprises the same cutting board as FIG. 30 having rule scale-divisions displaying representative materials and implements useful as tools for imposing indentations on mirror film surfaces, whereas all objects and implements displayed on FIG. 46 include additional FIG. 30 types of implements having at least one smooth surface means for gliding on mirror surfaces to produce controlled selected continuous very fine extended line indentation impressions (see FIG. 30 at ruler coordinates 4½ inches top and 26⅝ inches at the right is seen a clay and wax artist-dotting tool (having a blade at one end and round steel ball tip with adjustable depth by twisting the said blade at the opposite end use for forming controlled vertical ordered deformations (including extended line indentation impressions with both ends and also useful for forming controlled extended line impressions of ordered deformations with the steel ball end on mirror films by carefully moving the ball end slowly over the film surface as not to cause scratch marks and at higher speeds. An indentation surface (lubricant) may be applied over the mirror surface (additives), as needed. Other low surface friction bearing type free band applied tools on cutting board display is for creating extended continuous line impressions of different diameter pulley type ball bearing rollers.

For this reason, round smooth surfaces including low friction surfaces are useful to form controlled short and extended line indentation deformations on mirror surfaces, such as the Teflon 13.56 mm length diameter hollow 5.99 mm diameter rods and solid smaller 2.49 mm diameter Teflon curved rods originally as a 23 cm diameter high temperature "O" ring pressure seals cut and sharpen at ends to a small hemispherical shape (displayed at about the middle of the cutting board) of FIG. 46. The following figures demonstrate Teflon tip formed extended lines: FIGS. 60-63, 75, 78, 79, 83, 98-101, 114-116, 118,-120, 126, 127, 129-131, 144, 145, and 162.

Forming lines is another way of making straight line folds, which only require the use of the hands and do not involve moving a selected smooth surface tool means over a mirror surface by applying pressure. A continuous curve or circular line formed by the turn and twist of the hand will create intersecting crescent facets, see curved line FIGS. 51-63, 65-74, 77, and 152. Ripples are derived from parallel curved lines, see FIGS. 60-63, and 102-113, while straight extended line intersecting impressions on the mirror surface create facets by dividing space and forming angles, see FIGS. 79, 80-82, 91-97, 114-116, 118, 119, 126, 127, 129, 130, and 145.

Low friction (additives) use in creating extended line indentations include powder graphite, soap, water, glycerin and the like to provide means for creating both slow to extremely quick free hand extended line impressed indentations under selected conditions of light, moderate to high pressures to form various drawn lines. A versatile low friction tool means for forming lines on mirror films is a common ballpoint pen filled with ink for writing will leave ink lines, which can be removed by rubbing with Isopropyl Alcohol afterward.

An inkless old used ballpoint pen is ideal for making sharp extended lines on mirror films using applied light pressure and slow motion on thin films (see FIGS. 77, 80-82, 91-99, and 106-113, 134, 139, 141, 142, 147, 148, 163, 165 and 166). Increased pressure with greater movement speed may be used on thicker films, see: FIGS. 51-59, 65-74, 84, 102-105, 125, 135-138, 143, 147, 150-152, and 160.

Figures exemplifying continuous extended lines of turning loops, see: FIGS. 75, 77, 99, 100, 101, 107, 108, 109, 110, 111, 144, 147, 152, 160, and 162; line forming circles of FIGS. 51-59, 77, 88-90, 107-133, 136, 139, 141, 142, 147, 148, 150-152, 160, 161; straight lines of FIGS. 51-59, 75, 78-82, 91-97, 98-112, 114-131, 133-139, 141-143, 144, 146, 149-151, and 160-163; line forming curves of FIGS. 51-74, 84-90, 98-113, 117, 118, 112-125, 128, 135-139, 141-144, 147, 148, 150, 151, and 159-166; sharp angle line turned FIGS. 51-59, and 88-90; quick starts FIGS. 60-74; lines turning arounds of FIGS. 51-63, and 88-90; and lines ending abruptly lifting off forming very fine indentation impressions with very fine line ending tips see: FIGS. 60-74. Such tool means use for forming lines gives control to the artist providing him/her the essentials to express pictorial movement, emotions, beauty and interestingness practicing the instant utility invention display methods as further exemplified by FIG. 135 depicting ancient hand writing script carved in stone at left and a human face at right all extended line indentations formed on mirror film using the tip of an inkless ballpoint pen.

"When a set of contours matches a familiar prototype, memory serves to fill in the missing details . . . . These and many other line drawings show how artists are able to depict such various features as depth, folds, occlusion, texture, brightness, mental energy, or motion by choosing the right lines, revealing that artists (implicitly or explicitly) understand the code of the visual system. Scientists have yet to fully understand what artists have successfully been practicing for thousands of years and for some questions of the neural codes of vision, we may find that artists are a more immediate and better source of information than our most advanced scientific studies, whether of behavior, single cell recordings, or brain imaging . . . " is the conclusion of an article entitled: "What Line Drawings Reveal About the Visual Brain, by Bilge Sayim and Oatrick Cavanagh, Publised: 28 Oct. 2011, Volume 5, Article 118 page 3 of "Frontier"s in Human Neuroscience." This study explains the interestingness to extended line impressions of faces appearing in FIGS. 51-59, 135-138, 150, and 151. Whereas. the extended line impression ambiguities of FIGS. 147, 148, and 152 do not invite such instant interest in like ambiguity line drawings.

Extended line indentation additives can be easily cleaned off afterward. See cutting board display of smooth surface representative implements may be held in-between two fingers of one hand or secured by a multiple holding device for forming parallel lines of a selected thickness mirror films used making extended line impressions on film mirrors, see FIGS. 1-167 (selected representative Mylar® mirror film thickness of 0.02 mm, 0.04 mm, 0.13 mm, and 0.14 mm and the like).

Additionally, examples of other types of mirror substrates useful in practicing the invention are selected very thin (representative 26 gauge 0.452 mm) #8 non-directional high gloss mirror of polished T304 grades stainless steel sheets (typically 48×60 to 48×120 (SKU 10138 and 19930) wide including custom-sized to design specifications fabricated by Mirror Metals of Oxnard, CA 93030) that is capable of receiving extended line indentation impressions under selected pressure using low friction components, such as bearings partially seated in a suitable Teflon lined hollow metal cylinder held in contact with the sheet surface in place by a press (using such representative steel ball bearings displayed on cutting board FIG. 46 of bearings sizes of diameters 7.93 mm, 9.51 mm, 33.26 mm) including other low friction ceramic, synthetic sapphire, and ruby ball bearings (greater than about 1.96 mm to about 0.94 mm and smaller diameters). Also useful are typical available off the shelf different size steel roller ball bearing casters (mini, micro, and standard sizes of all types) including SP-30 ball transfer capable of supporting a load of 250 kg, SP-15 (49 kg), SP-30 (250 kb), SP-8FL (8 kg), SP-8GL (8 kg), IS-25 (120 kg), CY-15H, CY-15T, CY-22H, CY-25F, CY-30A (40 kg), CY-30H, CY-19C, CY-25T, CY-190, CY-30B (35 kg), CY-38A (60 kg), Nylon and Teflon ball caster, and Ahcell-15 mm diameter ball caster and the like.

Such thin 26 gauge 0.45 mm mirror of 304 Austenitic stainless steel sheets (45% elongation and Tensile Strength 500-700 Mpa) or 26 gauge (0.40 mm) of Aluminum sheet may be use for large format museum mirror deformation wall displays installations providing stability due to greater display's sheet rigidity of formed controlled extended lines into the plane and out of plane indentations using such rolling steel bearing line impressions means. When into the plane impressions are formed, a protective clear coating is typically applied on the mirror side to prevent damaging the mirror surface. Such a formed deformation mirror sheet installed on a museum's wall would provide virtual imaging of museum visitor walking about surrounded by other colorful wall art installations, see FIGS. 85-90.

Another aspect to working with mirror films is the use of various smooth surfaces tool means, such as handheld smooth surface stones and various metal objects. Examples displayed on the cutting board of such as a stone with hole and three outward smooth surface protrusions. Fairy stones (not shown) with many outward projected round forms may be used. Another metal tool means is a rounded head golden Titanium rivet displayed on the cutting board securely held in a drill press positioned over a steel mirror sheet resting on a selected soft substrate surface on top of a 50 cm diameter movable nearly frictionless 18 mm thick Teflon disk surface movably positioned using both hands to guide selected thin steel mirror sheet (a small section at a time) under the fixed positioned upside down drill press held in a fixed position) Titanium rivet head to create extended line impressions (of any design) patterns and at selected applied pressure and speed.

A third aspect in practicing the mirror display invention is a utility kit for making virtual (mirror) art with instructions for forming various ordered and disordered deformations of the invention including using various line impression tool means on mirror films comprising: (1) one or more tools for practicing the invention, and (2) selected mirror films of various thicknesses as components of a kit for artists and art education uses.

FIG. 50 comprises a virtual image of corresponding mirror film FIG. 15.

FIGS. 75, 78-82, 91-97, 126, 127, 129, 131, 134, and 139 comprises a virtual image having straight rule lines embodiments of the claimed invention.

FIG. 152 comprises a virtual image of corresponding mirror film FIG. 10.

FIG. 155 comprises a virtual image of corresponding mirror film FIG. 10.

FIG. 158 comprises a virtual image of corresponding mirror film FIG. 18.

FIG. 167 comprises a virtual image of corresponding mirror film FIG. 28.

An optical display of transformed real-world three-dimensional scenes comprising: one or more selected scenes transformed by said display into a plurality of other-worldly virtual images. Said display having one or more selected optical films characterized by a specularly reflective metal-coated continuous plane mirror surface of a selected shaped area with a selected mirror topology comprising one or more integrally irreversible three-dimensional networks of mirror deformations having a plurality of substantially flat mirror facets, a plurality of folded mirror ridges, and a plurality of mirror vertices; said mirror surface attached to a selected releasably abutting and positionally adjustable structural support backing in space apart relation with a first said mirror surface facing towards said scenes comprising: a stationary said scene, a moving said scene, a recorded play-back video image of said scene, a scene of a virtual image of a same said scene in a second different said mirror surface spaced apart in face-to-face relation with said first said mirror surface facing towards said scene, a mirror image of a different mirror image of a moving same said scene, a live video of said scene, a television screen image of said scene, a mirror first image of a different mirror second image (reflection off of another partially facing deformation mirror reflection) of said first image, a stationary same said scene, a first and second mirrors facing towards each other having said first mirror facing towards said scenes, a second said mirror surface attached to an independent said support backing with a smaller said shape area than-said first said mirror, both said first and said second mirror surfaces in space apart relation with said first mirror surface facing towards said scene and facing said second said mirror facing away from said scene and towards said first said mirror, a light scene comprising photons emissions (including: lasers, fire works, chemical luminance, and microwaves); said first mirror selected from scenes of the group (comprising: a stationary said scene, a moving said scene, a recorded play-beck video image of said scene, a mirror image of said scene, a scene of a virtual image of a same said scene in a second different said mirror surface spaced apart in face-to-face relation with said first said mirror surface facing towards said scene, a mirror image of a different mirror image of a moving same said scene, a live video of said scene, a television screen image of said scene) facing said second mirror selected from scenes comprising said group; and one or more selected light illumination sources of said scenes.

All of the photographed mirror films of FIGS. 1-45 were hand cut outs (to selected sizes for ease of handling) from large 137.2 cm×3,048.00 cm rolls of Sun Products® 0.04 mm and 0.02 mm metalized poly(ethylene-terphthalate) PTE mirror films.

Films of 0.6 meter by 1.219 meter sheets were cut our for forming disordered deformations by crumpling the sheet inside a large 30.48 cm diameter cylinder shaped container (closed bottom end) by packing it down forcefully using a medium 25.4 cm diameter (closed bottom end) cylinder shaped container and repeating the same steps by taking out the crumpled sheet from the said larger container and placing it into the said medium container and further packing the crumpled sheet down forcefully into the medium size container using a smaller 20.32 cm diameter (closed bottom end) cylinder shaped container and repeating the same steps by taking out the crumpled sheet from the medium container and placing it into the said small container and further packing the crumpled sheet down forcefully into the smaller container using both open hands. This method is repeatedly used to crumple PTE mirror films and at different stages of the crumpling process different shaped samples were cut outs for use in forming substantially all the smaller disordered deformation mirror film shapes. All ordered mirror deformation mirror film shapes were cut and formed from said rolls of different thickness PTE mirror films. The drawings also comprise examples of ordered deformations imposed upon develop disordered deformations, as well as develop disordered deformations imposed upon ordered deformations.

The display of medium to larger optical mirror films of FIGS. 38, 39, and very large films 40-45 including resulting display virtual images FIGS. 25-27, 29, and 32-37 comprising substantially flat mirror facets" topological deformations were mounted in a room using removable blue painter's masking tape (as needed to suspend each of the very large films' top edges and at bottom corners and sides) on a double (continuous joint-segments of positive and negative) curving wall each having a radius of approximately 745.45 cm, which wall (69 cm above the room floor facing said room) having a top row and a bottom row of three 110 cm wide×173 cm tall windows (for daylight illumination) on each row facing the sunrise direction (East) and said bottom row of said windows partially covered over by said mirror film leaving a 104 cm bottom window sunlight illumination gap, which curved wall is approximately 600 cm wide, with a ceiling 399 cm tall, and a floor length of 720 cm filled with real-world three-dimensional scenes (presentation of household and selected items, including a large screen television) for display presentation in front of said wall of mounted said mirror films.

Reference is made to illustrative FIGS. 1-167 embodiments of said mirror deformations comprising: a plurality of develop ordered deformations FIGS. 1-27, 31-36, 38-43, and 45, 64, 76, 128, 132, 140, 154, 155-158, and 164; a plurality of develop disordered mirror deformations FIGS. 24-29, 33-38, and 40-44, 140, 153, 164, and 167; a plurality of arbitrary develop ordered geometric mirror deformations FIGS. 5-12, 14-17, 21, 23, 24-29, 31, 33-36, and 40-43, a plurality of ordered in-plane mirror deformations FIGS. 1-45, 76, 87; a plurality of ordered out-of-plane mirror deformations FIGS. 2, 4, 5, 7, 8, 15-17, 21, 23-27, 29, 31-33-36, 38, 39, 40-44, and 45, a plurality of localized strain mirror deformations FIGS. 3-29, and 31-45, a plurality of imposed long ranging ordered mirror deformations upon disordered mirror deformations FIGS. 14, 24-27, 33-36, 38, and 40-43, a plurality of imposed tong ranging ordered mirror deformations upon ordered mirror deformations FIGS. 14, 25-27, 36, 38, 40, and 41, a plurality of selected sequential disordered deformations FIGS. 13, 14, 25-27, 36, 40, and 41; a plurality of selected sequential develop ordered deformations upon ordered deformations FIGS. 2, 5(Right), 6-10, 12-14, 17, 18-23, 25, 26, 27, 33, 29, 38, and 40-42, a plurality of develop ordered deformations upon disordered deformations FIGS. 14, 24-28, 33-36, 38, 40-43, and 45, a plurality of disordered deformations upon ordered deformations FIGS. 14, 24, 25-28, 33-36, 38, and 40-43, a plurality of disordered in-plane and out-of-plane deformations FIGS. 14, 24-28, 32, 33-38, and 40-45.

A first said mirror topology is illustrated by FIGS. 24-29, 32-38, and 40-45 of said develop disordered mirror deformations comprising a selected mirror network, $N_1$, having said plurality of substantially flat mirror facets, $F_1$, of substantially triangular shapes characterized by a plurality of substantially straight folded said mirror ridges, $R_1$, meeting at a plurality of said mirror vertices, $V_1$, and disorderly distributed spanning a wide range of size scales on said surface.

A second said mirror topology is illustrated by FIGS. 3, 6, 10, 11-23, 31, 32, and 45 of said develop ordered mirror deformations comprising a selected mirror network, $N_2$, having a plurality of substantially flat develop mirror facets $F_2$ of substantially triangular shapes of a plurality of substantially straight develop mirror ridges $R_2$ sharing a common ridge of substantially equal adjacent angle to one another, said ridges $R_2$ emanating outwardly meeting said plane surface from a commonly joined shared ordered mirror vertex $V_2$.

A third said mirror topology is illustrated by FIGS. 2, 4, 7(Right), 9(Right), 10-14, 18-20, 25-27, 33, 38 and 39 of said develop ordered mirror deformations comprising a selected mirror network, $N_3$ having a plurality of neighboring said $N_2$ network deformations distributed on said surface having said plurality of straight develop mirror ridges $R_2$ and of varying lengths emanating from one or more different near-by said neighboring ordered mirror vertices $V_2$ outwardly and intersecting other said develop more develop ridges characterized by a plurality of substantially flat develop mirror facets $F_3$ of substantially triangular shapes including a plurality of one or more other substantially flat develop mirror shapes of quadrilaterals and polygons on said surface, said intersecting of ridges characterized by one or more intersections of develop mirror vertices $V_3$.

A fourth said mirror topology is illustrated by FIG. 7(Left) of said develop ordered mirror deformations comprising a selected network, $N_4$ having a plurality of substantially flat develop mirror facets, $F_4$, of substantially straight triangular shapes characterized by a plurality of substantially straight line segment ordered mirror ridges $R_3$ each with two opposite end develop mirror vertices $V_4$ and $V_5$, said $V_4$ having a plurality of substantially outwardly directed and substantially straight develop mirror ridges $R_4$ of substantially equal adjacent angle to one another emanating from said $V_4$ meeting said surface, and said $V_5$ having a plurality of substantially outwardly directed and substantially straight develop mirror ridge $R_5$ of substantially equal adjacent angle to one another emanating and meeting said surface.

A fifth said mirror topology is illustrated by FIG. 7(Right), of said develop ordered deformations comprising a selected network, $N_5$ having a plurality of substantially flat mirror faccts $F_5$ and $F_6$. Said $F_5$ comprises substantially straight triangular shapes characterized by one or more selected substantially curve line segment ordered mirror ridges $R_6$ each with two opposite end develop mirror vertices $V_6$ and $V_7$, said $V_6$ having a plurality of substantially outwardly directed and substantially straight develop mirror ridges $R_7$ of substantially equal adjacent angle to one another emanating and meeting said surface, and said $V_7$ having a plurality of substantially outwardly directed and substantially straight develop mirror ridges $R_8$ of substantially equal adjacent angle to one another emanating and meeting said surface; and said $F_6$ comprises a plurality of develop mirror vertices $V_8$ distributed substantially equally spaced apart on said $R_6$, and each said $V_8$ having one or a plurality of adjacent outwardly directed and substantially straight develop mirror ridges $R_9$, said one $R_9$ emanating in a direction normal to the tangent at said $V_8$ on said $R_6$ meeting said surface, and said plurality of $R_9$ sharing a common said $V_8$ emanating outwardly directed at about the center between two congruent said $R_9$ in said direction normal to the tangent at said $V_8$ meeting said surface;

A sixth said mirror topology is illustrated by FIG. 5(Right), 7(Left), 8(Left), and 11 of said develop ordered mirror deformations comprising a selected network, $N_6$ having a plurality of substantially flat ordered mirror facets $F_7$, $F_8$, $F_9$ said $F_7$ comprising one or more selected same or different geometric mirror shapes of one or more selected same or different sizes, including triangles, quadrilaterals, polygons. Each of said shapes encompassing a selected said area on said surface bounded by three or more straight line ordered mirror ridges $R_{10}$ join at three or more ordered mirror corner vertices $V_9$ having a plurality of outwardly directed and substantially straight develop mirror ridges $R_{11}$ of substantially equal adjacent angle to one another emanating from each said $V_9$ meeting said surface. Said $R_{11}$ forming one or more intersection develop mirror vertices $V_{10}$ with one or more other said $R_{11}$ emanating outwardly from a neighboring one or more different near-by said neighboring said $V_9$. Said $F_8$ bounded by said $R_{11}$ connected at said $V_{10}$ characterized by substantially triangular shapes including a plurality of one or more other substantially flat develop mirror shapes of quadrilaterals and polygons on said surface; said $F_9$ comprising one or more said $R_{10}$ of $V_9$ forming one or more intersection develop mirror vertices $V_{12}$ with one or more said $R_{11}$ of one or more neighboring said $F_7$ bounded by said $R_{11}$, one or more said $R_{10}$, one or more said $V_9$, and one or more said $V_{11}$ characterized by substantially triangular shapes including one or more other substantially flat develop mirror shapes of quadrilaterals and polygons within said encompassing area of one or more neighboring said $F_7$ of said geometric shapes;

A seventh said mirror topology is illustrated by FIGS. 5(Left), 7(Right), 8(Right), 9(Left), 12(Right), 14-17, 21, 23, and 31 of said develop ordered mirror deformations comprising a selected network, $N_7$ having a plurality of substantially flat geometric curve shape ordered mirror facets $F_9$ comprising one or more selected same or different geometric curved shapes of one or more selected same or different sizes including a circle, a semicircle, a circular sector, a lune, an ellipse, an oval, including a lens. Each of said shapes encompassing a selected said area on said surface bounded by one or more curved ridges $R_{12}$ having a plurality of develop mirror vertices $V_{12}$ distributed substantially equally spaced apart on said $R_{12}$, and each said $V_{12}$ having one or a plurality of adjacent outwardly directed and substantially straight develop mirror ridges $R_{13}$, said one $R_{13}$ emanating in a direction normal to the tangent at said $V_{12}$ on said $R_{12}$ meeting said surface, and said plurality of $R_{13}$ sharing a common said $V_{12}$ emanating outwardly directed at about the center between two congruent said $R_{13}$ in said direction normal to the tangent at said $V_{12}$ meeting said surface.

An eighth said mirror topology is illustrated by FIGS. 24-26, 28, 33, 34-36, 38, 40, 42, and 43 of said imposed ordered mirror deformations comprising a selected network, $N_8$, having a selected number of substantially flat parallel develop ordered mirror facets $F_{10}$ comprising a plurality of parallel straight line accordion (or "Z" pattern fold imposed ordered mirror ridges $R_{14}$ having a selected separation distance from one another spanning on said plane mirror surface imposed upon said develop disordered mirror deformations of said mirror networks $N_1$.

A ninth said topology is illustrated by FIGS. 14, 27, 38, 40, and 41 of said imposed ordered mirror deformations comprising a selected network, $N_9$ having a plurality of parallel horizontal straight line accordion fold ordered mirror ridges $R_{14}$ of a selected separation distance from one another, and a plurality of substantially flat parallel developed ordered mirror facets $F_{11}$ comprising a plurality of parallel vertical straight line accordion fold ordered mirror ridges $R_{15}$ of a selected separation distance from one another, said ridges $R_{14}$ intersecting said ridges $R_{15}$ at develop mirror vertices $V_{13}$ of approximately 90 degrees on said plane mirror surface imposed upon said develop disordered mirror deformations of said mirror networks $N_1$.

A tenth said topology is illustrated by FIGS. 25, 26, 36, 38, and 40 of said imposed ordered mirror deformations comprising a selected network, $N_{10}$ having a selected plurality of substantially flat parallel develop mirror facets $F_{12}$ comprising a plurality of parallel horizontal straight line accordion fold ordered mirror ridges $R_{16}$ of a selected separation distance from one another, and a plurality of substantially flat parallel develop mirror facets $F_{13}$ comprising a plurality of parallel straight line accordion fold ordered mirror ridges $R_{17}$ of a selected separation distance from one another, said ridges $R_{16}$ intersecting said ridges $R_{17}$ on said plane mirror surface at develop vertices $V_{14}$ of an angle of less than 90 degrees, said mirror surface imposed upon said develop disordered mirror deformations of said mirror networks $N_1$.

Said first topology through said tenth topology having at least one ordered deformations imposed on said surface selected from irreversible creases and folds patterns comprising parallel folds of illustrative FIGS. 14, 24-2, 33-36, 38, and 40-43, slanting folds of FIGS. 25-27, 38, and 40, checkered folds of FIG. 41, crisscrossing folds of FIGS. 25-27, 38, 40 and 41, circular folds of FIGS. 5(Left), 14(Left), 12(Right), 15-17, 21, 23, and 31, and one or more Origami styles of folding of FIGS. 14, 24-27, 33-36, 38, and 40-43; and other illustrative pattern folds.

FIG. 1 are three 0.04 mm thick PTE mirror films with develop ordered mirror circle deformations on said mirror film surfaces imposed by indentations into a same block of gel material. At top left is deformations by a small wood rod of a sized circle end cross-section; at top right is deformations of a larger wood rod of a sized circle end cross-section; and at lower bottom is deformations of said large wood rod of a sized circle end cross-section, and near its lower left is deformations by a small plastic straw of a sized circle end cross-section. All the rod and straw indentations of FIG. 1 encompasses surface areas bounded by curved ridges $R_{12}$, mirror vertices $V_{12}$, On the surface between the indentations of the straw and wood rod are facing curved ridges $R_{12}$, each having emanating (in a direction to the tangent of the respective $R_{12}$s) are intersecting vertices $V_{12}$ forming facets $F_9$. The mirror films are on top of a sheet of graph paper marked by small 0.5 cm dotted squares enclosed within a large 3.5 cm outline squares for purpose of reference sizes of the films and indention deformations, as well as serve as a measure of the sizes of ridges $R_{12}$, vertices $V_{12}$, and facets $F_9$ on the surface of said mirror films.

FIG. 2 are two 0.04 mm thick PTE mirror films with develop ordered mirror square (a quadrilateral shape) deformations on said mirror film surfaces imposed by indentations into a same block of get material. At right is out of plane deformation patterns of one 4 cm square stainless tubing of a sized square end cross-section exhibiting mirror network $N_3$ having a plurality of neighboring $N_2$ network deformations distributed on said surface having said plurality of straight develop mirror ridges $R_2$; forming the four sides of the square meeting at the four corners vertices $V_2$ and develop mirror ridges emanating from said four corners also forming mirror additional ridges $R_2$. At left are out of plane deformations of two overlapping 4 cm square stainless tubing of a sized square (also a quadrilateral) end cross-section mirror network, $N_3$ having a plurality of neighboring said $N_2$ network deformations distributed on said surface having said plurality of straight develop mirror ridges $R_2$ emanating from said four corners of each of said overlapping squares forming one or more different near-by said neighboring ordered mirror vertices $V_2$ at the intersection of each squares' said ridges $R_2$ at crossings forming other vertices $V_2$ intersecting other said develop ridges characterized by a plurality of substantially flat develop mirror facets $F_3$ emanating from said squares' corner forming vertices $V_2$ of substantially triangular shapes including a plurality of one or more other substantially flat develop mirror shapes of quadrilaterals on said surface, said intersecting of ridges characterized by one or more intersections of develop mirror vertices $V_3$;

FIG. 3 are two 0.04 mm thick PTE mirror films with develop ordered mirror No. 2 pencil rounded point imposed indentation deformations on said mirror film surfaces into a same block of gel material. At left is one point indentation forming a develop ordered mirror deformations comprising mirror network, $N_2$, having a plurality of substantially flat develop mirror facets $F_2$ of substantially triangular shapes of a plurality of substantially straight develop mirror ridges $R_2$ of substantially equal adjacent angle to one another, said ridges $R_2$ emanating outwardly meeting said plane surface from a commonly joined shared ordered mirror vertex $V_2$; (one pencil indentation point); and at right are develop ordered mirror deformations of five indention points with a No. 2 pencil forming develop ordered mirror deformations comprising mirror network, $N_2$, having a plurality of substantially flat develop mirror facets $F_2$ of substantially triangular shapes of a plurality of substantially straight develop mirror ridges $R_2$ of substantially equal adjacent angle to one another, said ridges $R_2$ emanating outwardly meeting said plane surface from a commonly joined shared ordered mirror vertex $V_2$ at each pencil indentation point.

FIG. 4 are two 0.04 mm thick PTE mirror films with five develop ordered mirror point imposed indentation deformations on said mirror film surfaces into a same block of gel material. On the left are five spaced apart indentions imposed with a Scott 6 mm diameter arrow cone point; and at right are eight spaced apart indentions imposed with a corner of a cube-shaped plastic container. Both left and right mirror films are representative of a third said mirror topology of said develop ordered mirror deformation comprising a selected mirror network, $N_3$ having a plurality of neighboring said $N_2$ network deformations distributed on said surface having said plurality of straight develop mirror ridges $R_2$ emanating from one or more different near-by said neighboring ordered mirror vertices $V_2$ outwardly and intersecting other said develop more develop ridges characterized by a plurality of substantially flat develop mirror facets $F_3$ of substantially triangular shapes including a plurality of one or more other substantially flat develop mirror shapes of quadrilaterals and polygons on said surface, said intersecting of ridges characterized by one or more intersections of develop mirror vertices $V_3$;

FIG. 5 are two 0.04 mm thick FTE mirror films. The mirror surface deformations on the left are of five over lapping circle deformations formed with the same 4.5 cm diameter plastic tubing and is representative of a seventh said mirror topology of said develop ordered mirror deformations comprising a selected network, $N_7$ having a plurality of substantially flat geometric curve shape ordered mirror facets $F_9$ comprising one or more selected same or different geometric curved shapes of one or more selected same or different sizes including a circle, a semicircle, a circular sector, a lune, an ellipse, an oval, including a lens; each of said shapes encompassing a selected said area on said surface bounded by one or more curved ridges $R_{12}$ having a plurality of develop mirror vertices $V_{12}$ distributed substantially equally spaced apart on said $R_{12}$ and each said $V_{12}$ having one or a plurality of adjacent outwardly directed and substantially straight develop mirror ridges $R_{13}$, said one $R_{13}$ emanating in a direction normal to the tangent at said $V_{12}$ on said $R_{12}$ meeting said surface, and said plurality of $R_{13}$ sharing a common said $V_{12}$ emanating outwardly directed at about the center between two congruent said $R_{13}$ in said direction normal to the tangent at said $V_{12}$ meeting said surface. The mirror deformations on the right are imposed at the top using a corner of a cube and below is a deformation made using a one centimeter (1 cm) square (quadrilateral shape) steel rod, which is representative a sixth said mirror topology of said develop ordered mirror deformations comprising a selected network, $N_6$ having a plurality of substantially flat ordered mirror facets $F_7$, $F_8$, $F_9$ said $F_7$ comprising one or more selected same or different geometric mirror shapes of one or more selected same or different sizes, including triangles quadrilaterals, polygons; each of said shapes encompassing a selected said area on said surface bounded by three or more straight line ordered mirror ridges $R_{10}$ join at three or more ordered mirror corner vertices $V_9$ having a plurality of outwardly directed and substantially straight develop mirror ridges $R_{11}$ of substantially equal adjacent angle to one another emanating from each said $V_9$ meeting said surface; said $R_{11}$ forming one or mom intersection develop mirror vertices $V_{10}$ with one or more other said $R_{11}$ emanating outwardly from a neighboring one or more different near-by said neighboring said $V_9$; and said $F_8$ bounded by said $R_{11}$ connected at said $V_{10}$ characterized by substantially triangular shapes including a plurality of one or more other substantially flat develop mirror shapes of quadrilaterals and polygons on said surface; said $F_{11}$ comprising one or more said $R_{10}$ of $V_9$ forming one or more intersection develop mirror vertices $V_{11}$ with one or more said $R_{11}$ of one or more neighboring said $F_7$ bounded by said $R_{11}$, one or more said $R_{10}$, one or move said $V_9$, and one or more said $V_{11}$ characterized by substantially triangular shapes including one or more other substantially fat develop mirror shapes of quadrilaterals and polygons within said encompassing area of one or more neighboring said $F_7$ of said geometric shapes. Between the mirror surfaces at right and at left are $R_{10}$ and $R_{11}$ ridge deformations emanating from vertices $V_9$, $V_{10}$, and $V_{11}$ intersecting forming other additional vertices and facets.

FIG. 6 are two 0.04 mm thick PTE mirror films. The mirror surface deformations at left are of three, one 1.6 cm indentation at the top, another 1.6 cm indentation in the middle and a 3.5 cm indentation at the bottom all formed using the handle edges of ARCO paper clamps. All the indentations on the left are representative of a second said mirror topology of said develop ordered mirror deformations comprising a selected mirror network, $N_2$, having a plurality of substantially flat develop mirror facets $F_2$ of substantially triangular shapes of a plurality of substantially straight develop mirror ridges $R_2$ sharing a common ridge of substantially equal adjacent angle to one another, said ridges $R_2$ emanating outwardly meeting said plane surface from a commonly joined shared ordered mirror vertex $V_2$. The imposed ten indentation deformations on the right are formed using a 5.1 cm long noses of a crescent pliers, which indentations also have attributes of a second mirror topology as described.

FIG. 7 are two 0.04 mm PTE mirror films. The four mirror surface deformations on the left were formed using a 2.2 cm shaped equilateral triangle shaped (flat face) steel tool, which deformations is representative a sixth said mirror topology of said develop ordered mirror deformations comprising a selected network, $N_6$ having a plurality of substantially flat ordered mirror facets $F_7$, $F_8$, $F_9$ said $F_7$ comprising one or more selected same or different geometric mirror shapes of one or more selected same or different sizes, including triangles, quadrilaterals, polygons; each of said shapes encompassing a selected said area on said surface bounded by three or more straight line ordered mirror ridges $R_{10}$ join at three or more ordered mirror corner vertices $V_9$ having a plurality of outwardly directed and substantially straight develop mirror ridges $R_{11}$ of substantially equal adjacent angle to one another emanating from each said $V_9$ meeting said surface; said $R_{11}$ forming one or more intersection develop mirror vertices $V_{10}$ with one or more other said $R_{11}$ emanating outwardly from a neighboring one or more different near-by said neighboring said $V_9$; and said $F_8$ bounded by said $R_{11}$ connected at said $V_{10}$ characterized by substantially triangular shapes including a plurality of one or more other substantially flat develop mirror shapes of quadrilaterals and polygons on said surface; said $F_9$ comprising one or more said $R_{10}$ of $V_9$ forming one or more intersection develop mirror vertices $V_{11}$ with one or more said $R_{11}$ of one or more neighboring said $F_7$ bounded by said $R_{11}$, one or more said $R_{10}$, one or more said $V_9$, and one or more said $V_{11}$ characterized by substantially triangular shapes including one or more other substantially flat develop mirror shapes of quadrilaterals and polygons within said encompassing area of one or more neighboring said $F_7$ of said geometric shapes. The over lapping curve circle segment surface indentation deformations on the right were formed using a 9 cm diameter Petri dish and are representative of a seventh said mirror topology of said develop ordered mirror deformations comprising a selected network, $N_7$ having a plurality of substantially flat geometric curve shape ordered mirror facets $F_9$ comprising one or more selected same or different geometric curved shapes of one or more selected same or different sizes including a circle, a semicircle, a circular sector, a lune, an ellipse, an oval, including a lens; each of said shapes encompassing a selected said area on said surface bounded by one or more curved ridges $R_{12}$ having a plurality of develop mirror vertices $V_{12}$ distributed substantially equally spaced apart on said $R_{12}$, and each said $V_{12}$ having one or a plurality of adjacent outwardly directed and substantially straight develop mirror ridges $R_{13}$ said one $R_{13}$ emanating in a direction normal to the tangent at said $V_{12}$ on said $R_{12}$ meeting said surface, and said plurality of $R_{13}$ sharing a common said $V_{12}$ emanating outwardly directed at about the center between two congruent said $R_{13}$ in said direction normal to the tangent at said $V_{12}$ meeting said surface.

FIG. 8 are two 0.04 mm thick PTE mirror films. The mirror surface deformations in the left were formed using a various sized shapes of regular hexagons shape steel tools, which deformations is representative a sixth said mirror topology of said develop ordered mirror deformations comprising a selected network, $N_6$ having a plurality of substantially flat ordered mirror facets $F_7$, $F_8$, $F_9$, said $F_7$ comprising one or more selected same or different geometric mirror shapes of one or more selected same or different sizes, including polygons. The four indentation deformations on the right were formed using two different size circular sector wood forms is representative of a seventh said mirror topology of said develop ordered mirror deformations comprising a selected network, $N_7$ having a plurality of substantially flat geometric curve shape ordered mirror facets $F_9$ comprising one or more selected same or different geometric curved shapes of one or more selected same or different sizes including a circular sector, each of said shapes encompassing a selected said area on said surface bounded by one or more curved ridges $R_{12}$ having a plurality of develop mirror vertices $V_{12}$ distributed substantially equally spaced apart on said $R_{12}$, and each said $V_{12}$ having one or a plurality of adjacent outwardly directed and substantially straight develop mirror ridges $R_{13}$, said one $R_{13}$ emanating in a direction normal to the tangent at said $V_{12}$ on said $R_{12}$ meeting said surface, and said plurality of $R_{13}$ sharing a common said $V_{12}$ emanating outwardly directed at about the center between two congruent said $R_{13}$ in said direction normal to the tangent at said $V_{12}$ meeting said surface.

FIG. 9 are two 0.04 mm thick PTE mirror films (at left, at right). The mirror surface deformations on the left were formed using two different oval curve stainless food cutting tools, which are representative of a seventh said mirror topology of said develop ordered mirror deformations described above. The straight line and point indentations on the right were formed using a Luristan Bronze Age four pointed spike butted axe head, which patterns are representative of a third said mirror topology of said develop ordered mirror deformations comprising a selected mirror network, $N_3$ having a plurality of neighboring said $N_2$ network deformations distributed on said surface having said plurality of straight develop mirror ridges $R_2$ emanating from one or more different near-by said neighboring ordered mirror vertices $V_2$ outwardly and intersecting other said develop more develop ridges characterized by a plurality of substantially flat develop mirror facets $F_3$ of substantially triangular shapes including a plurality of one or more other substantially flat develop mirror shapes of quadrilaterals and polygons on said surface, said intersecting of ridges characterized by one or more intersections of develop mirror vertices $V_3$.

FIG. 10 is a 7 cm by 18 cm strip of 0.02 mm thick PTE mirror film with three mirror surface develop imposed indentation deformations in approximately 6 cm spaced apart relationship formed using a 1 cm by 1 cm cross-section shaped steel bar. Also, there are eight orderly imposed point indentation deformations formed using the 4.0 mm rounded end of a wooden No. 4 paint brush. All develop ordered deformations on the mirror film surface were imposed by indentations on the mirror film into a 1.5 cm deep Petri dish filled with 100% polydimethylsiloxane (a major polymer component of Silly Putty®) and correspond to virtual images FIG. 11 and the partial virtual image along the right vertical edge of FIG. 31, FIG. 152 and FIG. 155 of other-worldly transformed from real-world three-dimensional scenes.

FIG. 12 is an array of five 9 cm shaped disks that's 0.04 mm thick PFTE mirror film of corresponding five disks array virtual images positioned at top of FIG. 14. Four of the develop ordered deformations on the left are mirror film disks imposed by indentations (with a No. 2 pencil point) on the mirror film surface of increasing number of points from right to left of swirl patterns. The disk on the far right is of overlapping circle indentation deformations; whereas, all indentations on the left four disks were formed by imposed indentations (using a pencil point) into a 1.5 cm deep Petri dish filled with 100% polydimethylsiloxane (a major polymer component of Silly Putty®). The pencil point deformations are of a second said mirror topology of develop ordered mirror deformations comprising a selected mirror network, $N_2$, having a plurality of substantially flat develop mirror facets $F_2$ of substantially triangular shapes of a plurality of substantially straight develop mirror ridges $R_2$ sharing a common ridge of substantially equal adjacent angle to one another, said ridges $R_2$ emanating outwardly meeting said plane surface from a commonly joined shared ordered mirror vertex $V_2$; whereas the overlapping circle deformation on the far right is of a seventh mirror topology of develop ordered mirror deformations comprising a selected network, $N_7$ having a plurality of substantially flat geometric curve shape ordered mirror facets F comprising one or more selected same or different geometric curved shapes of one or more selected same or different sizes including a circle, a semicircle, a circular sector, a lune, an ellipse, an oval, including a lens; each of said shapes encompassing a selected said area on said surface bounded by one or more curved ridges $R_{12}$ having a plurality of develop mirror vertices $V_{12}$ distributed substantially equally spaced apart on said $R_{12}$, and each said $V_{12}$ having one or a plurality of adjacent outwardly directed and substantially straight develop mirror ridges $R_{13}$, said one $R_{13}$ emanating in a direction normal to the tangent at said $V_{12}$ on said $R_{12}$ meeting said surface, and said plurality of $R_{13}$ sharing a common said $V_{12}$ emanating outwardly directed at about the center between two congruent said $R_{13}$ in said direction normal to the tangent at said $V_{12}$ meeting said surface between two congruent said $R_{13}$ in said direction normal to the tangent at said $V_{12}$ meeting said surface.

In FIG. 13 are the same corresponding 6 disks appearing on the bottom array of FIG. 14 which is a photograph showing the fine detail colors of a three story house constructed of a red clay tile roof with reddish brown redwood planks and guardrails accenting the yellowish stucco walls, all against a blue sky. The 6 disks are of the develop ordered deformations formed by imposing indentations (with a No. 2 pencil point) on the mirror disks' film surface of increasing number of points from left to right starting with 2, 4, 8, 16, 32, and 64 point indentations on the far right disk. The effect of the virtual images of the 6 disks in FIG. 14 is subtle at first on the far left and dazzling at the far right end.

Virtual image FIG. 14 was taken during daytime in the parking space facing the front of three garage redwood plank doors with mirror film disks arrays FIG. 12 and FIG. 13 attached below and at top of FIG. 41. Under the middle lens shape (paper board) area of FIG. 14 is mirror film FIG. 41 mounted on a bottom board sandwiched on top by FIG. 12 and FIG. 13. The bottom support board was clipped to the back window of a parked motor vehicle. FIG. 14 show FIG. 41 extending beyond said board's top and bottom edges filled from left to right and from top to bottom. At its center lens area, and appearing on the disks of FIG. 12 and FIG. 13 is the other-worldly transformed virtual image of real-world three-dimensional scene (a panorama) of an entire front of a three story building structure in sunlight. The entire assemblage shown in color photograph FIG. 14 comprising six thin flexible elastic mirror film disks secured at top, five disks below, secured in place over (the top of) a very large mirror film FIG. 41 (136×84 cm), which in turned is secured on top of the larger paper board each being mounted one on top of the other using the same said blue masking tape as shown in FIG. 33. Since there are twelve virtual other-worldly scenes appearing on twelve different mirror film surfaces all attached to a real-world boards belonging to the real-world, FIG. 14 is therefore a real image of a real-world scene of twelve different virtual other-worldly images, which FIG. 14 is an augmented reality encompassing both a virtual (other-worldly) and a real-world scene as a whole.

Each of the twelve virtual (other-worldly) images are of the same real-world scene, as their mirror surfaces are facing, but have different topology deformations on their respective mirror surfaces.

FIG. 15 is a 5 cm by 8.5 cm sheet of 0.04 mm thick PTE mirror film with two circles develop ordered mirror indentation deformations including straight edge indentations formed on a block of gel material, which is representative of a second said mirror topology (described above) and a seventh said mirror topology of said develop ordered mirror deformations comprising a selected network, $N_7$ having a plurality of substantially flat geometric curve shape ordered mirror facets $F_9$ comprising one or more selected same or different geometric curved shapes of one or more selected same or different sizes including a circle, a semicircle, a circular sector, a lune, an ellipse, an oval, including a lens; each of said shapes encompassing a selected said area on said surface bounded by one or more curved ridges $R_{12}$ having a plurality of develop mirror vertices $V_{12}$ distributed substantially equally spaced apart on said $R_{12}$ and each said $V_{12}$ having one or a plurality of adjacent outwardly directed and substantially straight develop mirror ridges $R_{13}$, said one $R_{13}$ emanating in a direction normal to the tangent at said $V_{12}$ on said $R_{12}$ meeting said surface, and said plurality of $R_{13}$ sharing a common said $V_{12}$ emanating outwardly directed at about the center between two congruent said $R_{13}$ in said direction normal to the tangent at said $V_{12}$ meeting said surface. FIG. 15 comprises mirror film corresponding to virtual images FIG. 16, FIG. 17, FIG. 21, FIG. 23, center virtual image of FIG. 31, FIG. 50, FIG. and FIG. 156 of other-worldly transformed real-world three-dimensional scenes.

FIG. 18 is a 7.5 cm by 27.5 cm sheet of 0.02 mm thick PTE mirror film with 10 points of develop ordered mirror indentation deformations on said mirror film surfaces formed on a block of gel material, which is representative of a second said mirror topology of said develop ordered mirror deformations comprising a selected mirror network, $N_2$, having a plurality of substantially flat develop mirror facets $F_2$ of substantially triangular shapes of a plurality of substantially straight develop mirror ridges $R_2$ sharing a common ridge of substantially equal adjacent angle to one another, said ridges $R_2$ emanating outwardly meeting said plane surface from a commonly joined shared ordered mirror vertex $V_2$. FIG. 11 comprises mirror film indentations corresponding to other-worldly virtual images FIG. 19, FIG. 20, FIG. 22, FIG. 152 and FIG. 158 of other-worldly transformed from real-world tee-dimensional scenes.

FIG. 24 is a 27.9 cm by 21.6 can sheet of 0.04 mm thick PTE mirror film of develop disordered deformations representative of a first said mirror topology having six equal width ordered vertical Origami "Z" pattern deformations of equal width folds imposing long range order over develop disordered Crumpled deformations comprising a selected mirror network, $N_1$, having said plurality of substantially flat mirror facets, $F_1$, of substantially triangular shapes characterized by a plurality of substantially straight folded said mirror ridges, $R_1$, meeting at a plurality of said mirror vertices, $V_1$, and disorderly distributed spanning a wide range of size scales on said surface.

FIG. 25 and FIG. 26 are partial virtual images of a partial view of 25.5 cm by 28.5 cm and 0.04 mm thick mirror film FIG. 38 mounted on said curve wall having 14 vertical Origami "Z" pattern folds, 1 horizontal fold, and 2 Origami crisscrossing slant folds imposing long ranging order on develop disordered deformations.

FIG. 27 comprises a partial virtual image of mirror film FIG. 40 with Origami folds including squares, crisscrossing, slanting, and squash patterns mounted on said curve wall.

FIG. 28 comprises a 11.5 cm by 23.5 cm sheet of 0.04 mm thick PTE mirror film with develop disordered and hand formed partial parallel ordered Origami fold deformations (by twisting a rolled up column of film), which disordered deformations is representative of a first said mirror topology of said develop disordered mirror deformations comprising mostly of a selected mirror network, $N_1$, having said plurality of substantially flat mirror facets, $F_1$, of substantially triangular shapes characterized by a plurality of substantially straight folded said mirror ridges, $R_1$, meeting at a plurality of said mirror vertices, $V_1$, and disorderly distributed spanning a wide range of size scales on said surface.

FIG. 29 is a partial virtual image of partial mirror film FIG. 44, which in turn is the same mirror film of partial enlarged virtual image FIG. 37 of virtual image FIG. 29 mounted on said curve wall.

FIG. 30 comprises a cutting board having rule scale-divisions displaying representative materials and implements useful for imposing indentations on mirror film surfaces. Any item that's hard, rough, smooth, with a point, an edge, or irregular surface can be used to work the mirror film's surface into a soft material, including a gel, putty, foam, a packing material, a pillow, a cushion, or working it with the hands. Such can create interesting deformation patterns on the film forming into the plane (FIG. 47 thru FIG. 140 and FIG. 143 thru FIG. 167) out of the plane deformations (FIGS. 141 and 142) on the film's surface. The cutting board shows ½ inch rule scale-division markings use for cutting mirror films and on its top surface are various shapes and sizes of 39 kinds of tools suitable for use individually and in combinations for forming controlled deformation mirror film topology by band manipulation. Such tools and materials displayed are representative of only a few of the many different types of materials and implements useful as tools for imposing indentations of controlled developed order deformations on the mirror surface in combination with one or more soft supporting surfaces of materials of selected firmness (rigidity), such as gel (described at column 4, lines 8-36 in U.S. Pat. No. 4,369,284 of molded shapes including gel layers used in gel laminates, wrappings, and linings), including foams, and putty and the like of varying shapes, thickness, and surface area useful under large extended mirror film's selected surface area when forming extended continuous ordered deformations, as well as, under a smaller local area of said mirror films when forming more localized deformation indentations. A description of items used individually and in combinations having selected attributes for forming controlled deformations (of varying indentation depths of curves, lines, angles, shapes, patterns, points, and the like) on the cutting board follows: (1) three different sizes of clamps with different length and shaped angled edges use for forming controlled vertical ordered deformations and when use edge-wise or using its smooth slightly curved and blunt metal corners is useful for forming controlled extended lines that (as desired) crisscross (at any desired angle or looped over itself much like interstate connecting highways loops of intersections traversing the landscape connecting and directing traffic to other cities and towns) over other already formed indentation lines creating ordered deformations over the surface of mirror films; (2) three 100×15 mm Petri containers use for forming circular ordered deformations and using its bottom and top wall edges to form controlled indentation lines on mirror films, which edges can be turned at any angle on its circular axis creating a vertex stopping point and moved along heading in a different direction to form a continuous controlled line indentation deformation on a mirror film surface; (3) two gels (a square block and a cut cross-section from a fabric covered computer gel wrist rest) in open Petri-dish use for forming selected vertical ordered deformations on mirror films; (4) two steel bolts use for forming vertical ordered deformations and extended line ordered deformations over the surface of mirror film; (5) two small stainless steel hex head screws in an open Petri-dish use for forming vertical ordered deformations and extended line ordered deformations on mirror films; (6) a one 1-inch length K diameter steel dowel use for forming vertical ordered deformations and extended line ordered deformations on mirror films; (7) ten (various thickness) washers and spacers in open Petri-dish use for forming round deformations and used edge-wise for forming narrow and wide lines and small diameter curve ordered deformations on mirror films; (8) a ½ inch diameter ring magnet in open Petri dish use for forming circular ordered deformations and when use edge-wise to form extended line ordered deformations on mirror films; (9) two K inner diameter steel nuts use for forming controlled vertical ordered deformations and when use edge-wise to form controlled extended line ordered deformations on mirror films; (10) a copper penny in open Petri dish use for forming vertical circular ordered deformations and when use edge-wise to form extended line ordered deformations on mirror films; (11) three different size diameter helix steel sockets use for forming vertical circular ordered deformations and when use edge-wise to form extended line ordered deformations on mirror films; (12) a 2-inch square metal form use for forming controlled square shaped vertical ordered deformations and when use edge-wise to form controlled extended line ordered deformations on mirror films, its corners tilted to use forming one or more controlled short lines and sharp vertex as desired on mirror films; (13) one plastic electrical wire twist connector cap use for forming controlled vertical ordered deformations and when use edge-wise to form controlled extended line ordered deformations on mirror films; (14) three different type and size needle nose pliers use for forming controlled vertical ordered deformations and their blunt shaped handles use to form controlled extended wide lines of controlled ordered deformations on mirror films; (15) one steel chisel use for forming controlled vertical ordered deformations and when use edge-wise to form controlled extended line ordered deformations on mirror films; (16) two "T" shaped plastic handle molded and secured steel hollow helix screw screwdriver use for forming controlled vertical ordered deformations and when the steel tool end is used edge-wise to form controlled extended narrow line ordered deformations on mirror films, which tools' "T" shaped plastic molded handles is used for forming controlled wide curved channels of controlled horizontally formed ordered deformations on mirror films; (17) one steel crank-shaped with two 90° bent elbows shaped to receive and remove hollow helix screws use for forming controlled vertical ordered deformations with one end up and when use at its 90° elbow useful for forming controlled extended V-line ordered deformations on mirror films; (18) one clay and wax artist-dotting tool (having at one end a straight edge white plastic blade for blending seam) styluses at the other end a round steel ball tip with adjustable depth by twisting the said blade at the opposite end use for forming controlled vertical ordered deformations with both ends and use to form controlled extended line ordered deformations with the steel ball end on mirror films; (19) a Miller Coburn bone file having a large square rounded handle end use for forming controlled extended broad horizontal line ordered deformations on mirror films; (20) an Aufricht rasp coarse serrated curved bone file with a finger ring handle end, while file end use for forming controlled vertical ordered deformations and when use said finger handle end to form controlled extended line ordered deformations on mirror films; (21) a Petri bone rasp curved round blade use for forming controlled extended broad horizontal line ordered deformations on mirror films; (22) an electrical wire connector end cap use for forming ordered circle deformations on mirror films and with the cap's end use to form controlled extended wide horizontal line ordered deformations on mirror films; (23) two 6½ inches length wood triangular shapes use for forming controlled extended broad and narrow continuous horizontal line ordered deformations on mirror films, as well, as triangular vertical controlled ordered deformation on mirror films; (24) a container full of silicone putty inside cover Petri-dish when a small amount or much larger quantity of putty is flattened evenly over a large surface area with a roller and mirror film place on top is use for forming controlled horizontal line ordered deformations on the surface of mirror films with said tools; (25) a foam cube being representative of foams use for forming controlled vertical ordered deformations on mirror films and a thinner larger area foam layer use for forming controlled extended line ordered deformations on mirror films; (26) a fabric-gel wrist rest cut cross-section (comprising black fabric composite gel) being representative of gel-fabric composites use for forming controlled vertical ordered deformations on mirror films and a thinner larger area gel-fabric composite layer use for forming controlled extended line ordered deformation on mirror films; (27) a clear gel cube block being representative of soft materials use for forming controlled vertical ordered deformations on mirror films and a thinner larger area gel layer use for forming controlled extended line ordered deformation on mirror film; (28) a plastic drinking straw use for forming controlled circles of ordered deformations on mirror films; (29) a 1.2 inch diameter thin metal tube use for forming circles of ordered deformations on mirror films; (30) a ½ inch diameter wood rod use for forming controlled extended broad horizontal line ordered deformations, as well as use for forming vertical circle ordered deformations on mirror films; (31) a rectangular plastic box with lid attached use for forming controlled square ordered deformations on mirror films in multiple ways: (a) in its close configuration pressing on a mirror film over a soft materials such as gel or gel-fabric composite forms a shallow square impression on mirror film, while with the cover removed, applied pressure will form a much deeper or enhanced square impression on mirror film. Also multiple overlapping (off set close and far apart clockwise twists, parallel, and off-set at a selected angles) formed squares of controlled ordered deformations on mirror surfaces create different interesting artistic effects. The edges of the box is use to form lines (short and extended line) controlled ordered deformations on mirror films. The corner of the box is use for forming controlled ordered vertex deformations on mirror films; (32) a Petri dish with cover use for forming controlled extended broad rolled lines of ordered deformations on mirror films; (33) a 9 inches square steel rod use for forming controlled extended broad horizontal line ordered deformations with its edges and vertically small squares on mirror films; (34) a 12 inches wood rod use for forming controlled extended broad horizontal line with its rod edge and extended long curved ordered deformations on mirror films; (35) a painting scroll end cap roller use for forming controlled extended broad horizontal line ordered deformations, as well use for forming concentric circle shapes on mirror films; (36) two metal cylinders use for forming controlled extended broad horizontal line and different concentric circles of controlled ordered deformations on mirror films; (37) one dark brown plastic container with corresponding white plastic cap positioned at the opposite end of the cutting board use for forming controlled extended broad horizontal lines with their edges and concentric circles of ordered deformations on mirror films; (38) a one 1 inch steel triangular scraper use for forming controlled extended broad horizontal line ordered deformations and three vertex individual and overlapping pattern shapes on mirror films; and the last of these representative tools is (39) a food carving tool having two ends, one curved shaped and the other V-shaped for forming ordered deformations on mirror film surface; (40) a yellow "Y" shaped highlight marker pen being most versatile, can be held firmly in one hand between the fingers having a smooth cone shaped smooth cap tip use for forming point deformations, as well as, controlled extended well defined horizontal heavy, sharp, and light straight and curved lines demarking change of directions and flair ending strokes much like using a pencil drawing formed on paper forming ordered deformations on mirror films that's performed controllably over the surface of mirror films without evidence of hesitations, without puncturing and cutting into the mirror films' surfaces, an ideal tool for the deformation mirror film artist adopting the present novel method of using everyday common items as tools of creating art forming controlled developed disordered deformations (using above described crumpling containers) and ordered deformations on mirror film surfaces formed with said tools.

FIG. 31 comprises virtual images (FIG. 15 appearing at its center and partial virtual images FIG. 10 appearing along its right vertical edge, including other virtual images at the top, left bottom corner, and bottom center) all adjustably attached to a board (in said room) supported by a portable picture stand. Although all virtual images are facing in the same real-world scene direction, none of the other-worldly transformed from virtual images appears alike. This is because the many deformations on those smaller mirror films' plane surfaces are independently reflecting light from different parts of the same scene to the observer from different directions. An observer walking around such ordered and disordered mirror film deformations sees (or may capture using a still camera or video device, such as a camera phone with both functions and play the scene back for viewing) an ever changing reflected scene(s) over the entire area of the room of light from objects reflected by said stand holding such smaller mirror films' surfaces, no matter the scope of the person's gaze being wide or narrow. Said stand holding said card with adjustably mounted small mirror films can be easily positioned for presentation facing one or more much larger mirror film(s) mounted on said curve wall, which stand mounted with smaller mirror films serves as a said second mirror film in face-to-face relation with said larger first mirror film surface of a virtual image scene of said room (in other words) comprising a scene of a virtual image of a same said scene in a second different said mirror surface spaced apart in face-to-face relation with said first said mirror surface facing towards said scene. As seen by an observer, the larger mirror film being mounted on said curve wall will show a virtual image of said small mirror film's virtual image of said larger film's virtual image of said room that contains the small mirror film and its stand with a virtual image of the presentation of the area (space) of the room that's behind it. Depending on the characteristics of the ordered and disordered deformations of the large and small mirror films and said stand, which may not be recognizable as the virtual images may comprise bits and pieces of the respective presentations of the said room differently, which bits and pieces are repeatedly transformed into other-worldly virtual views respectively. Since there are six virtual other-worldly scenes appearing on different mirror film surfaces all attached to a real-world large board belonging to the real-world, FIG. 31 is therefore a real image of a real-world scene of six different virtual other-worldly images, which FIG. 31 is an augmented reality encompassing both a virtual (other-worldly) and a real-world scene as a whole. Each of the six virtual (other-worldly) images are of the same real-world scene, as their mirror surfaces are facing, but have different topology deformations on their respective mirror surfaces.

FIG. 32 comprises a partial virtual image of partial mirror film FIG. 45 of what looks like small gold objects or coins pouring out of an oats container being held up by a virtual mechanical gripping hand device holding said container of oats. Below are cans of a popular soup and cornstarch in yellow containers. FIG. 32 is a real image picture of a wide view of virtual image obtained with a 12-× zoom lens still digital camera (having video capabilities) at a far distance from the mirror film's surface FIG. 45 mounted on said curve wall.

FIG. 33 comprises a virtual image of both a partial view of large (109 cm×137 cm and 0.02 mm thick mirror films FIG. 42 (background view at left and bottom edges) and FIG. 39 (foreground view at middle and upper right), which smaller mirror film FIG. 39 is attached to a board being held in place by said blue tape attaching the sides of said board onto a larger said mirror film FIG. 42 (of disordered and ordered deformations) mounted horizontally on said curve wall. Both the said mirror films FIG. 39 and FIG. 42 corresponding to foreground FIG. 33 virtual image and its background virtual image are facing in the same direction, but these virtual images tell another story of the same scenery facing them, which are effects of the different characteristics of forming of each of the deformations of said mirror films. This is another example of a smaller mirror film (FIG. 39) being secured to vertically positioned larger mirror film (FIG. 42) using said tape. Since the blue tape, green stickers and board are objects belonging in the real-world, FIG. 33 is therefore a real image of a real-world scene. However, FIG. 33 is also of an augmented reality that encompasses both a virtual (other-worldly) and a real-world scene imageries as a whole. Each of the two virtual (other-worldly) images are of the same real-world scene, as their mirror surfaces are facing, but have different topology deformations on their respective mirror surfaces.

FIG. 34 comprises a partial virtual image of a partial mirror film FIG. 42 with develop disordered deformation having 31 Origami "Z" long ranging ordered deformation folds imposed on said disordered deformations, which mirror film is mounted on said curve wall.

FIG. 35 comprises a partial virtual image of a partial mirror film FIG. 42 with develop disordered deformation having 31 Origami "Z" long ranging horizontal ordered deformation folds imposed on said disordered deformations, which mirror film is mounted on said curve wall.

FIG. 36 comprises a partial view of a 50 cm×90 cm and 0.04 mm thick virtual image of a partial disordered deformation mirror film FIG. 43 with 9 vertical Origami "Z" pattern long ranging folds of 10 cm equal widths mounted on said curve wall.

FIG. 37 comprises a selected enlarged area of virtual image FIG. 29 of mirror film FIG. 44 mounted on said curve wall.

FIG. 38 comprises a 25.5 cm×28.5 cm and 0.04 mm thick develop disordered deformation mirror film corresponding to virtual images FIGS. 25 and 26 with 14 Origami "Z" pattern vertical folds, 1 horizontal fold, and 2 crisscrossing slant Origami folds mounted on said curve wall. Since the blue tape and board are objects belonging in the real-world FIG. 38 is therefore a real image of a real-world scene. However, FIG. 38 is also of an augmented reality that encompasses both a virtual (other-worldly) and a real-world scene imageries as a whole. Each of two virtual (other-worldly) images are of the same real-world scene, as their mirror surfaces are facing, but have different topology deformations on their respective mirror surfaces.

FIG. 39 comprises a 21 cm×68 cm and 0.04 mm thick mirror film of foreground virtual image FIG. 33 (at center right) with nine ordered point indentations imposed on said mirror film's surface. Said mirror film is laminated on the reverse to a sheet of No. 5164 Avery® pressure sensitive addressing & shipping adhesive labels by passing both (mirror film and sheet of adhesive labels) through the roller of a PC794 Canon® copier forming irreversible deformations (of smaller than 1 millimeter size roughness patterns) caused by nipping or squeezing of the soft pressure adhesive sandwiched between the said adhesive coated sheet label paper and said mirror film, which mirror film is attached to a 27 cm×36 cm and 0.20 mm thick card paper mounted horizontally on the surface of mirror film FIG. 42, which in turn is mounted on said curve wall.

FIG. 40 comprises a partial view of a 60 cm×62 cm and 0.04 thick mirror film of partial virtual image FIG. 27 with ordered deformation Origami folds including squares folds, crisscrossing folds, slanting folds, squash folds, and a square area of the sheet held at a center point and crumpled spreading outward, which film was mounted on said curve wall.

FIG. 41 comprises a partial view of a 136×84 cm and 0.02 mm thick mirror film of partial virtual image FIG. 14 (of ordered squares and rectangles deformations imposed on develop disordered deformations appearing in the middle lens shaped area and outward behind and beyond the tops and bottoms of said virtual image disks arrays extending to the image's outer edges), which mirror film was mounted on said curve wall.

FIG. 42 comprises a partial view of disordered deformations on a 109 cm×137 cm and 0.02 mm thick mirror film of partial virtual images FIG. 33 (at background left and bottom), and of partial virtual images FIGS. 34 and 35, which mirror film is imposed with 5 horizontal and 30 vertical Origami ordered deformation "Z" pattern folds and mounted on said curve wall.

FIG. 43 comprises a partial view of disordered deformation on a 67 cm×49 cm and 0.04 mm thick mirror film corresponding to partial virtual image FIG. 36, which film is imposed with 9 vertical Origami ordered "Z" pattern folds of equal spaced 10 cm width and mounted on said curve wall.

FIG. 44 comprises a partial view of a 192×134 cm and 0.04 mm thick mirror film corresponding to partial virtual image FIG. 29 and its enlarge corresponding virtual image FIG. 37, which mirror film was mounted on said curve wall.

FIG. 45 comprises a partial view of a 120 cm×192 cm and 0.04 mm thick mirror film corresponding to partial virtual image FIG. 32, which mirror film was mounted lengthwise on said curve wall.

FIGS. 25-27, FIG. 29, FIGS. 33-37, and FIGS. 47-167 are illustrative of the fine virtual image details that can be achieved by using the methods of forming ordered and disordered deformations over very large areas of mirror film displays creating controlled fine extended line indentation impressions with a ballpoint pen (smooth low friction tool) capable of providing very large format museum wall installations as exemplified in augmented museum reality setting FIGS. 85-90.

Figure 125:

The mirror film of FIG. 125 is of extended line impression of another ball point pen rendered foot print facing a different scene.

Figure 52:
Figure 53:
Figure 54:
Figure 55:
Figure 56:
Figure 57:
Figure 58:
Figure 59:
Figure 60:
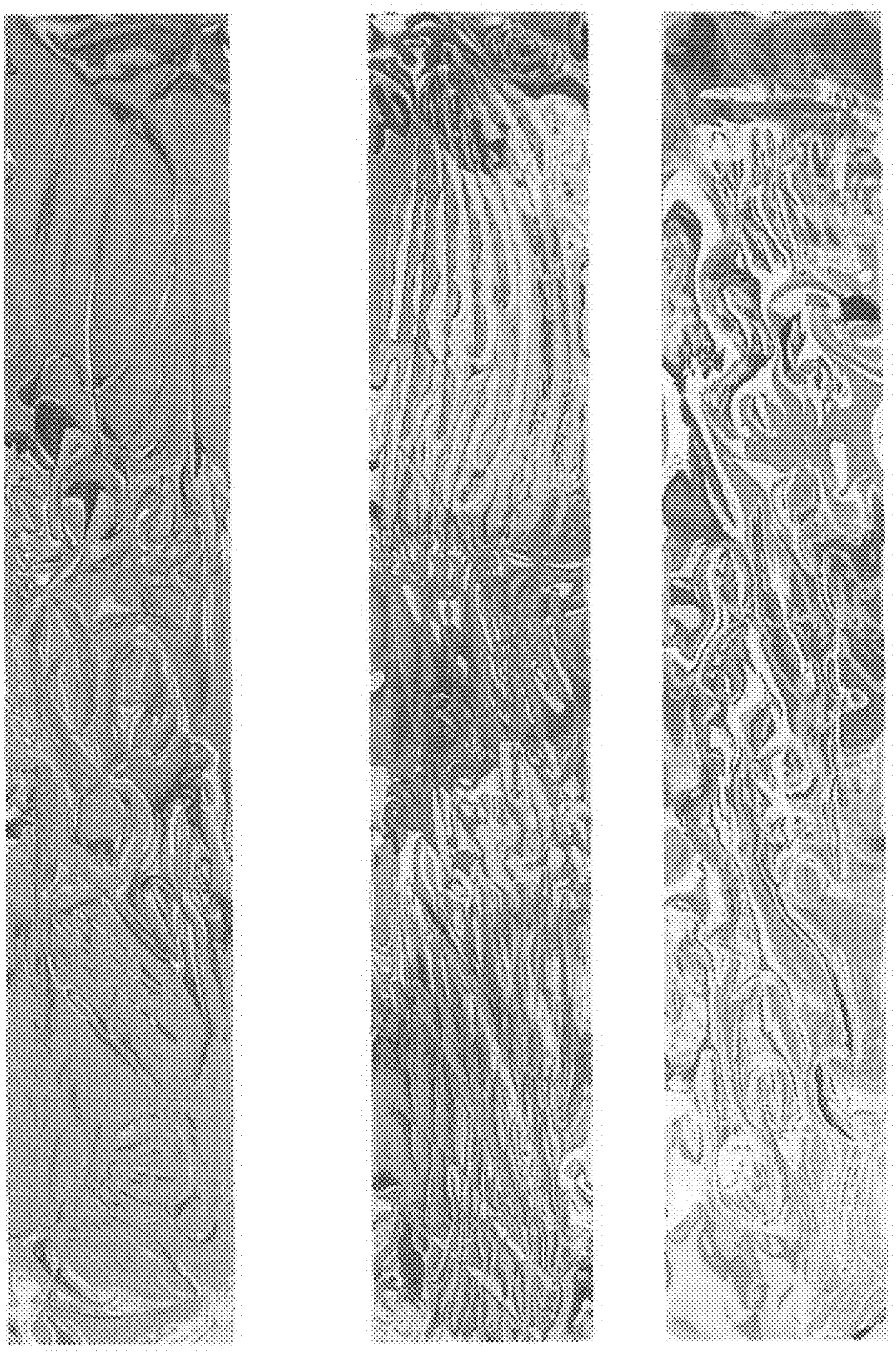
Figure 61:
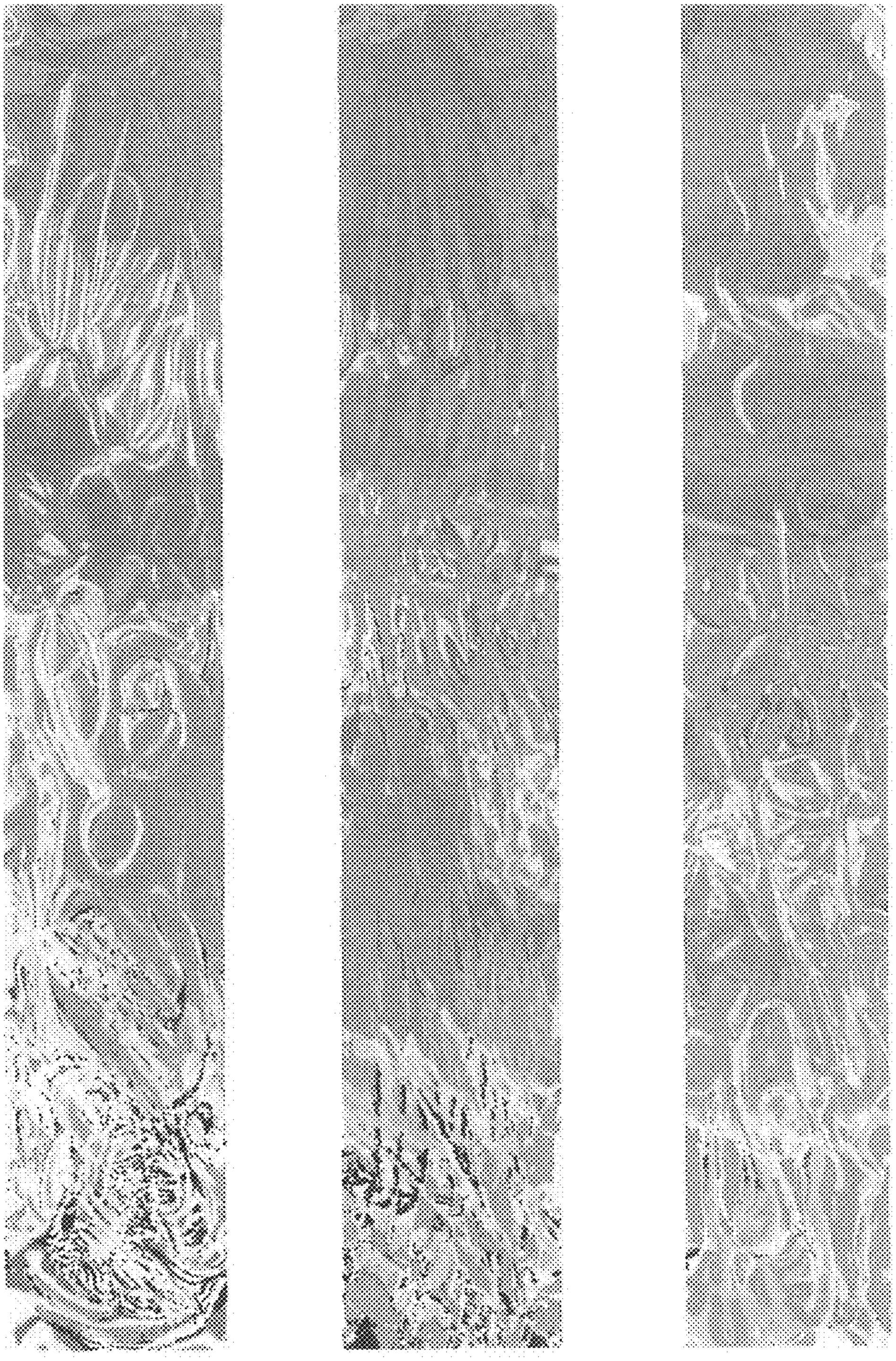
Figure 62:
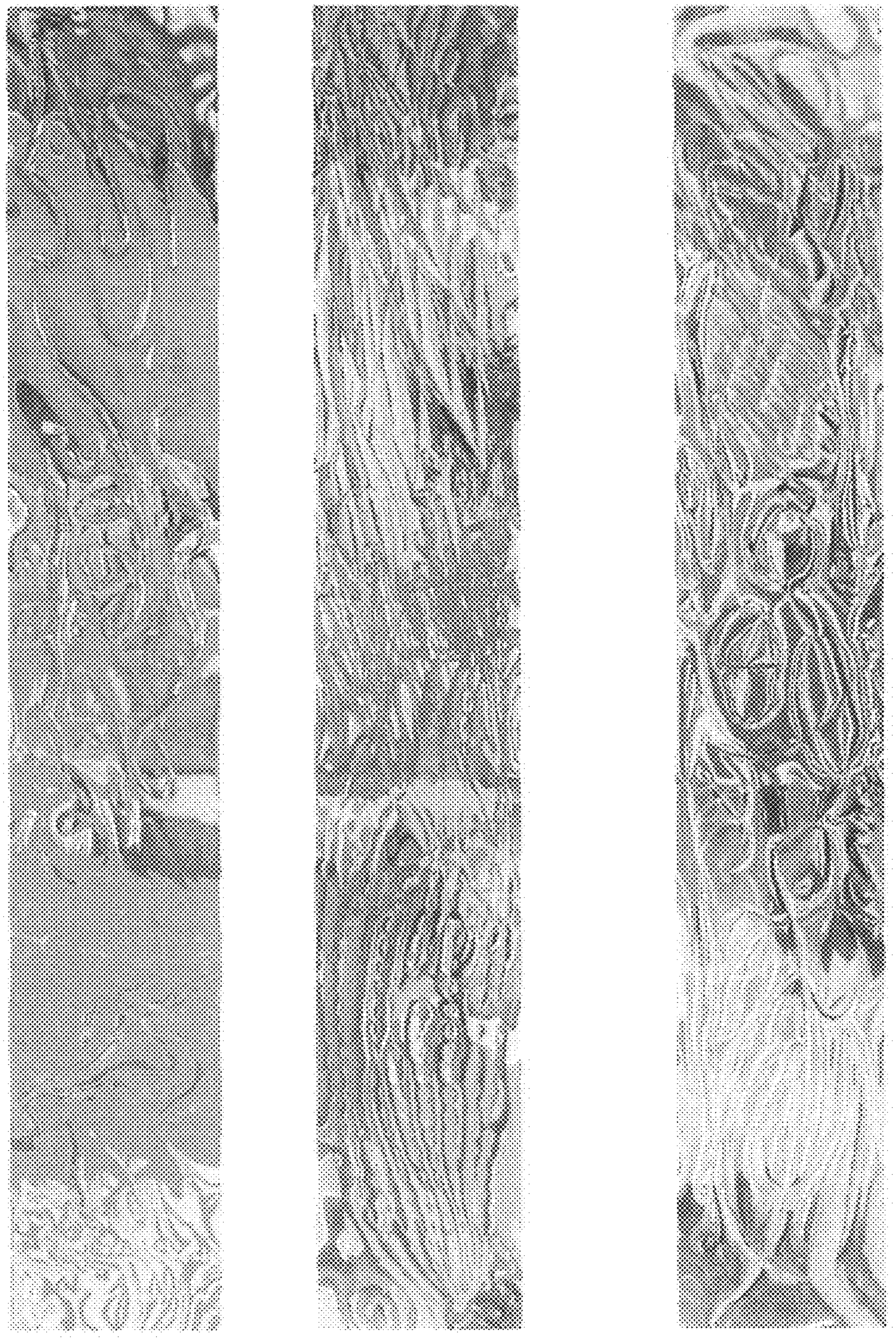
Figure 63:
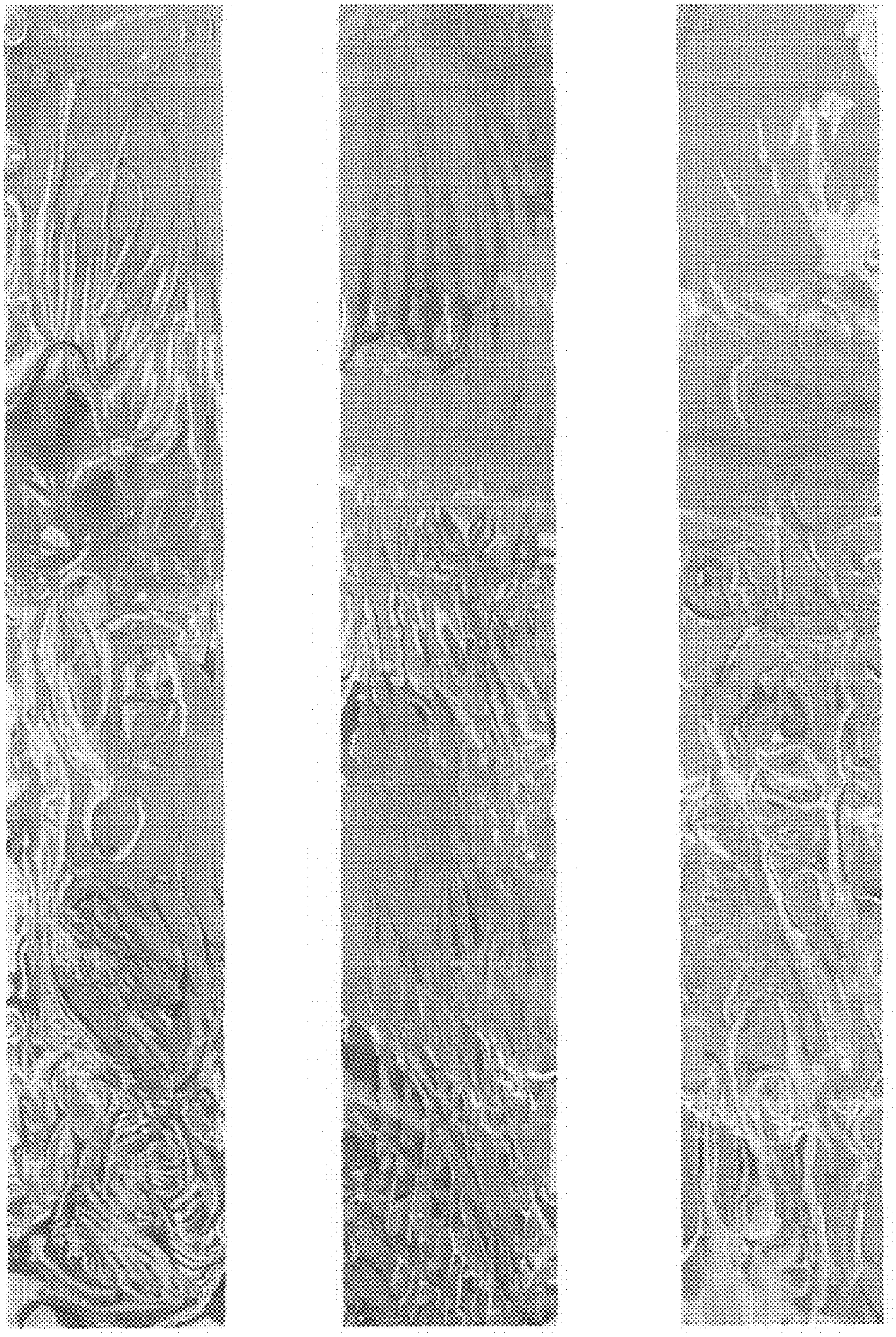
Figure 64:
Figure 65:
Figure 66:
Figure 67:
Figure 68:
Figure 69:
Figure 70:
Figure 71:
Figure 72:
Figure 73:
Figure 74:
Figure 75:
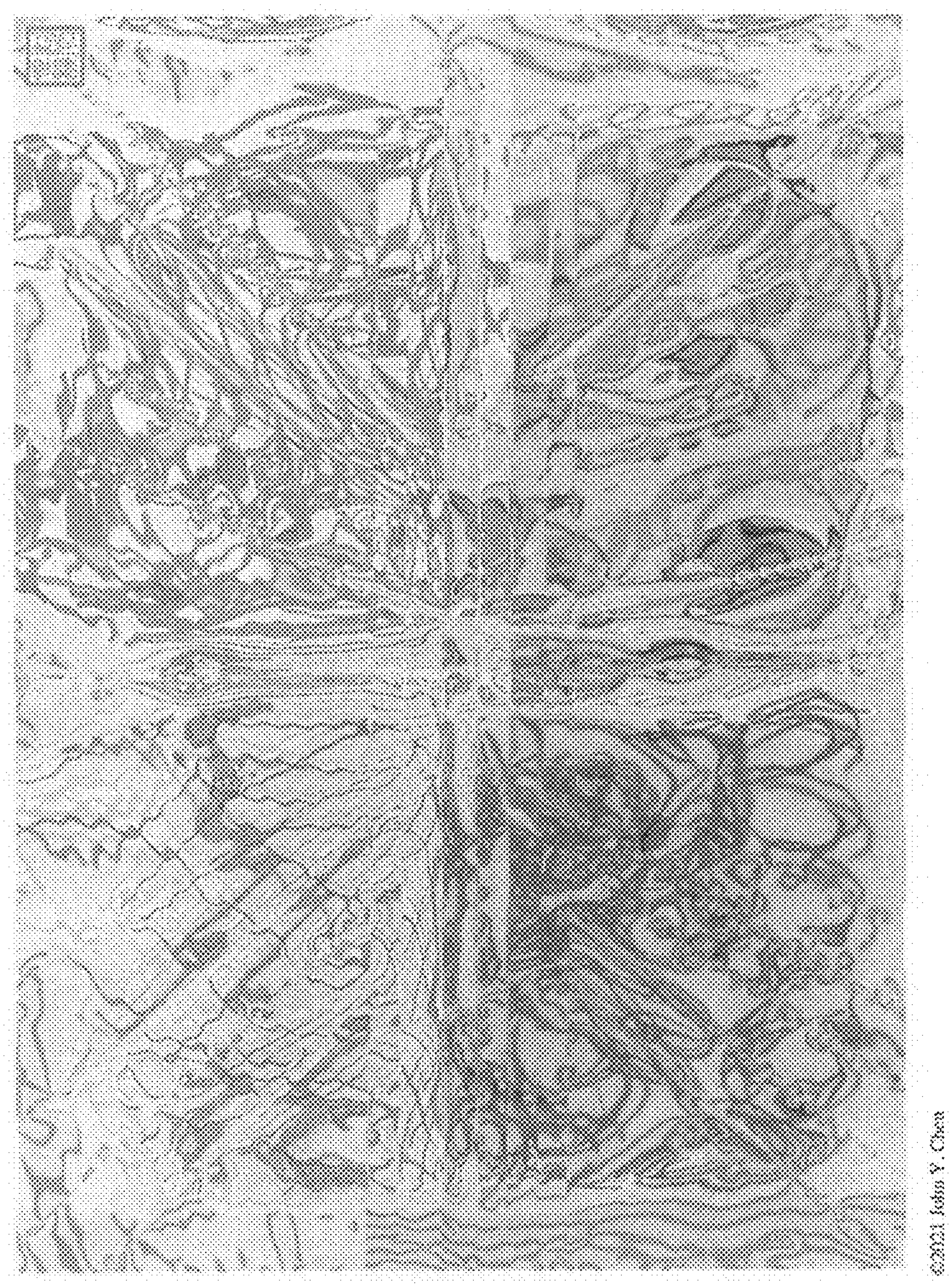
Figure 76:
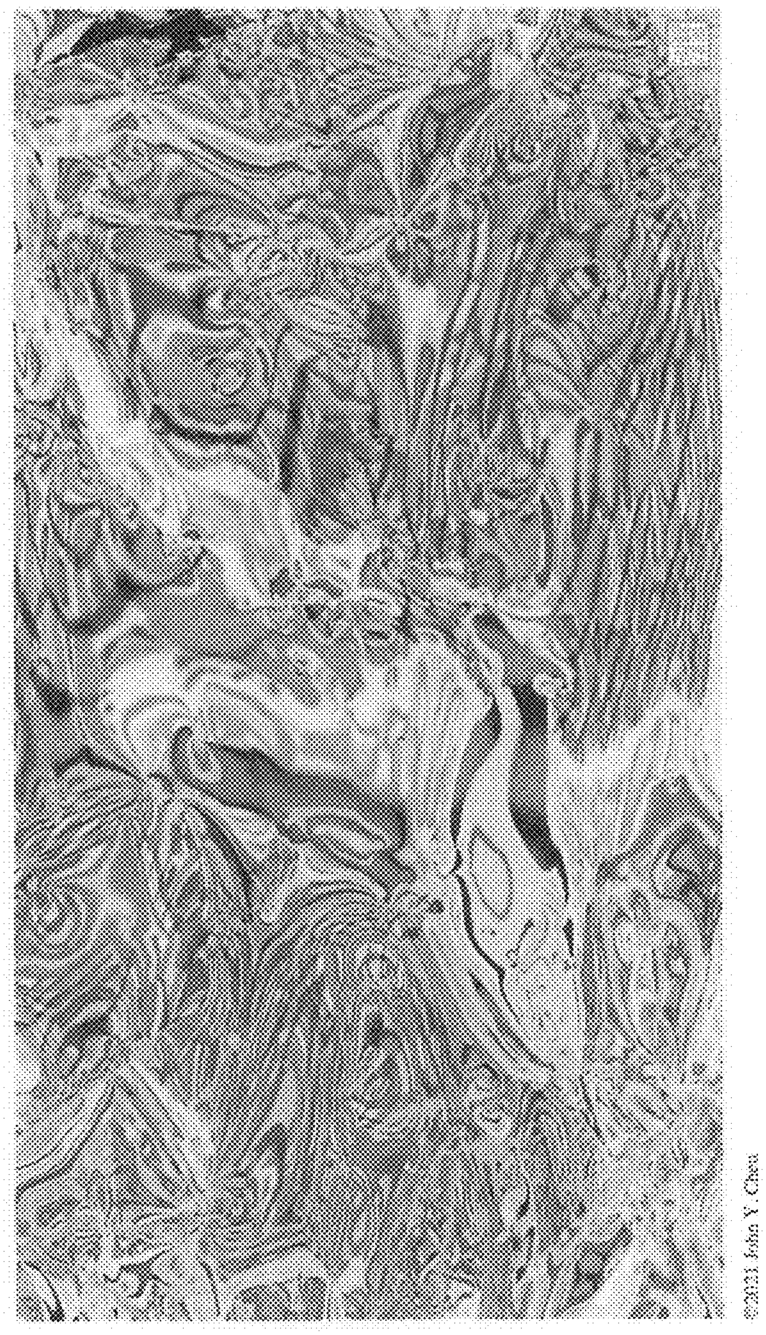
Figure 77:
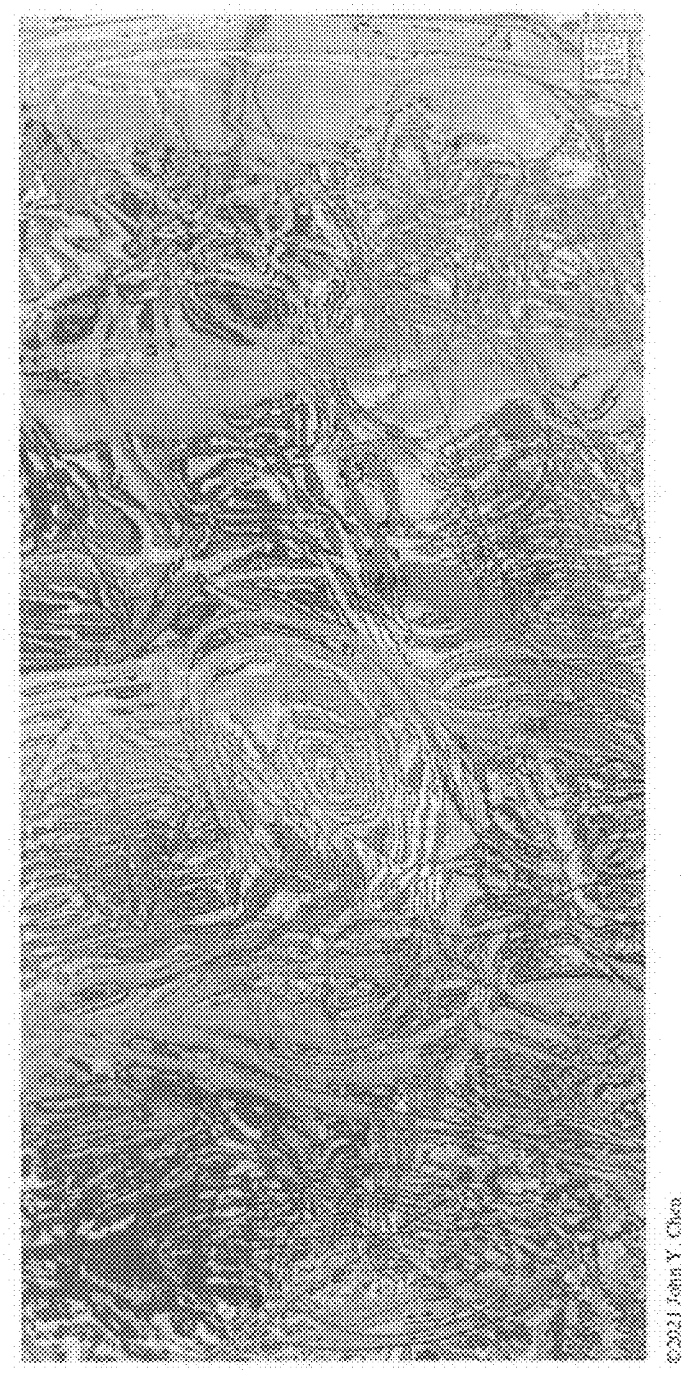
Figure 78:
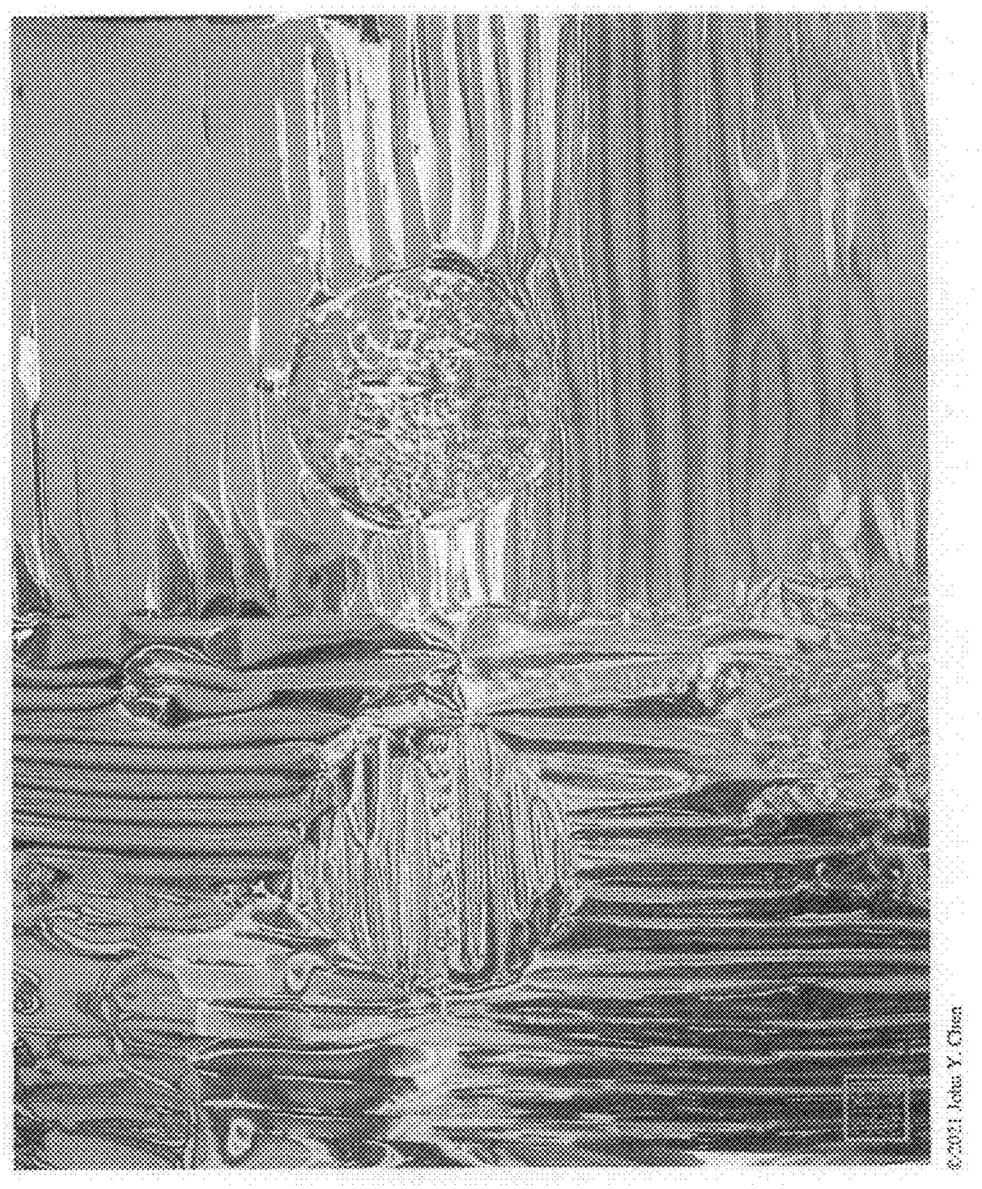
Figure 79:
Figure 80:
Figure 81:
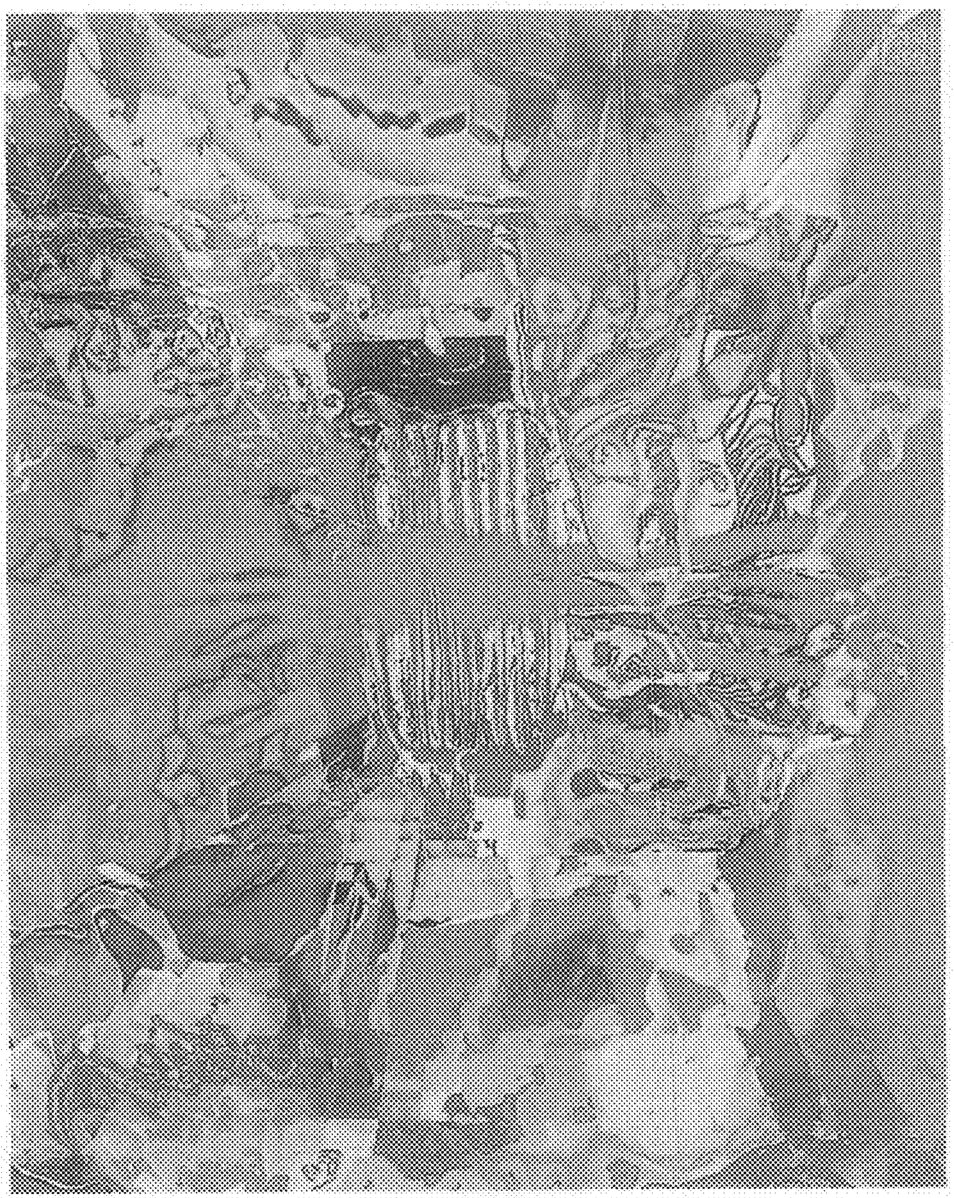
Figure 82:
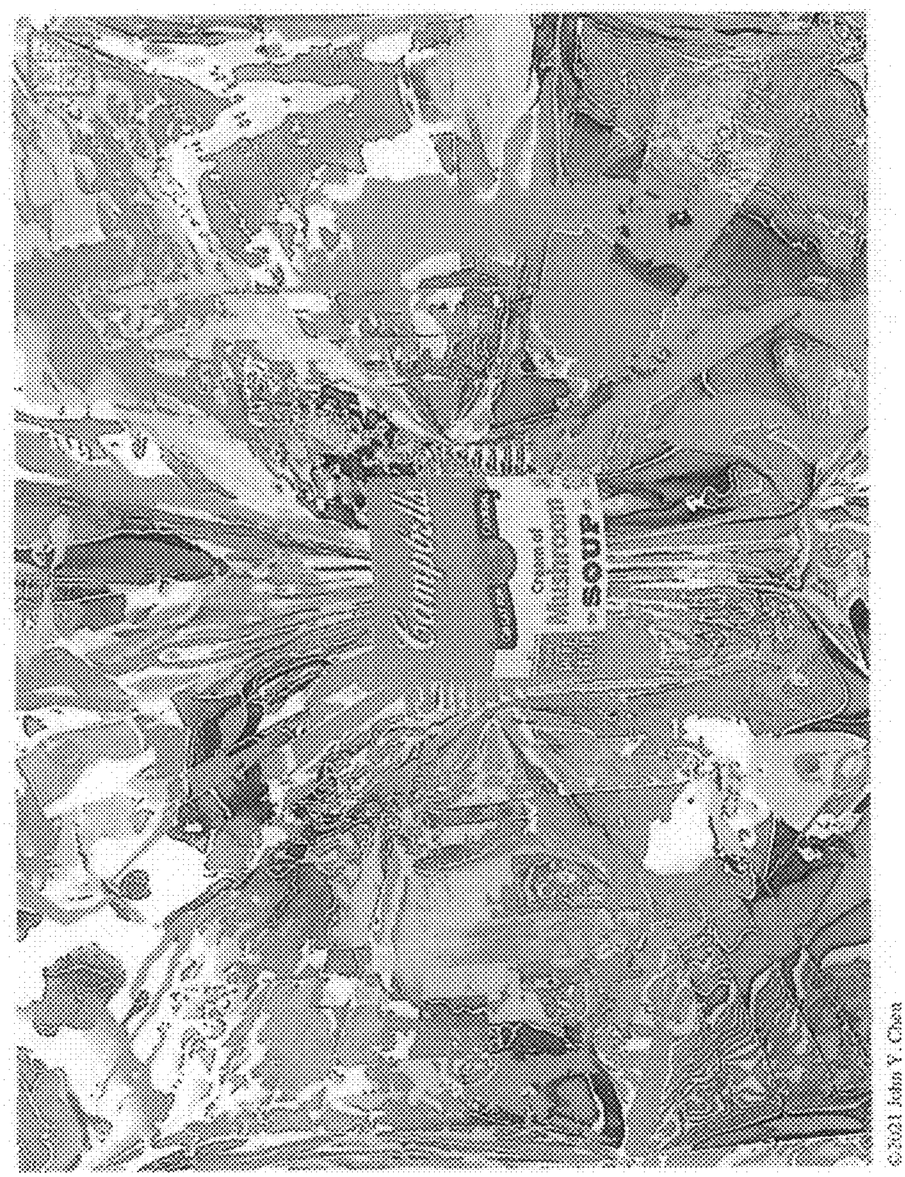
Figure 83:
Figure 84:
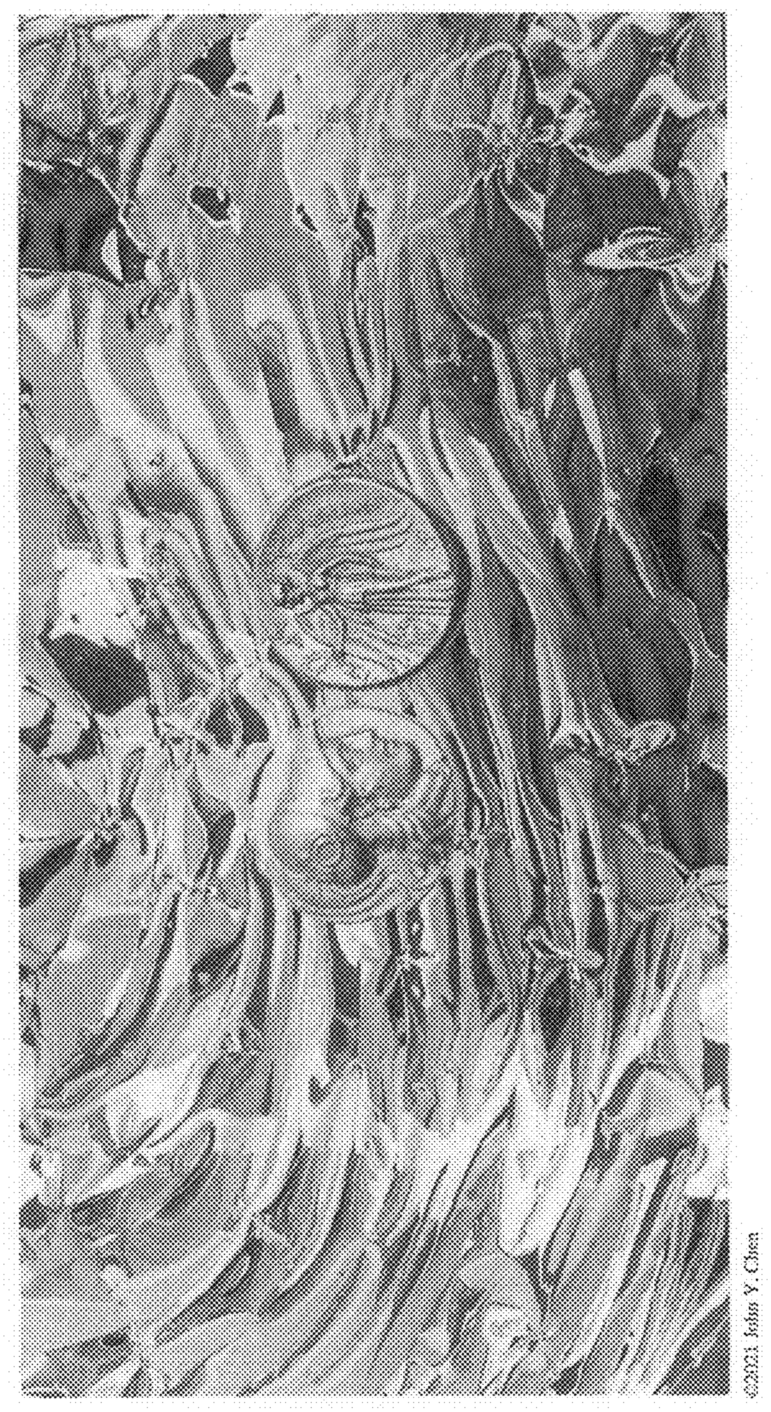
Figure 85:
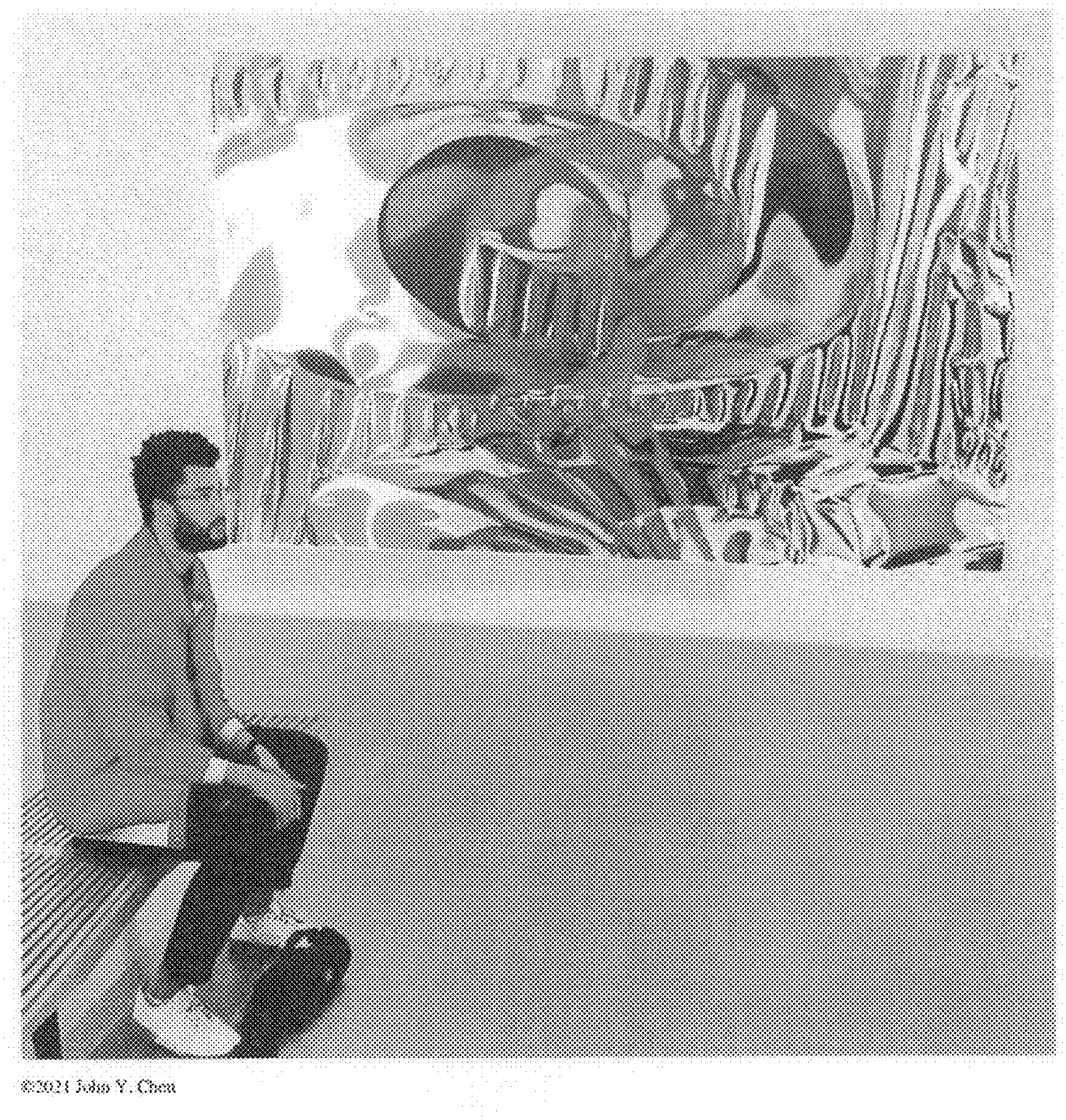
Figure 86:
Figure 87:
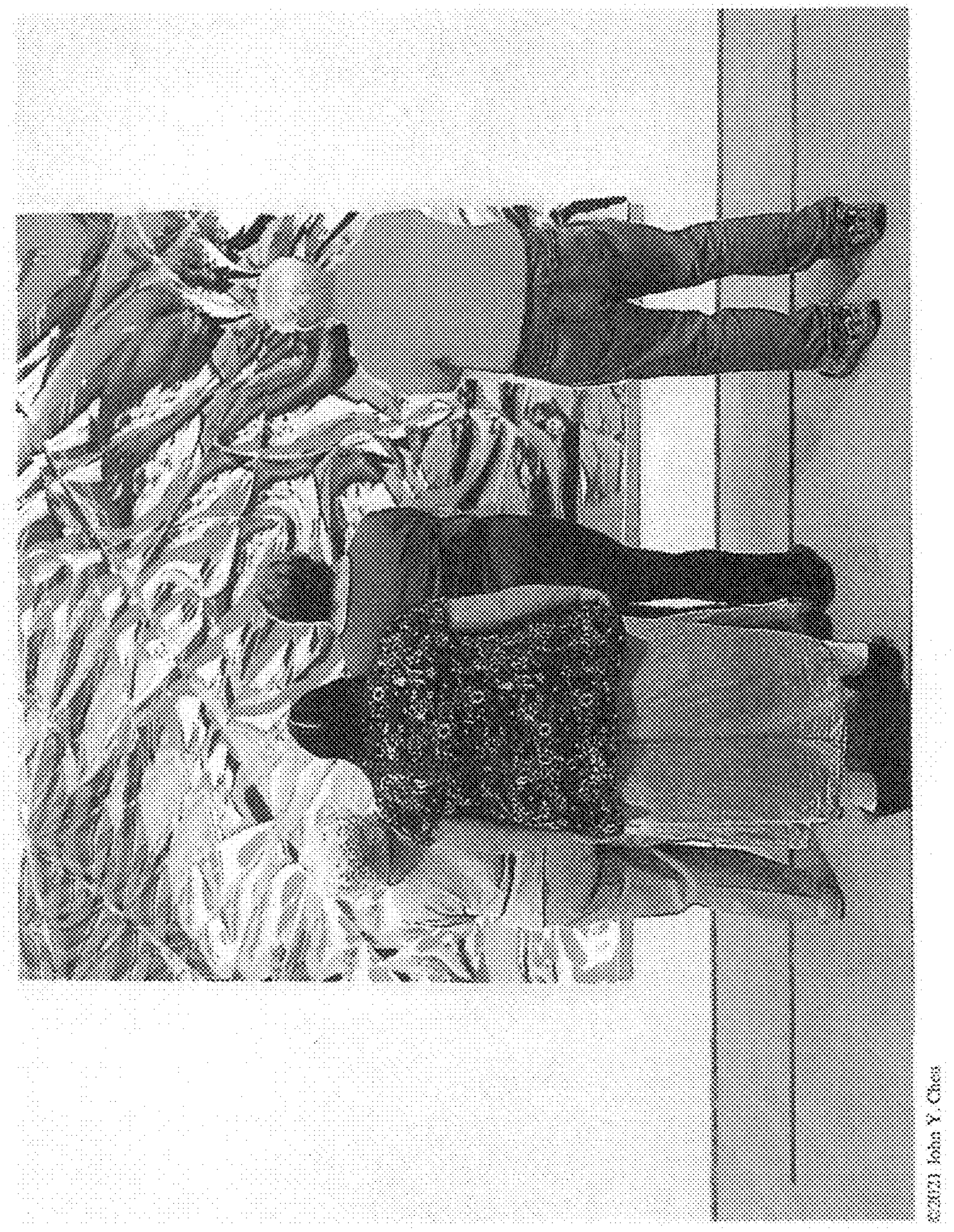
Figure 88:
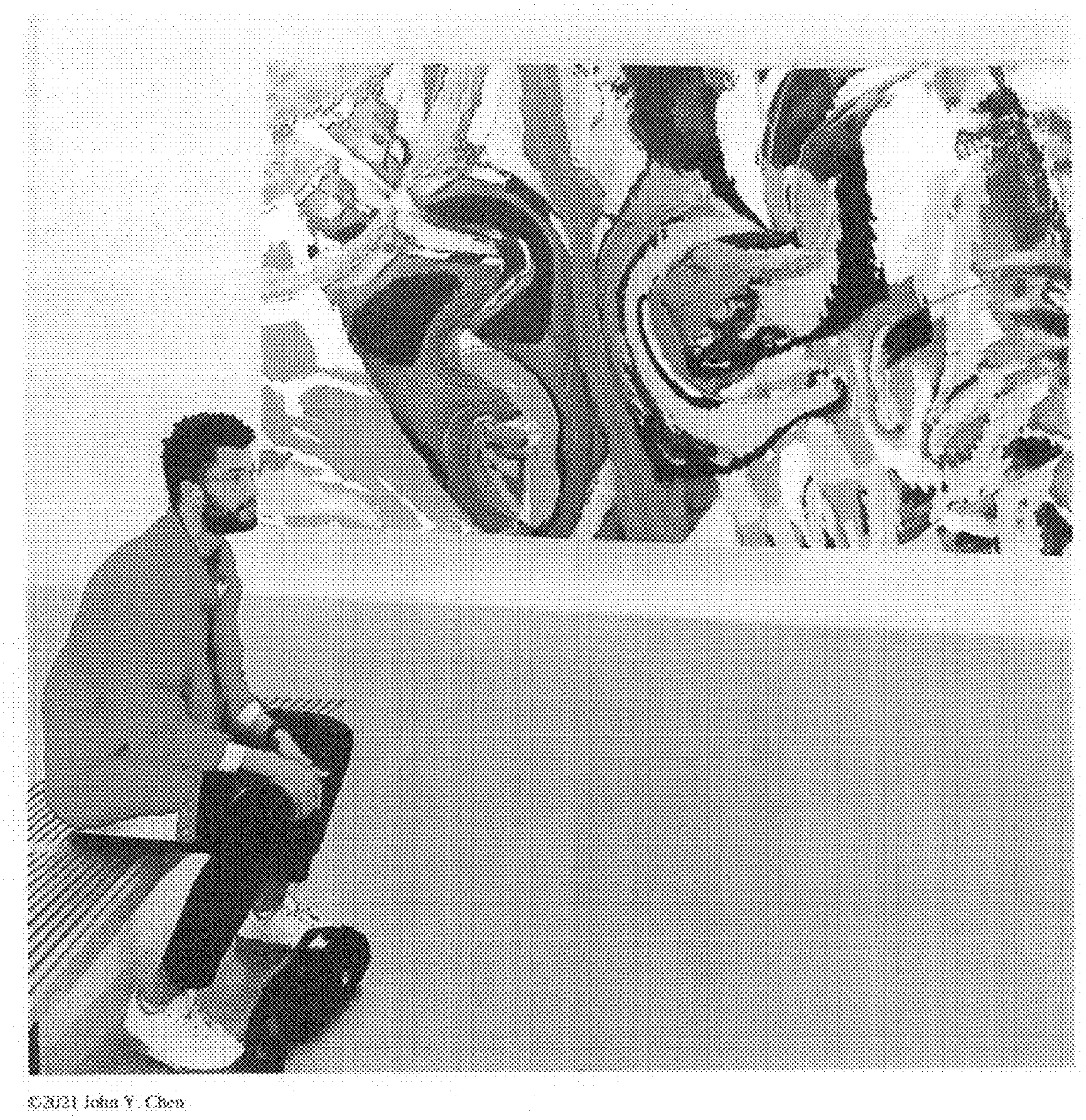
Figure 89:
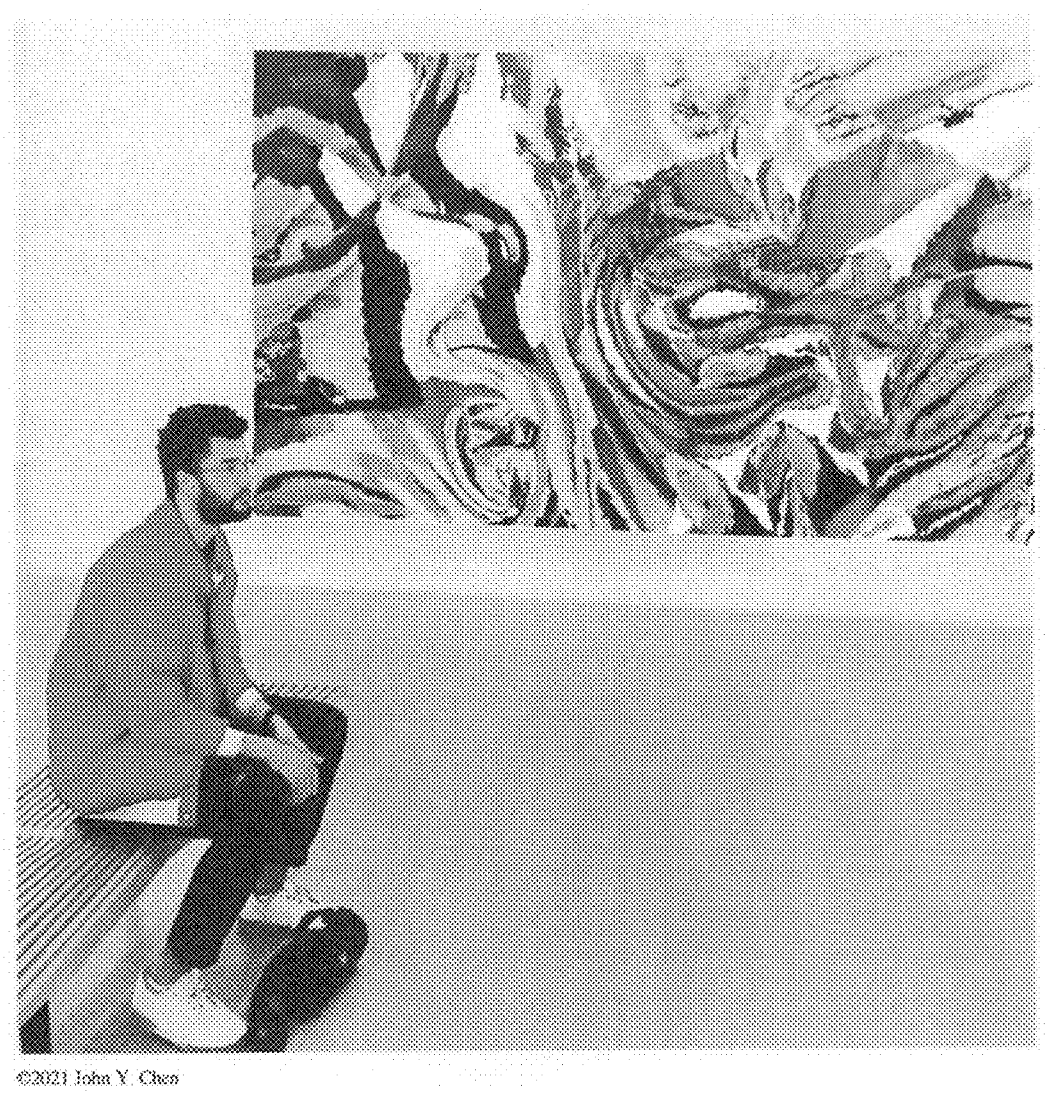
Figure 90:
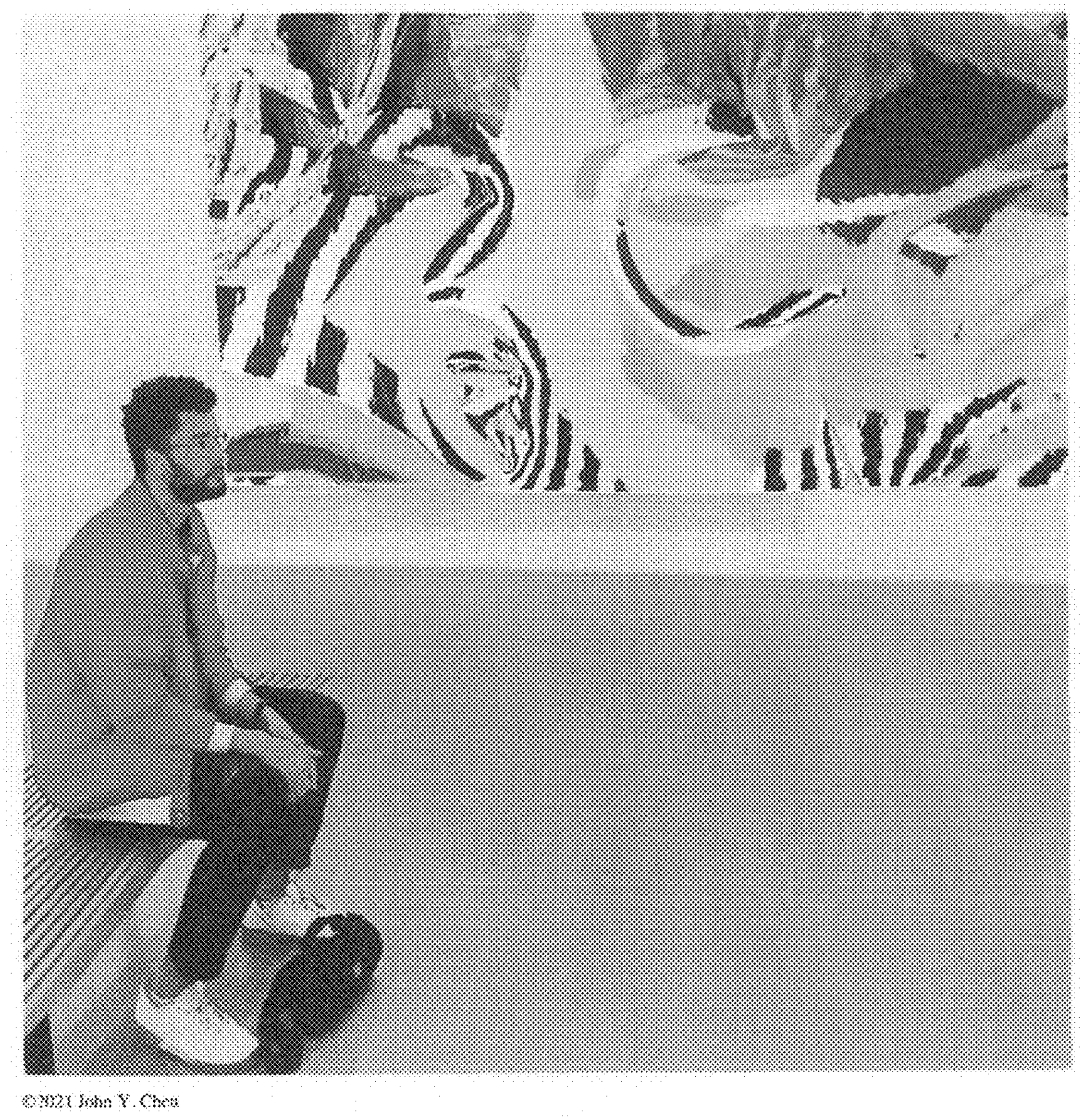
Figure 91:
Figure 92:
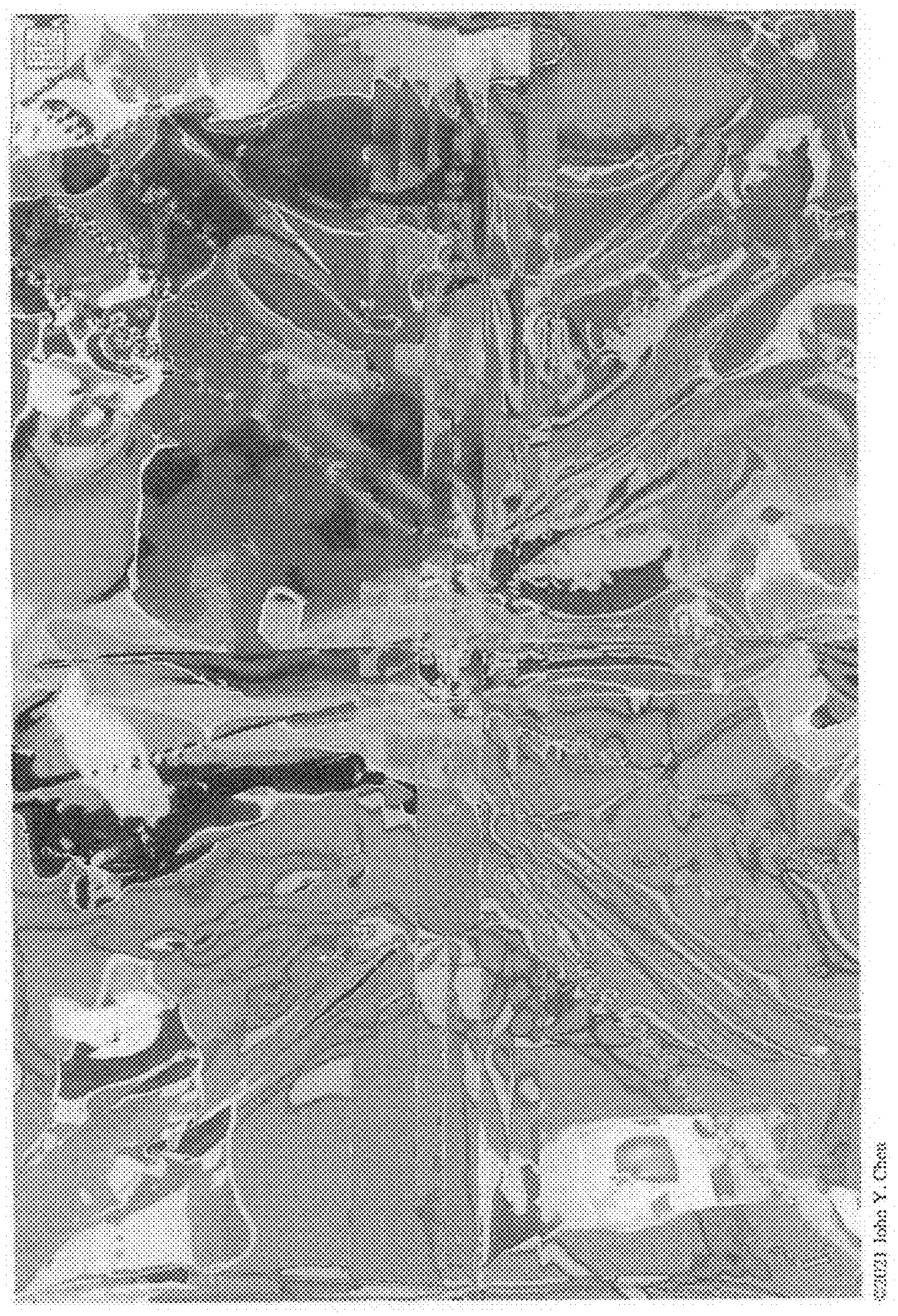
Figure 93:
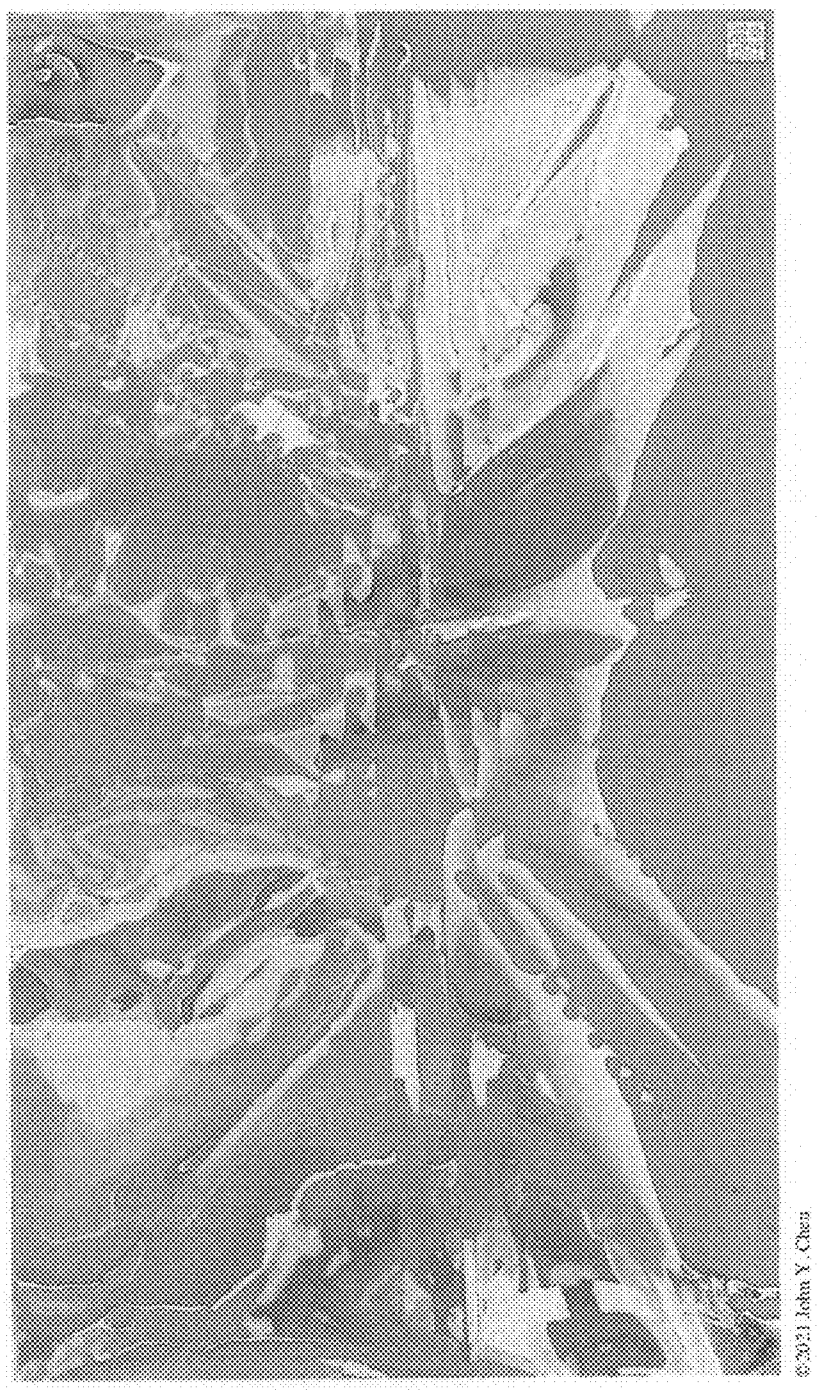
Figure 94:
Figure 95:
Figure 96:
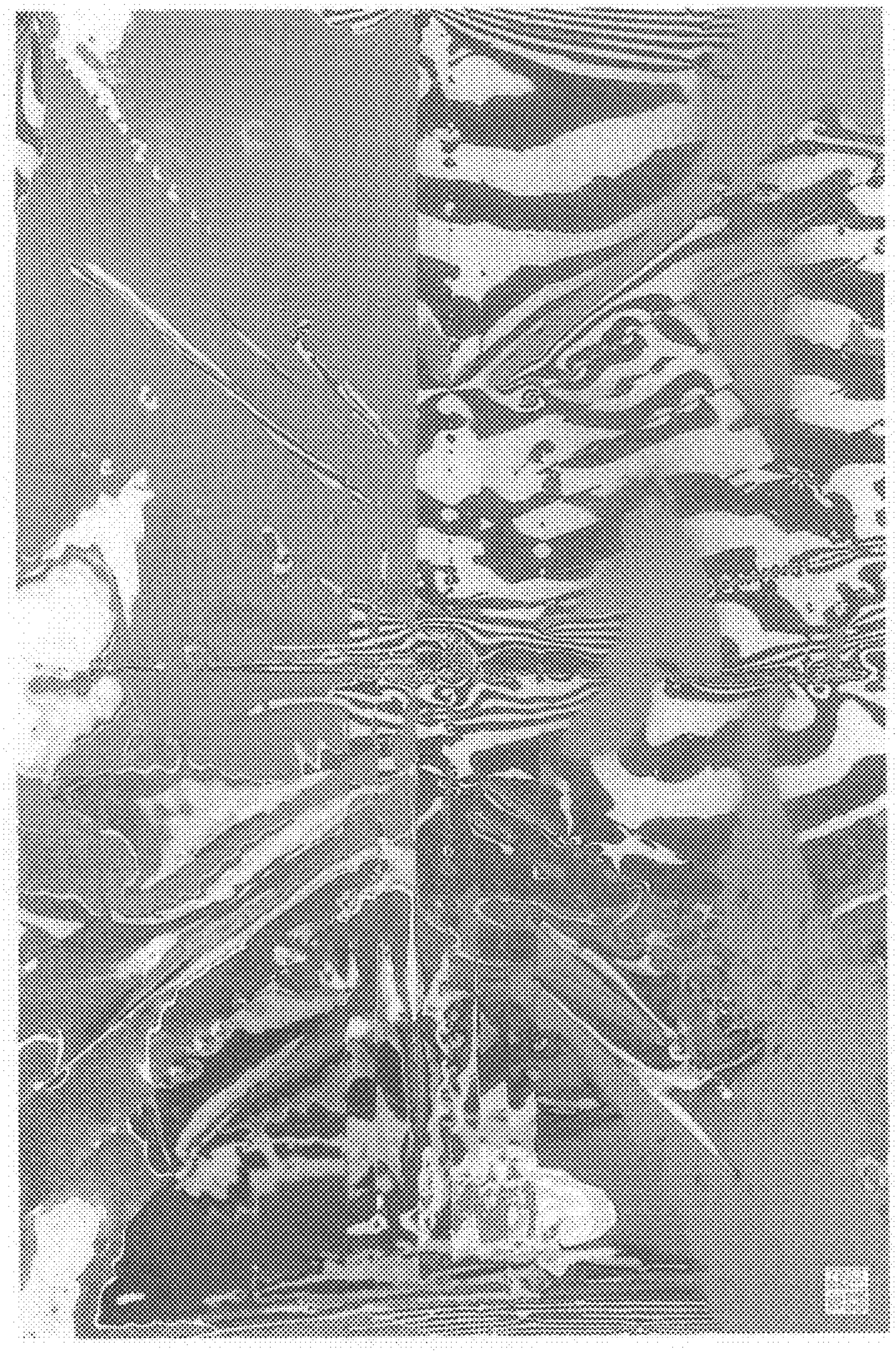
Figure 97:
Figure 98:
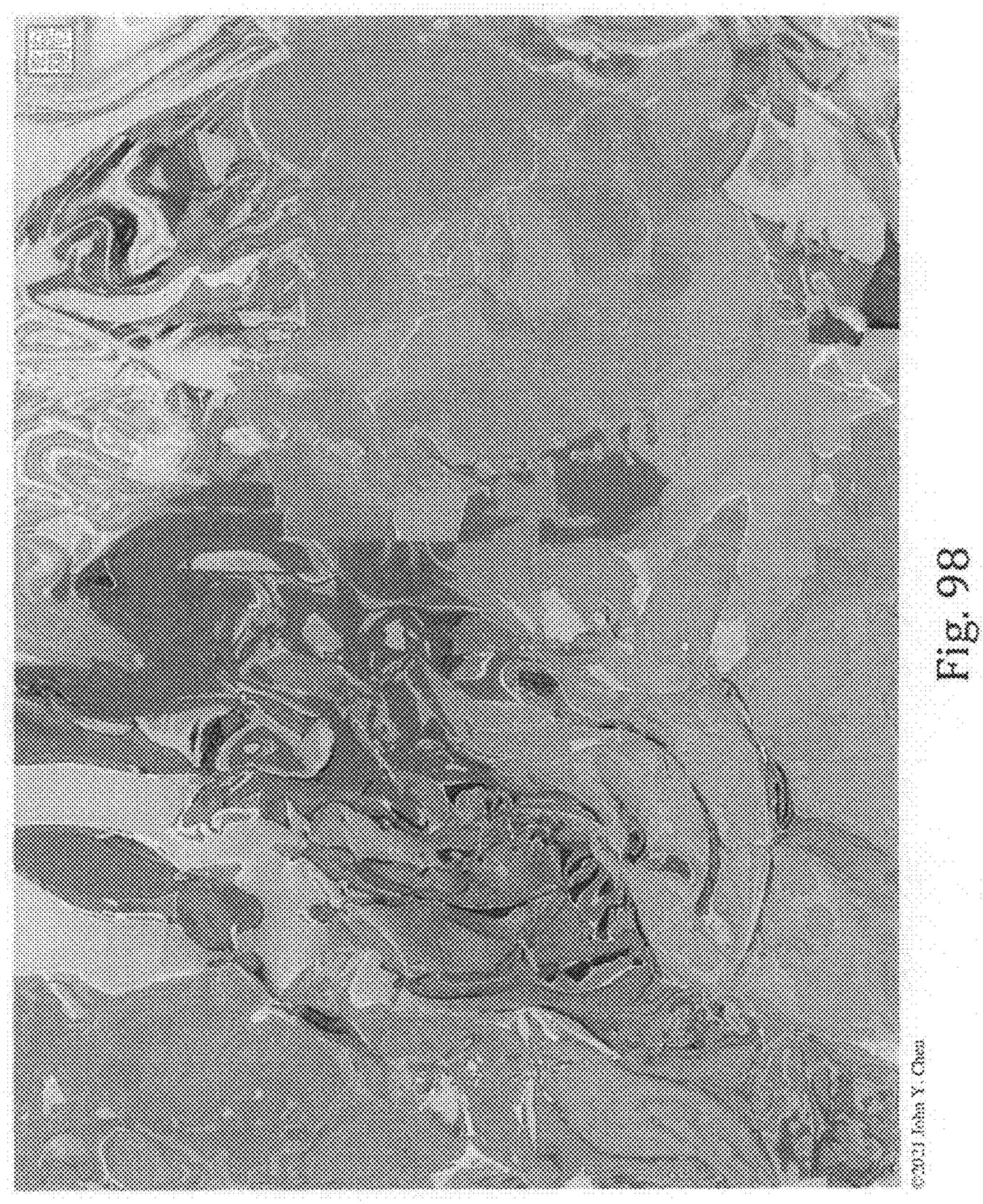
Figure 99:
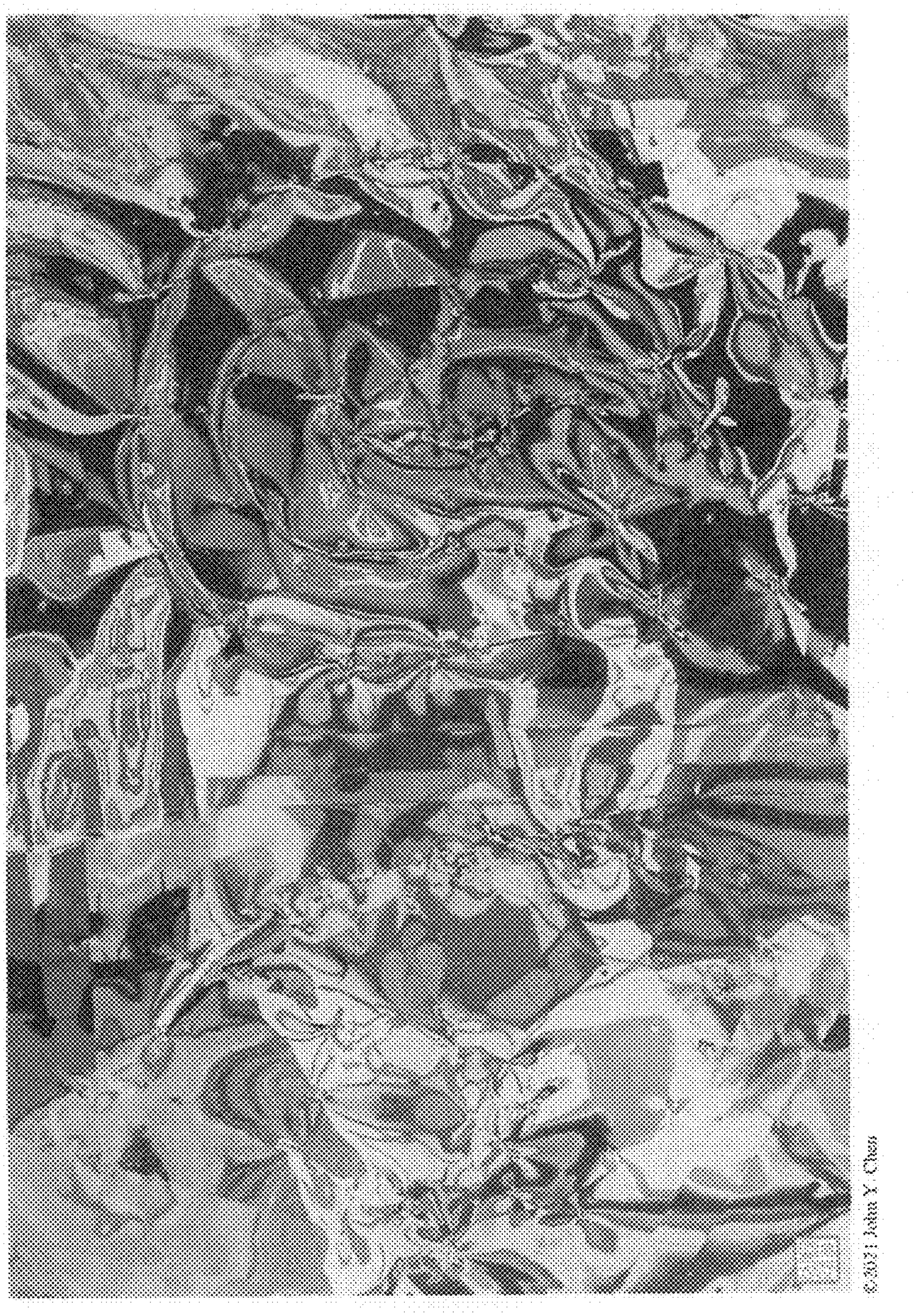
Figure 100:
Figure 101:
Figure 102:
Figure 103:
Figure 104:
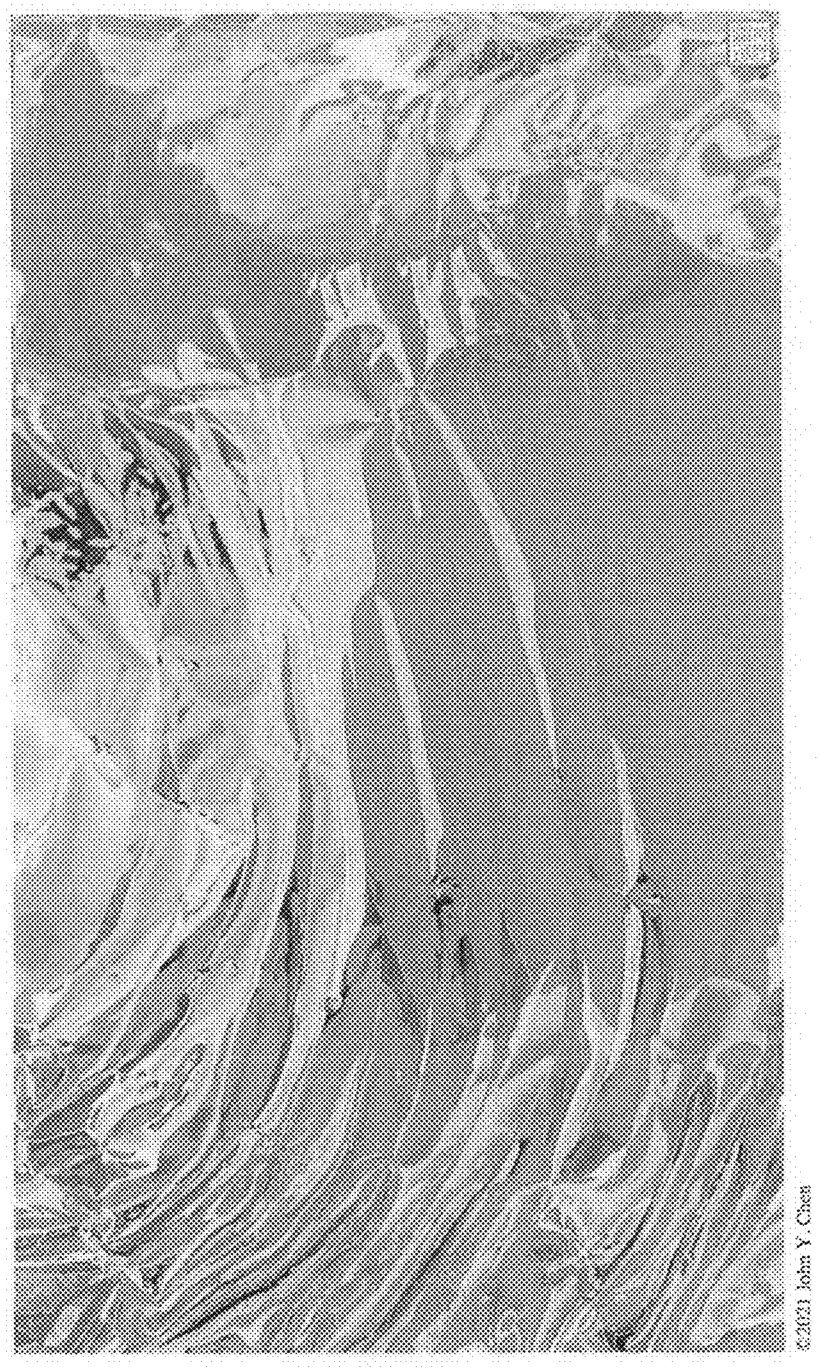
Figure 105:
Figure 106:
Figure 107:
Figure 108:
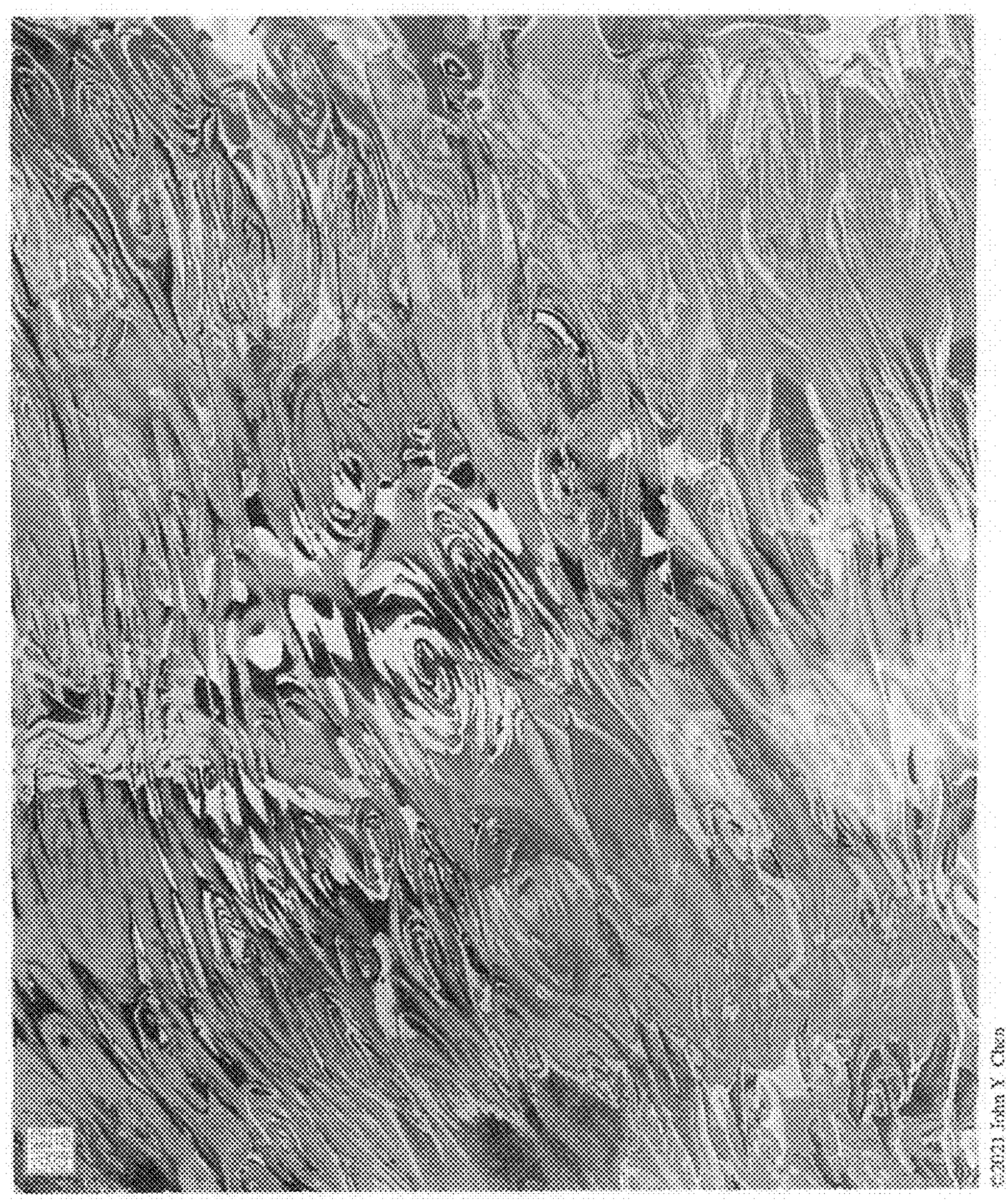
Figure 109:
Figure 110:
Figure 111:
Figure 112:
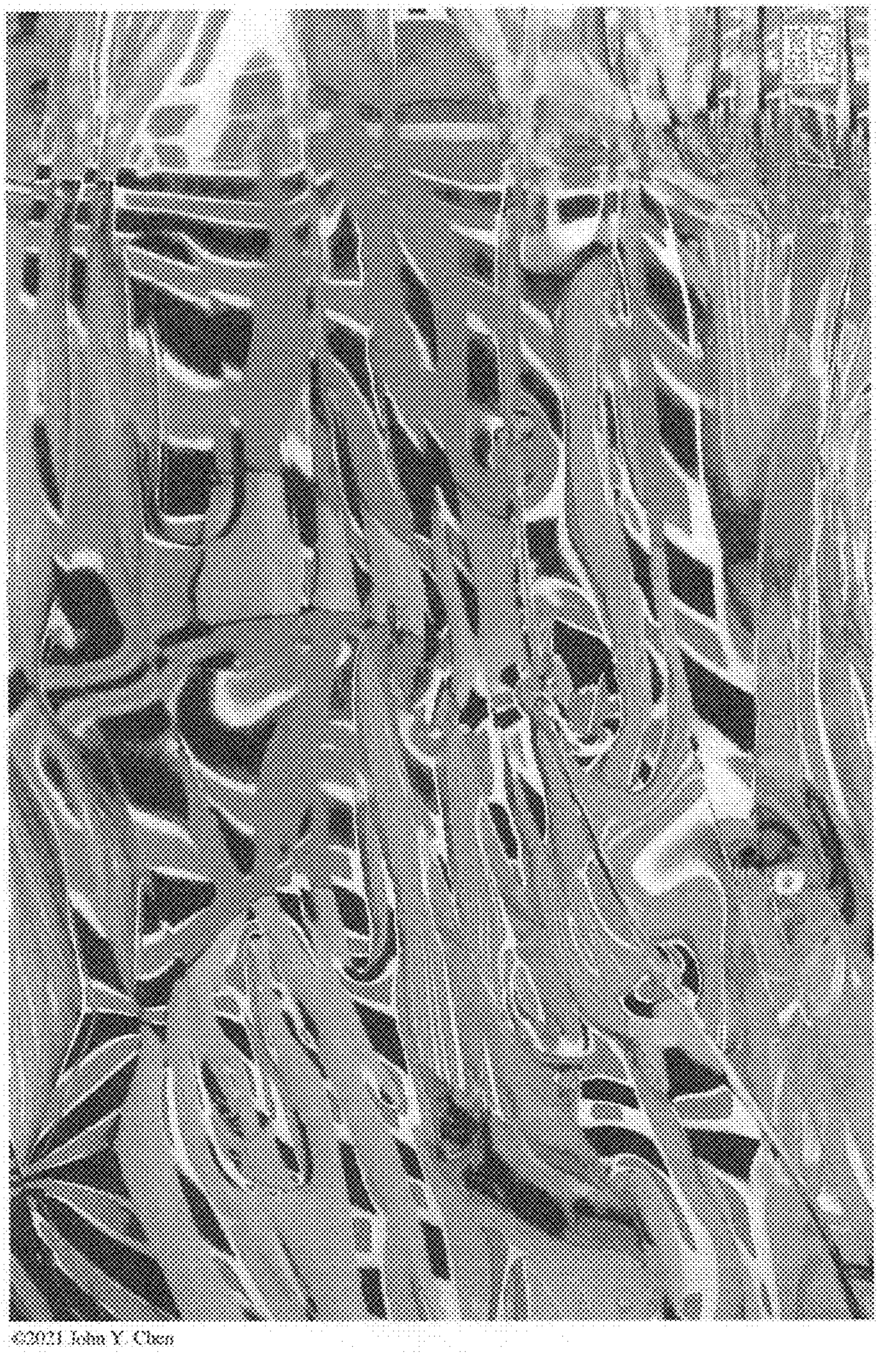
Figure 126:
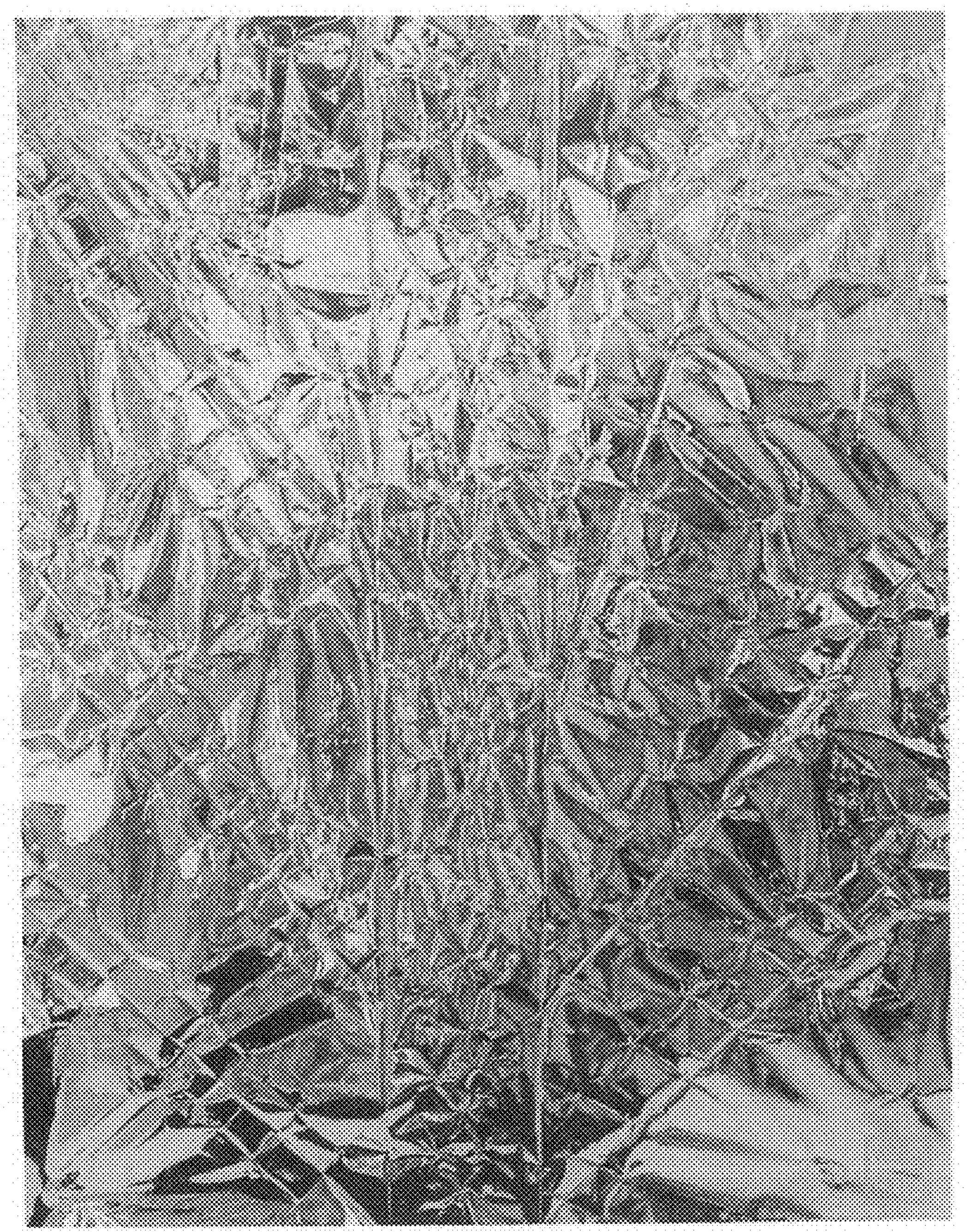
Figure 127:
Figure 128:
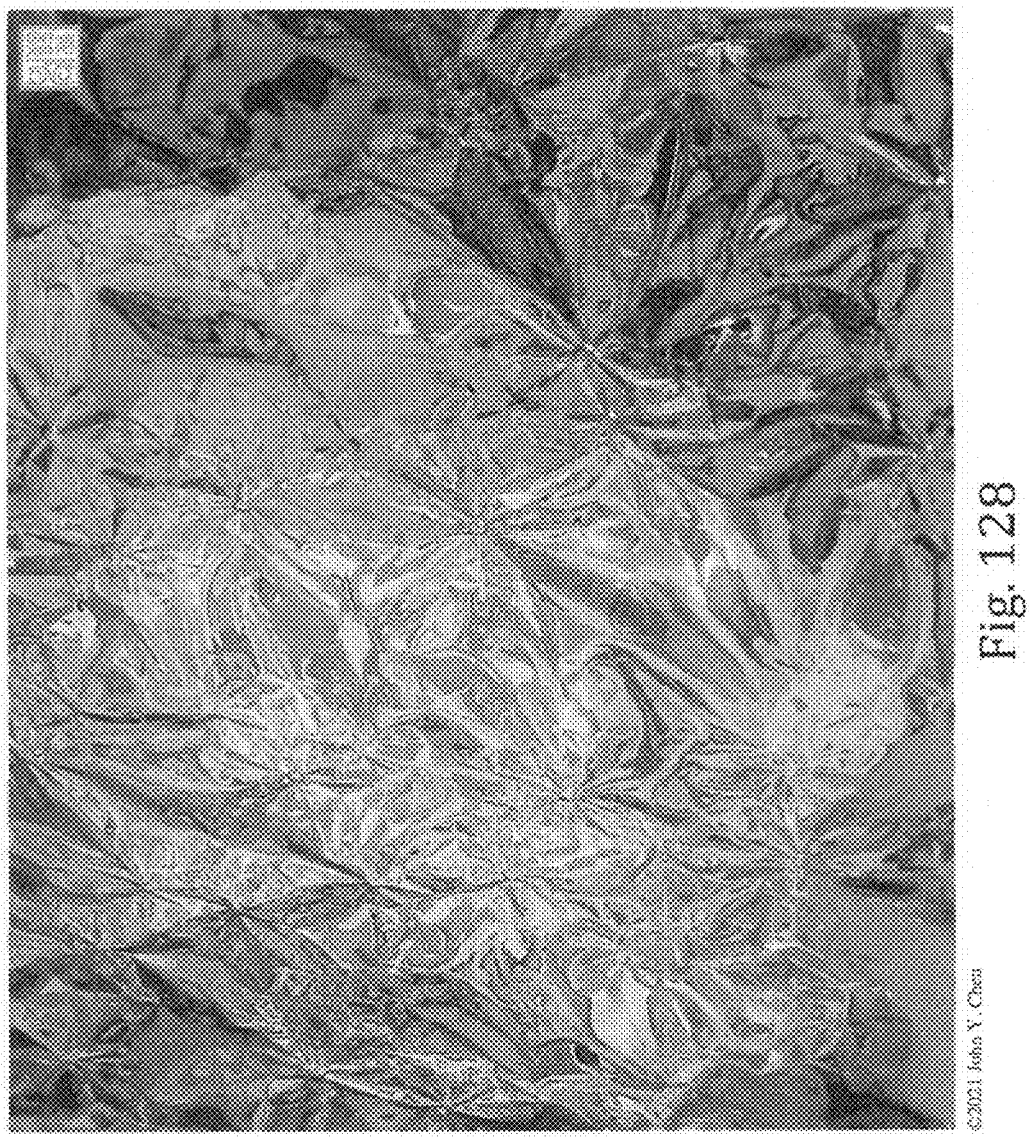
Figure 129:
Figure 130:
Figure 131:
Figure 132:
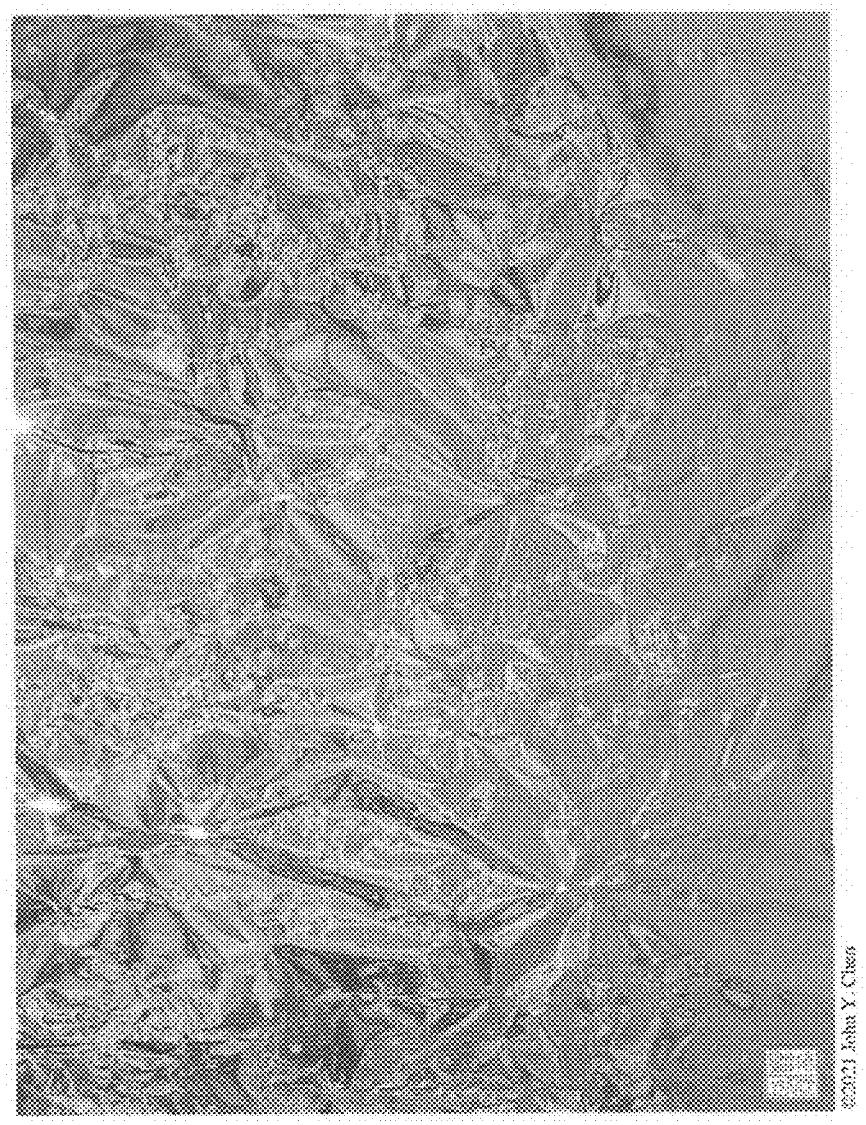
Figure 133:
Figure 134:
Figure 135:
Figure 136:
Figure 137:
Figure 138:
Figure 139:
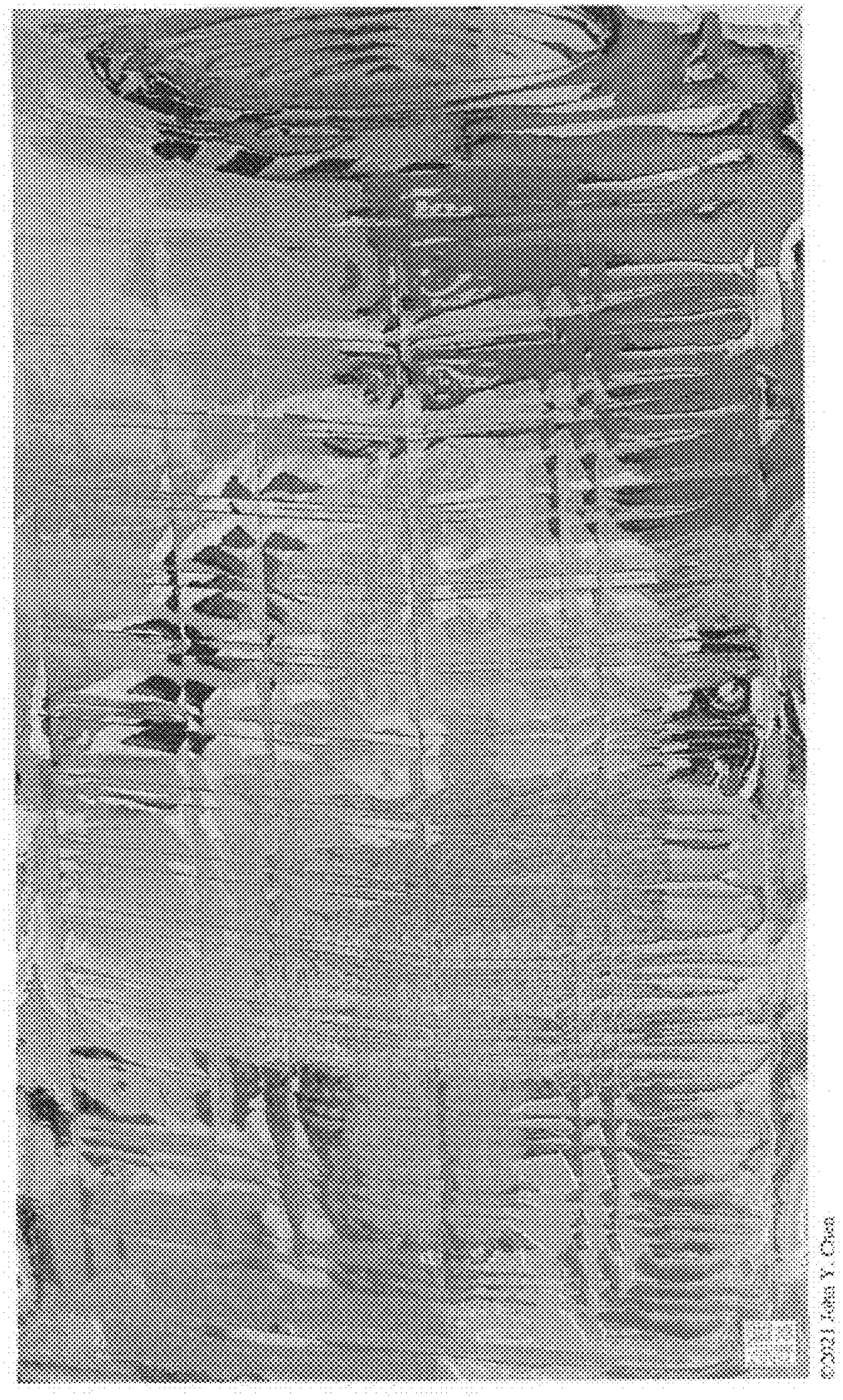
Figure 140:
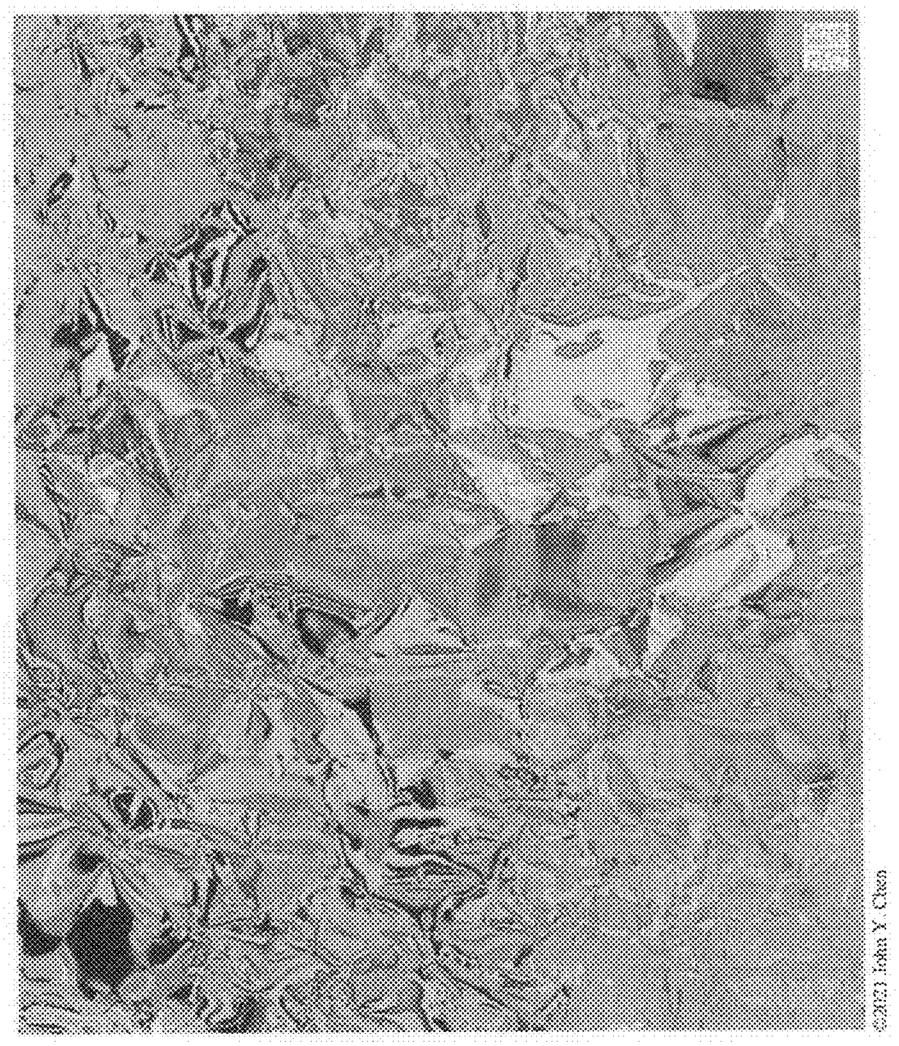
Figure 141:
Figure 142:
Figure 143:
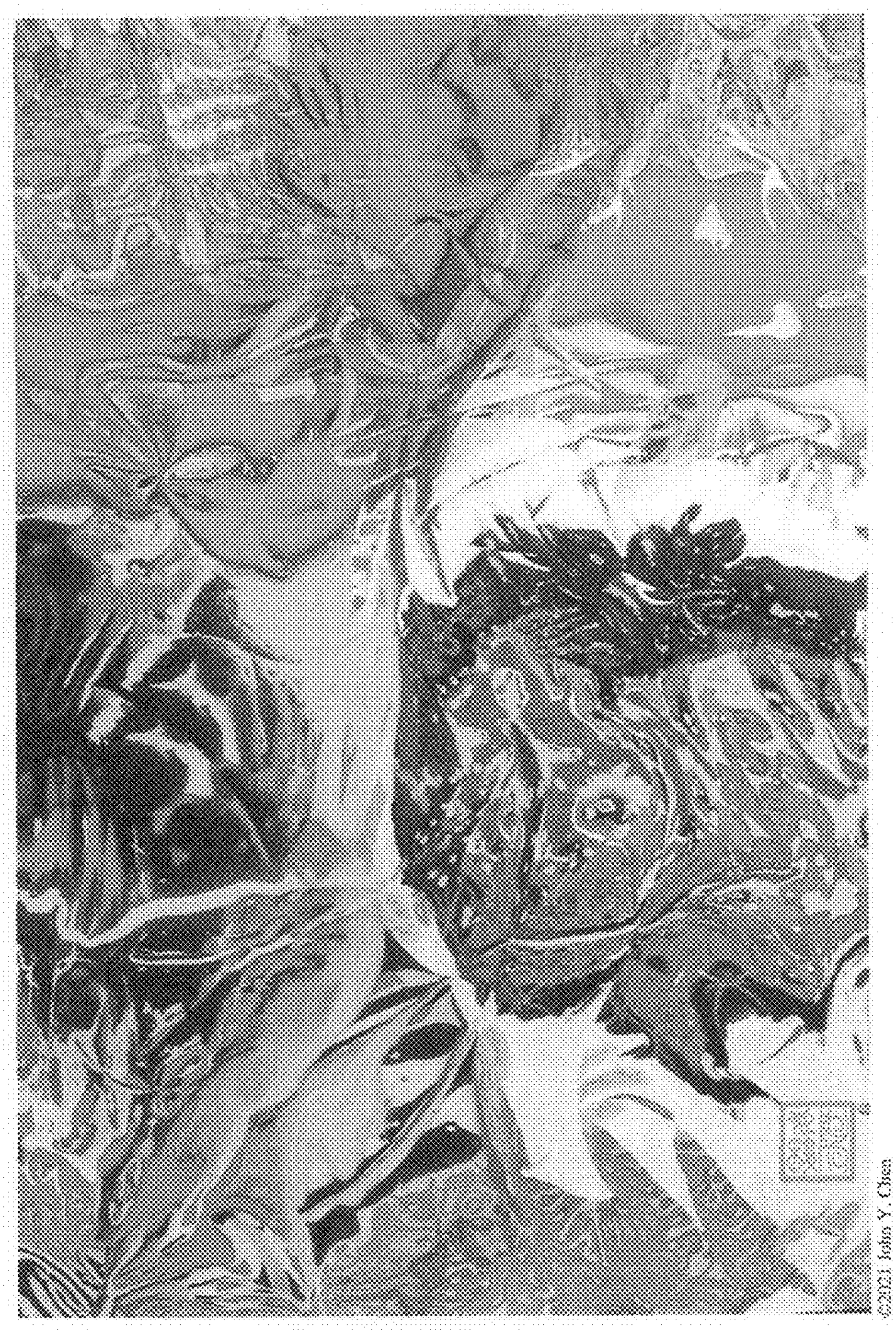
Figure 144:
Figure 145:
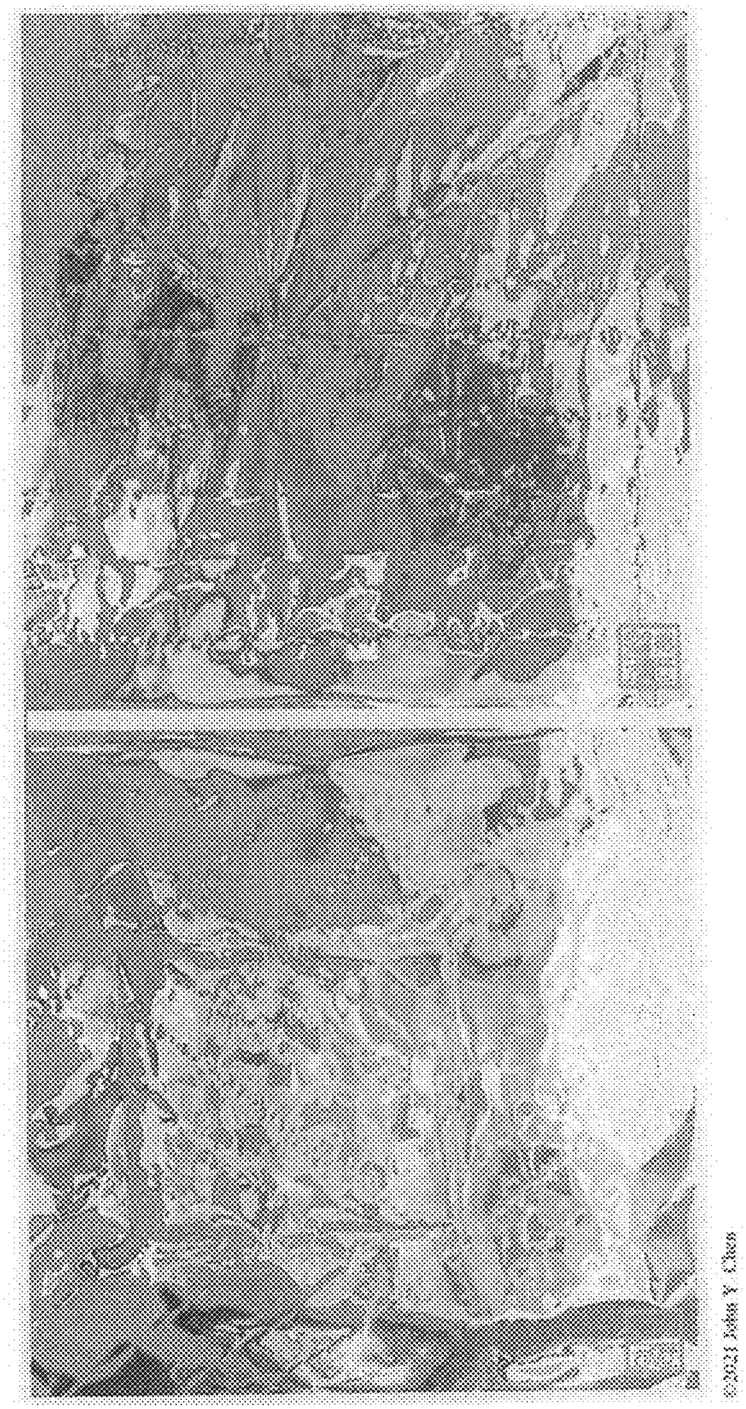
Figure 146:
Figure 147:
Figure 148:
Figure 149:
Figure 150:
Figure 151:
Figure 152:
Figure 153:
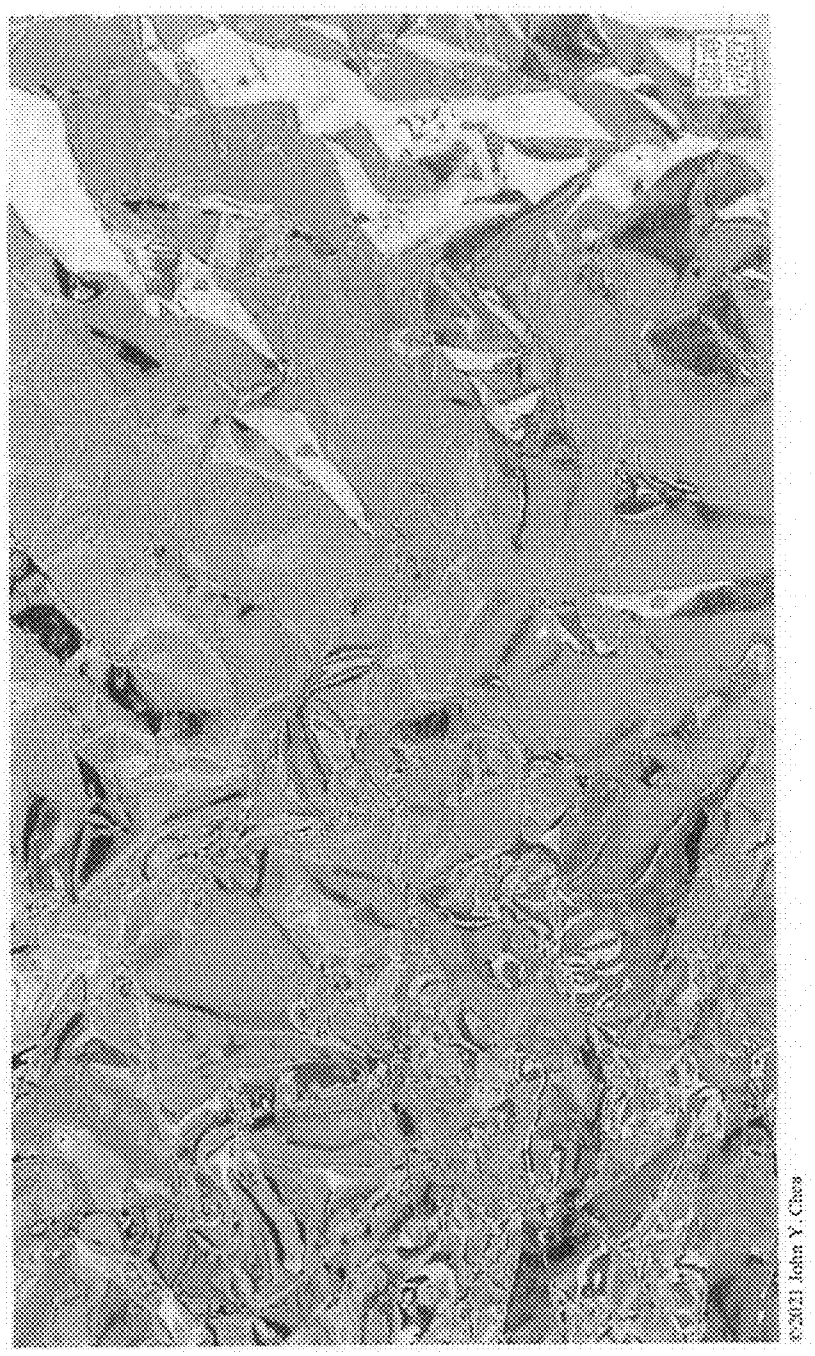
Figure 154:
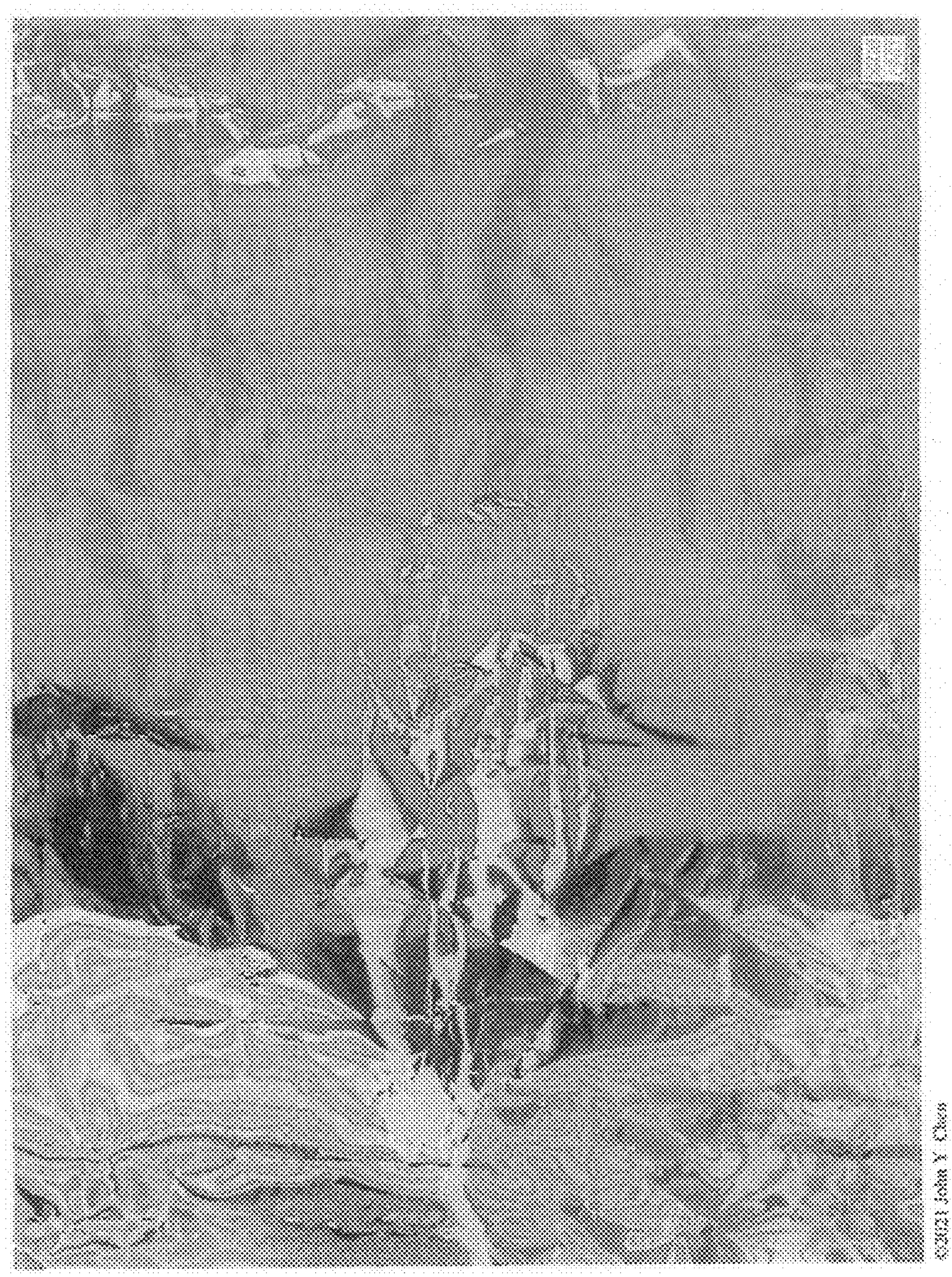
Figure 155:
Figure 156:
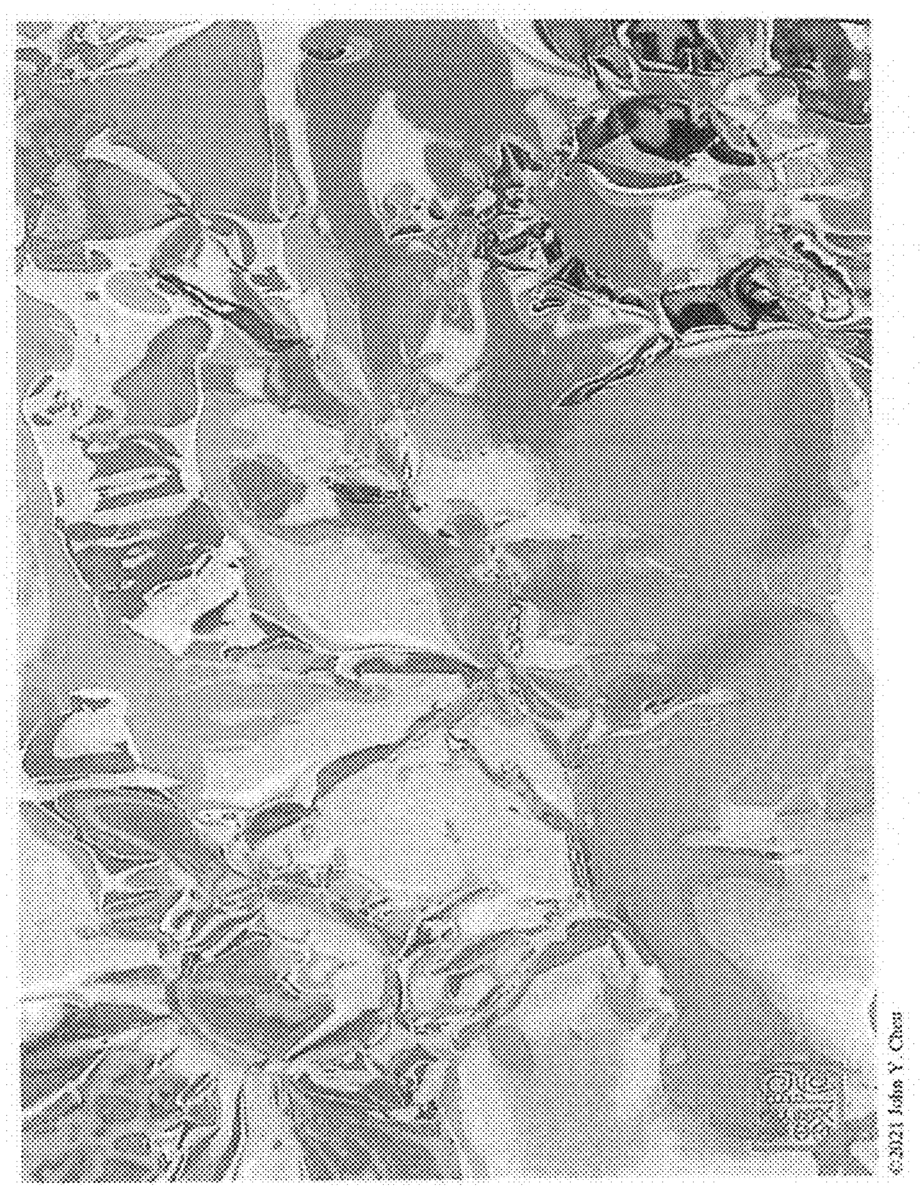
Figure 157:
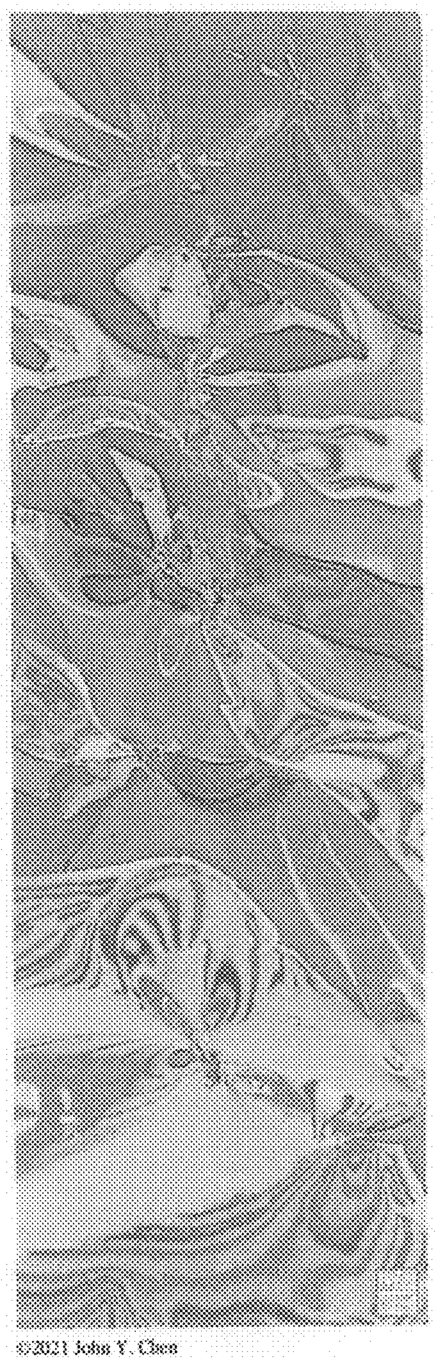
Figure 158:
Figure 159:
Figure 160:
Figure 161:
Figure 162:
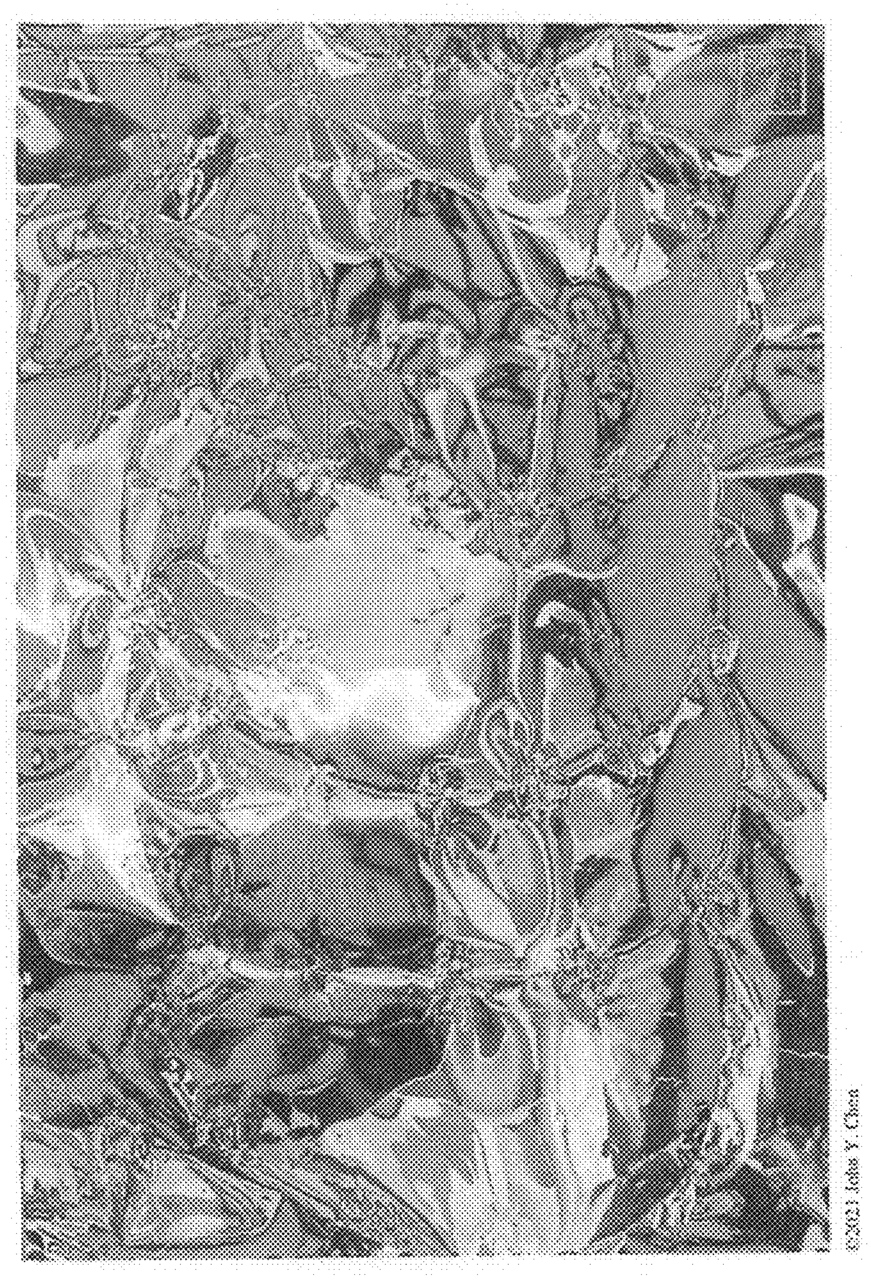
Figure 163:
Figure 164:
Figure 165:
Figure 166:

Included are representative very large sizes formats of topological deformation extended line impression embodiments of the invention's methods and practice exemplifying installations of mirror stainless sheet extended line deformation displays having potential greater rigidity for museum exhibition of wall installations, see FIGS. 85-90 created using paper cut-outs of Applicant's photographs taken at museums settings about some ten to fifteen years ago, which photo copies were use as overlays on selected mirror films such as FIGS. 52, 126, and 142 embodiments of the invention for purpose of illustrating large formats of mirror stainless steel sheet may be use on wall display at museums.

The invention methods of making and using the displays described above transforms real-world scenes into other-worldly virtual imaginary (virtual reality) that can be seen, mingle it with visual (real-world) reality (and experience augmented reality), capture it, and put it to use see FIGS. 82-90. These are real images taken of virtual images of real objects (soup label, photos cut outs of Greek coins, photo cut-outs of museum visitor all attached to the surfaces of mirrors while reflecting selected real world scenes. Looking carefully at FIGS. 85 and 86 at the edge of the cut outs of people standing facing the mirror reveals the underside edges, which exposes the illusion of live visitor looking at a framed museum wall art installation. It is impossible for the group of people to stand looking at two different wall art standing at precisely the same positions relative to one another and gazing at identical positions while looking upwards in such a virtual augmented state. The same applies to FIGS. 87-90 of the visitor sitting having the rim of his left eyeglass lens frame at the exact edge of the wall art sitting motionless after three changes of art installations, a true augmented state of affairs.

Moreover, what the observer sees of the virtual images FIGS. 10, 16-18, 23, 25-27, 29, and 31-37 of said respective mirror films FIGS. 11, 15, 18, 38, 39-45, 47-167 is a world that has no representational physical existence.

On the other hand, the various disturbances made to a once smooth mirror films' surface transformed into (said first to said tenth) mirror film topologies forming irreversible and permanent ordered and disordered mirror film deformation(s) creates imaginary of virtual reality that exists independently of the observer in an ever changing presentation of real-world scenes in said room, which includes said observer who caused those mirror film topological deformations.

Once in awhile, said observer appears unrecognizable and scattered in a myriad reflecting surfaces (of substantially flat triangular shapes bounded by substantially straight folded mirror ridges, intersecting at mirror vertices, disorderly distributed over a wide range of size scales) from said large mirror films mounted on said curve wall or from said smaller moveable mirror films positioned about said room (in face to face relationship with said larger mirror films or nil) having bits and pieces of said virtual observer co-mingled with bits and pieces of other virtual objects in said room comprising said real-world scenes transformed reflecting back into said room or into said smaller mirror films transformed again from said larger mirror film, a third time or more depending on said mirrors' face-to-face selected positioning.

Figure 1:
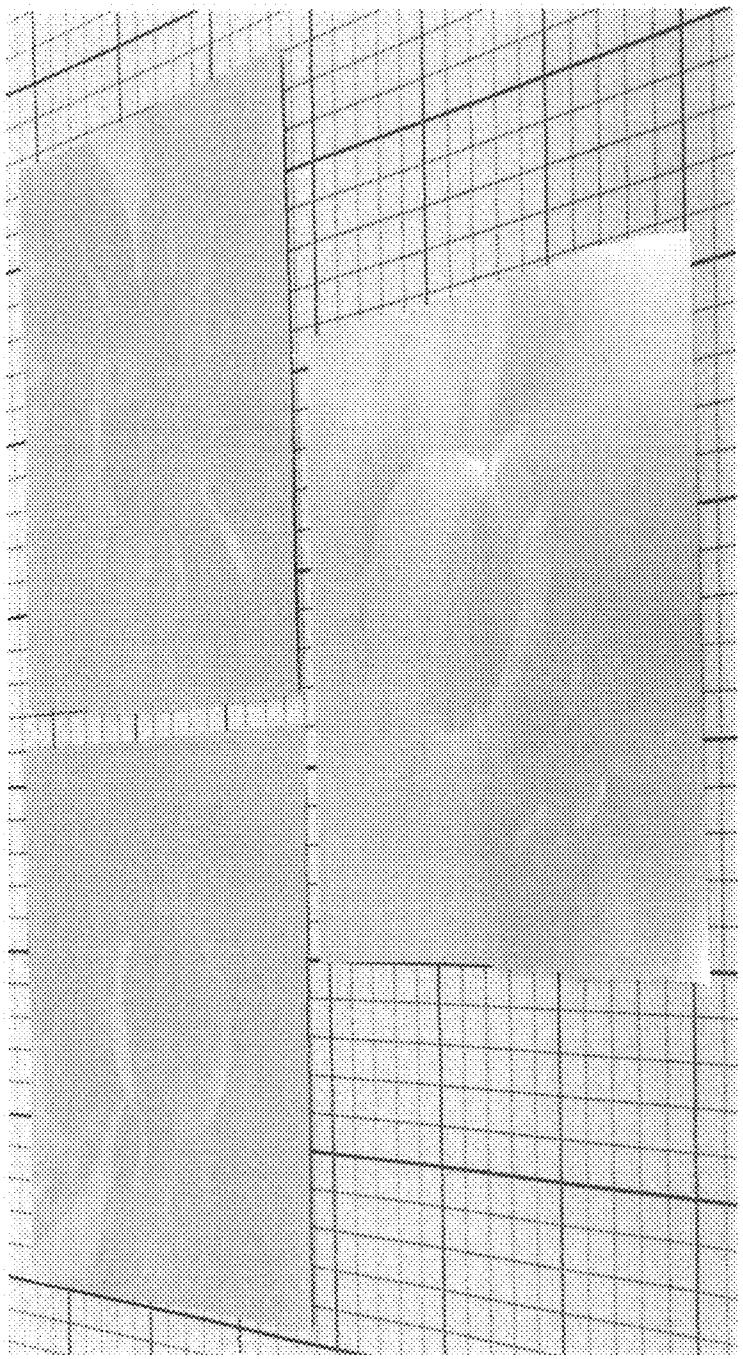
Figure 2:
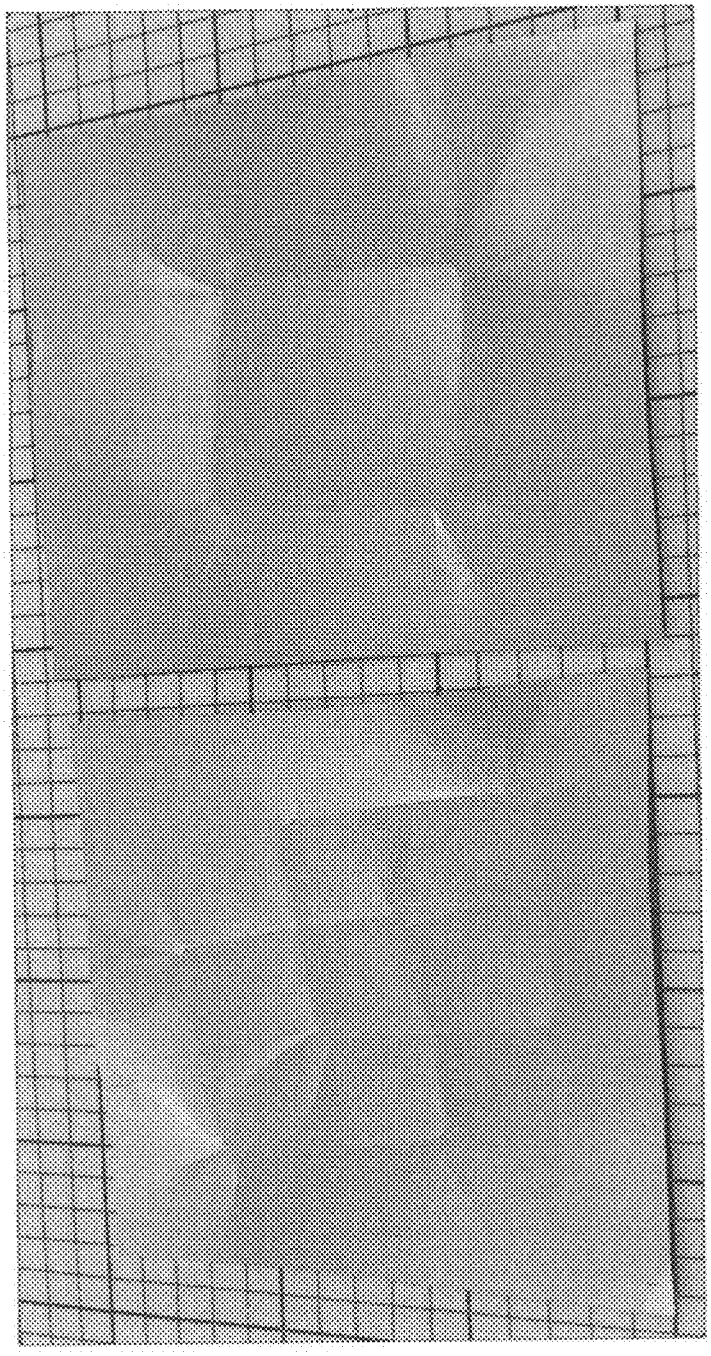
Figure 3:
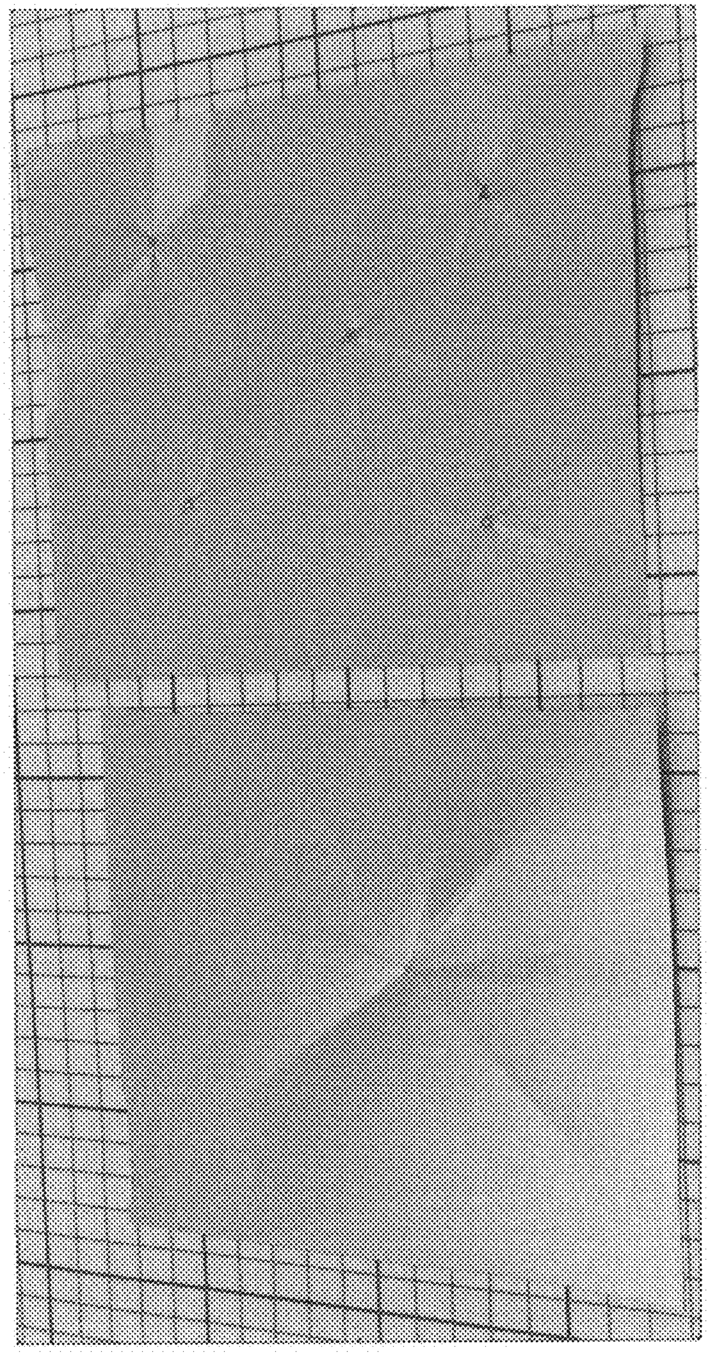
Figure 4:
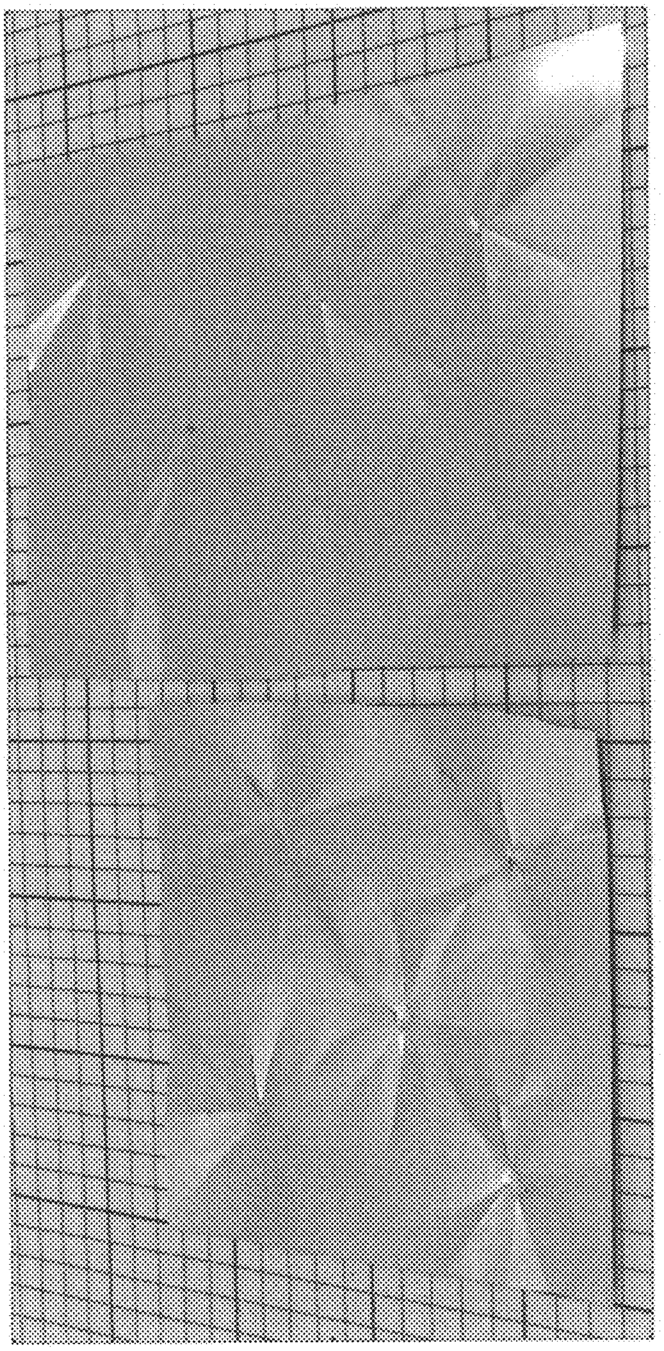
Figure 5:
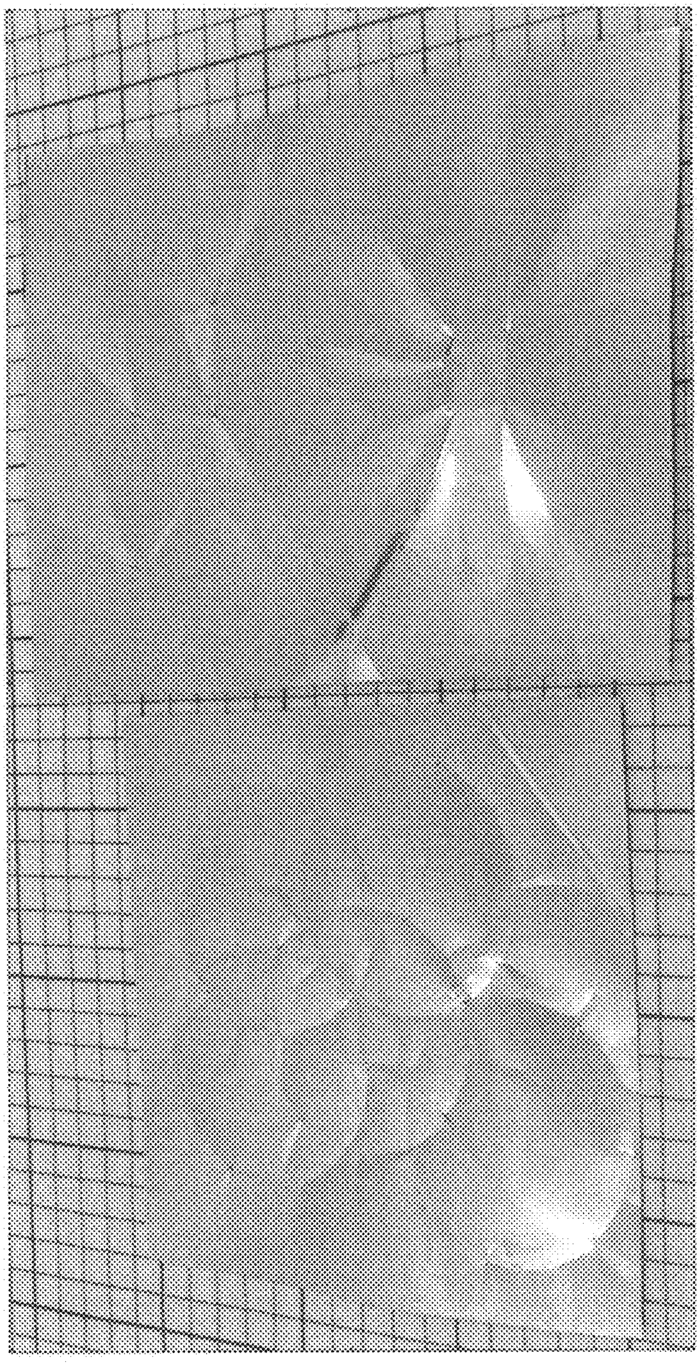
Figure 6:
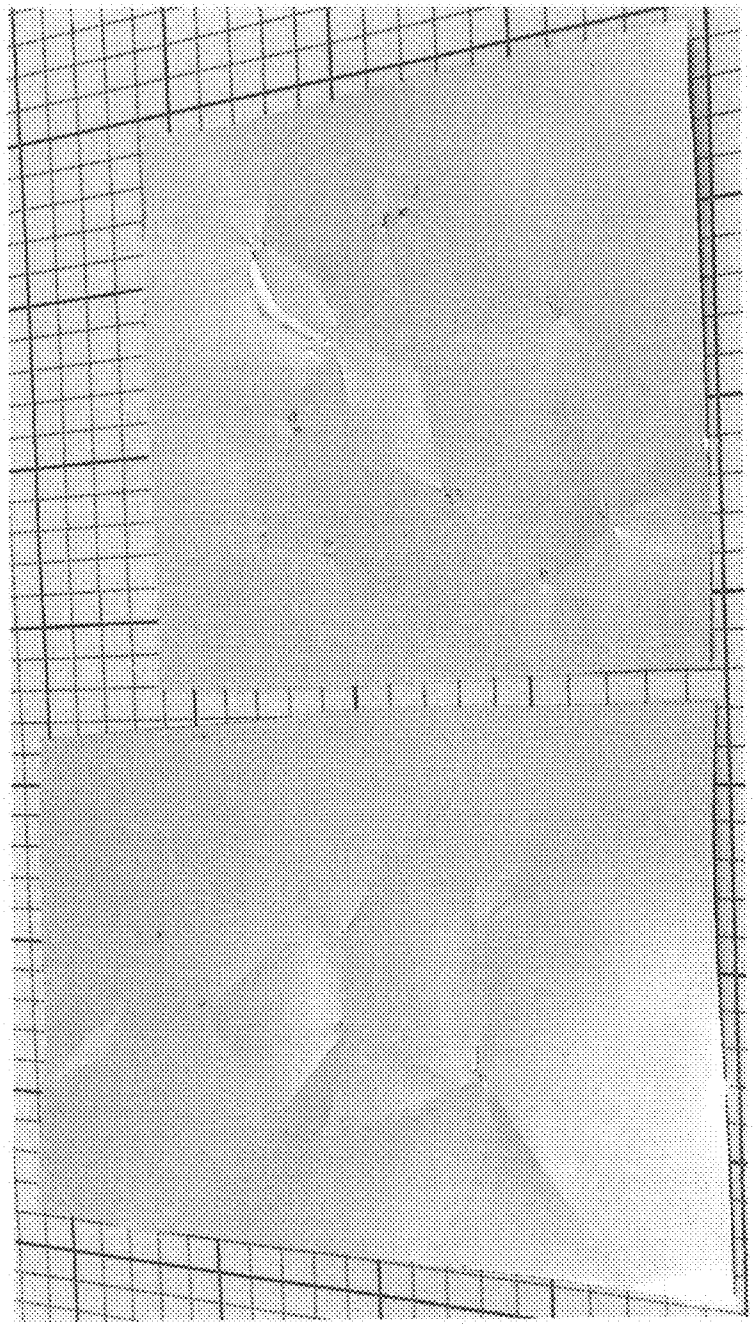
Figure 7:
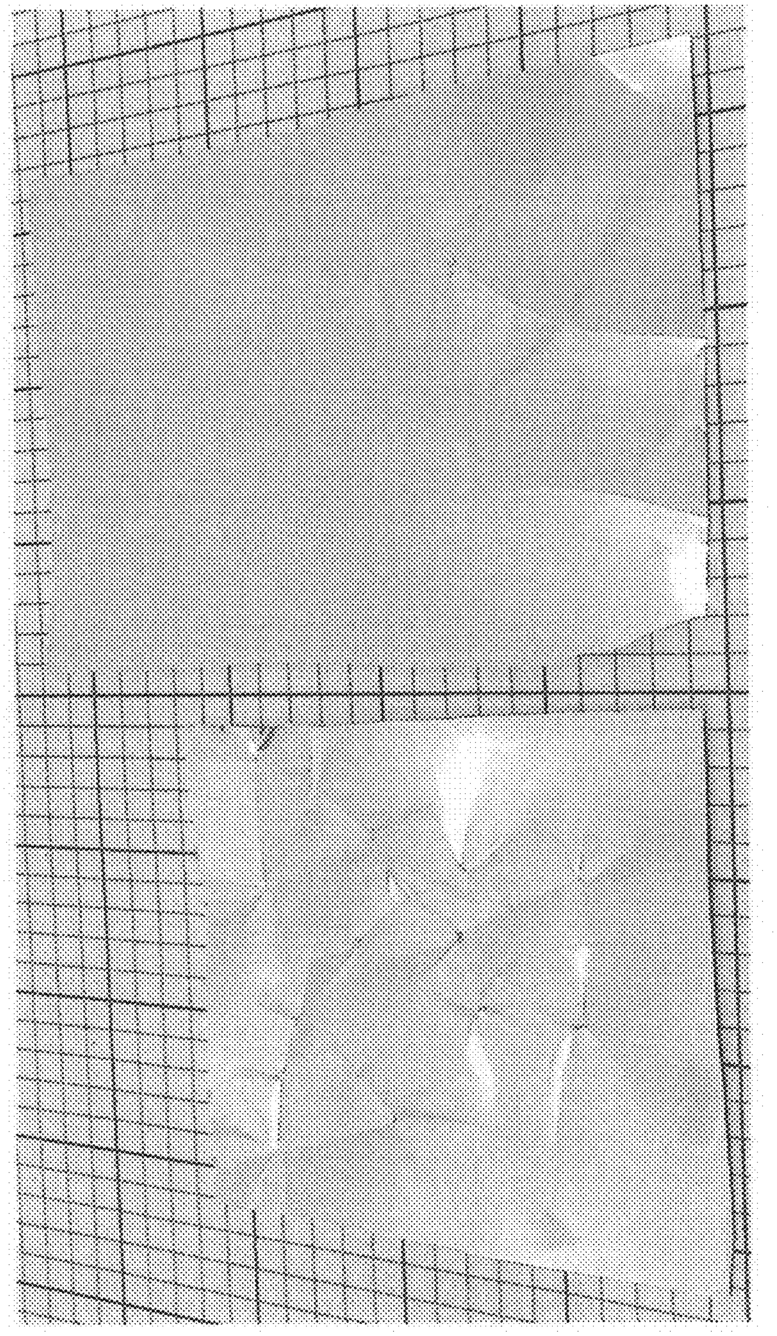
Figure 8:
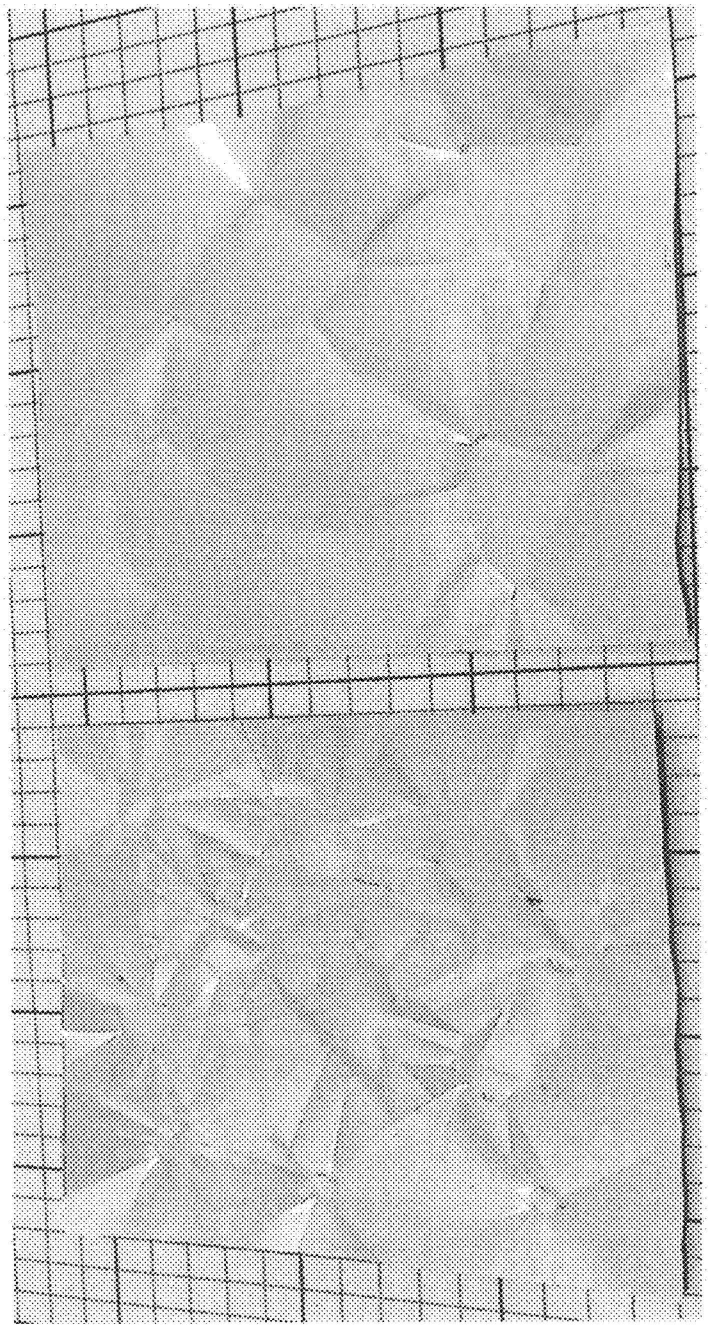
Figure 9:
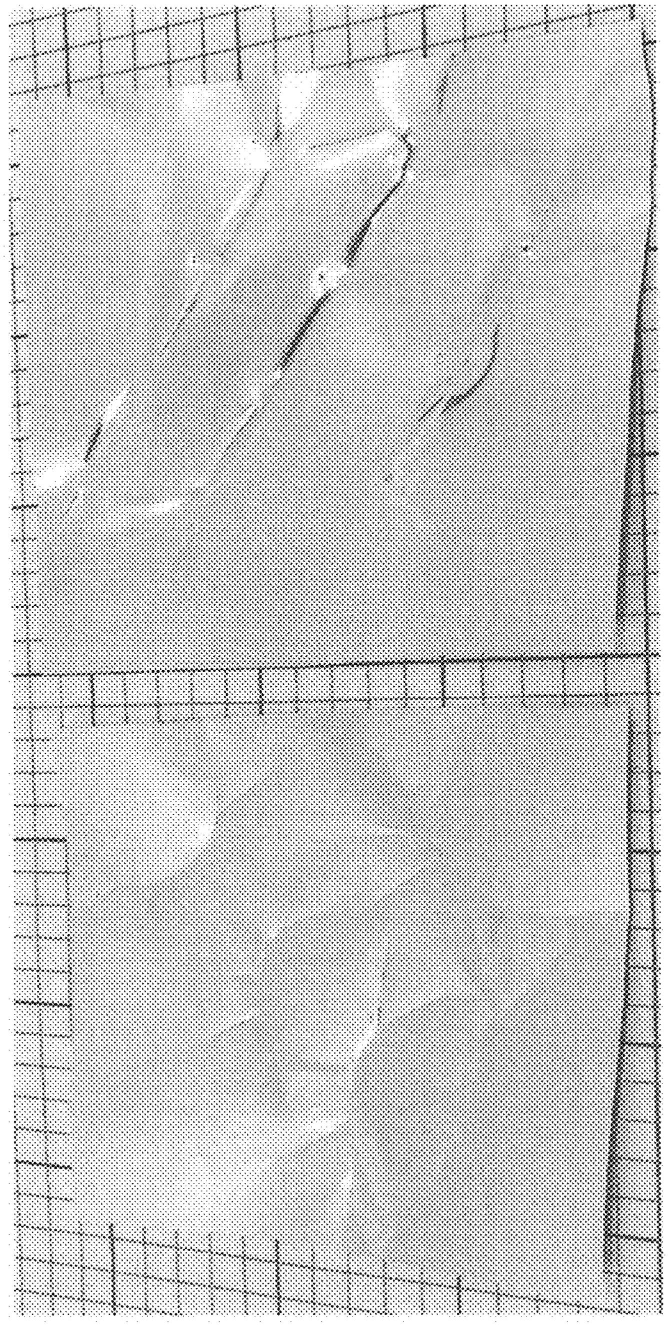
Figure 10:
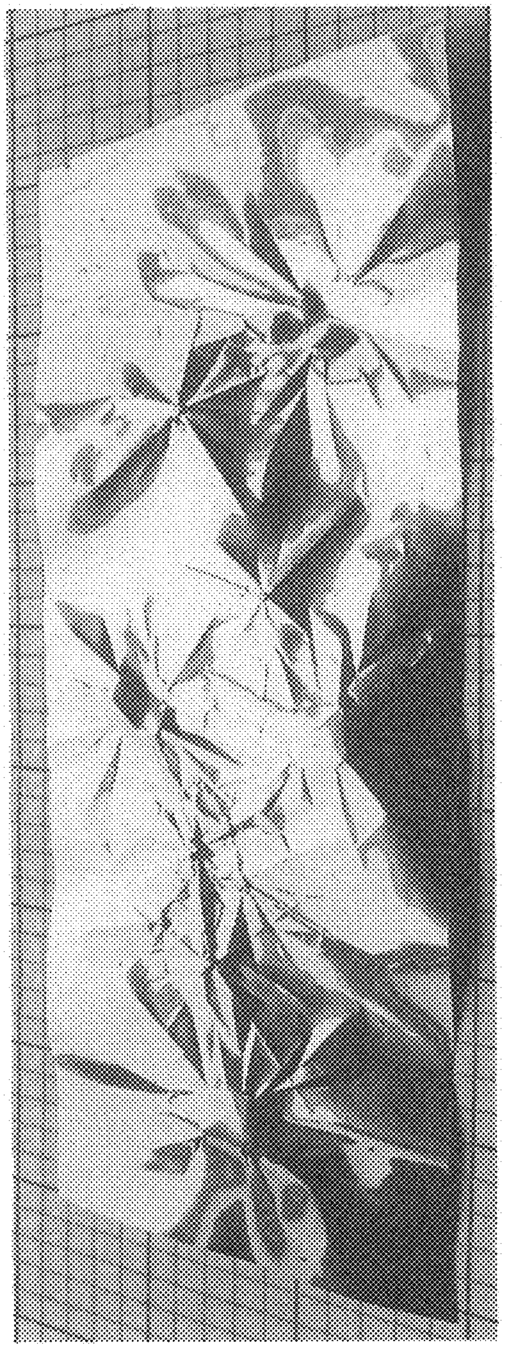
Figure 11:
Figure 12:
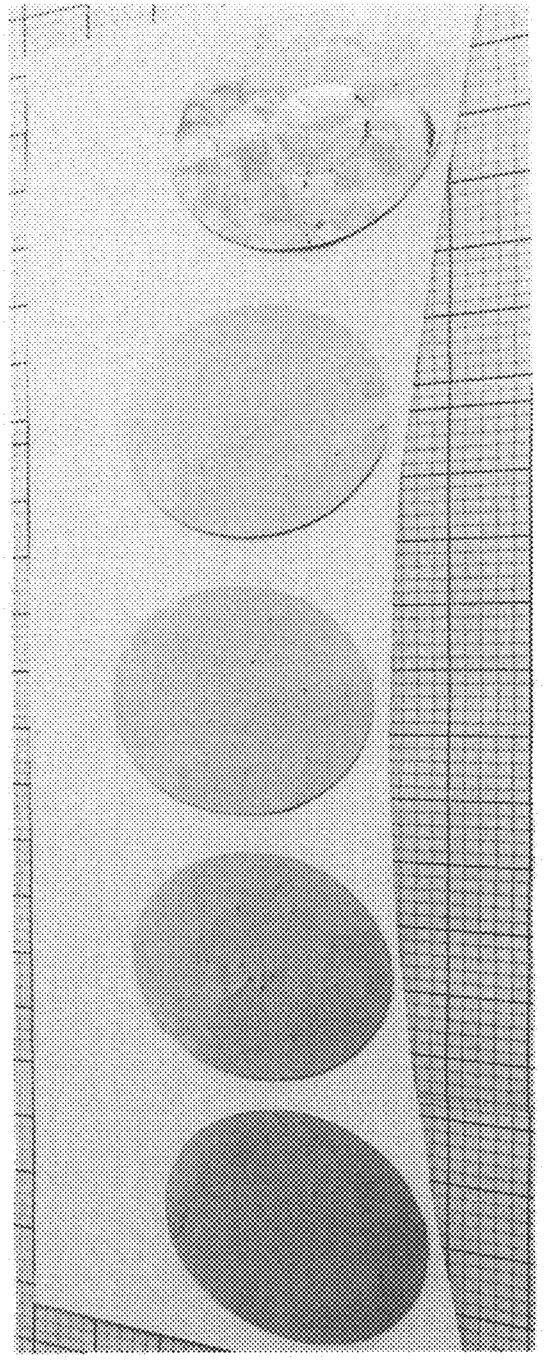
Figure 13:
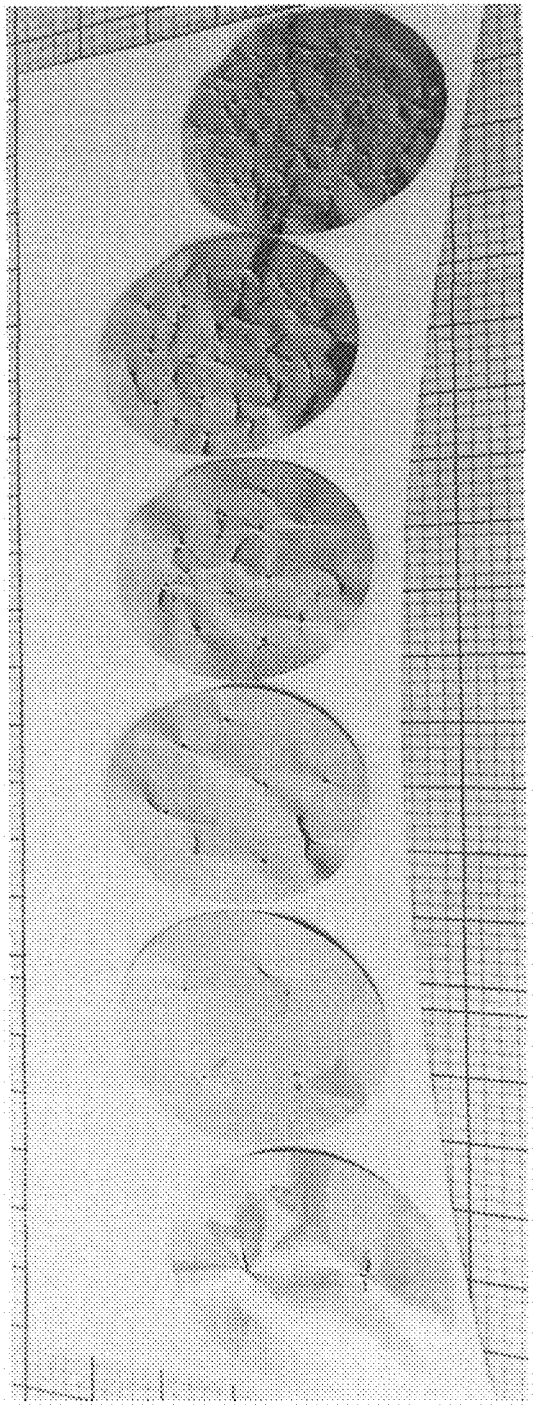
Figure 14:
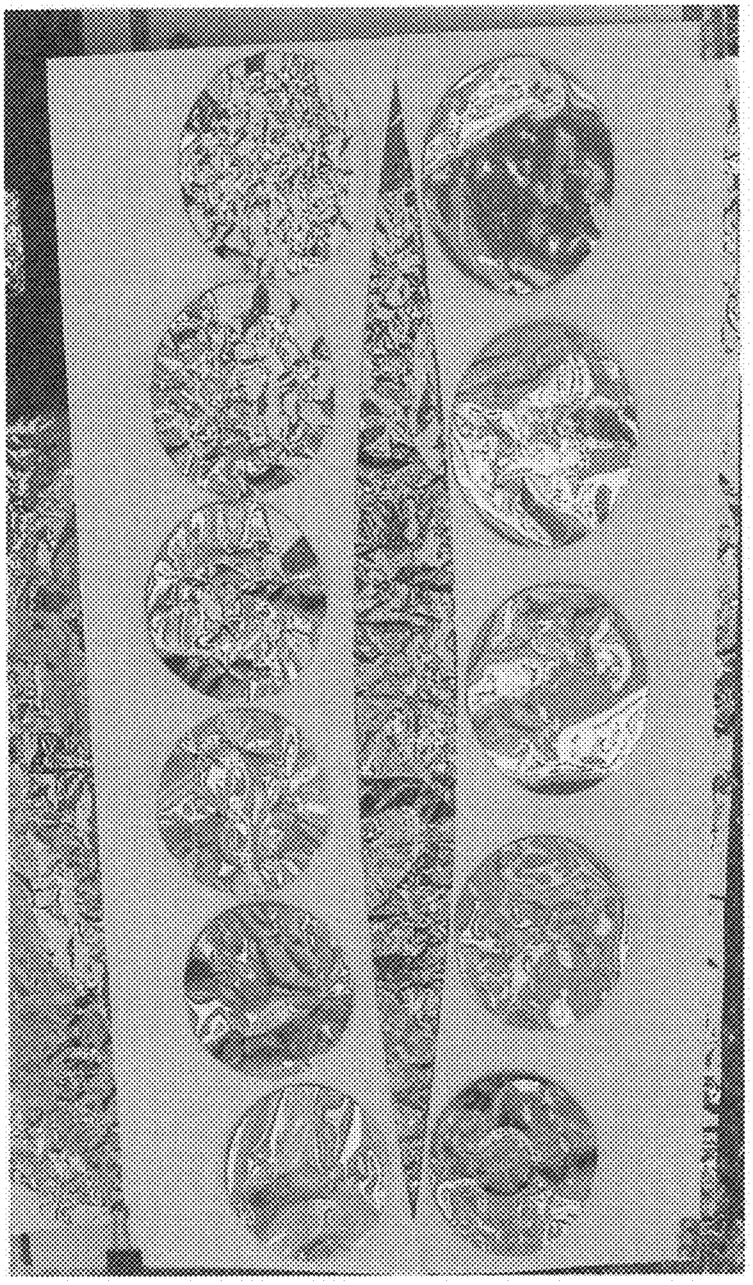
Figure 15:
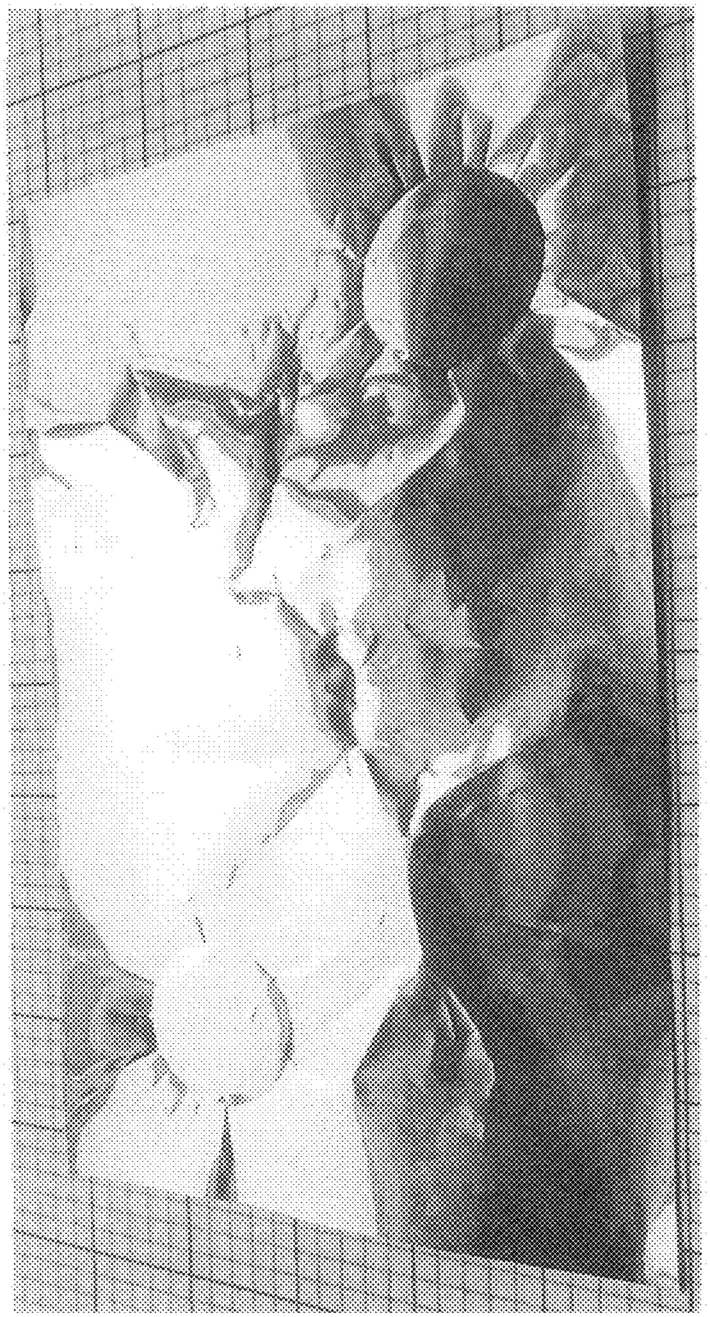
Figure 16:
Figure 17:
Figure 18:
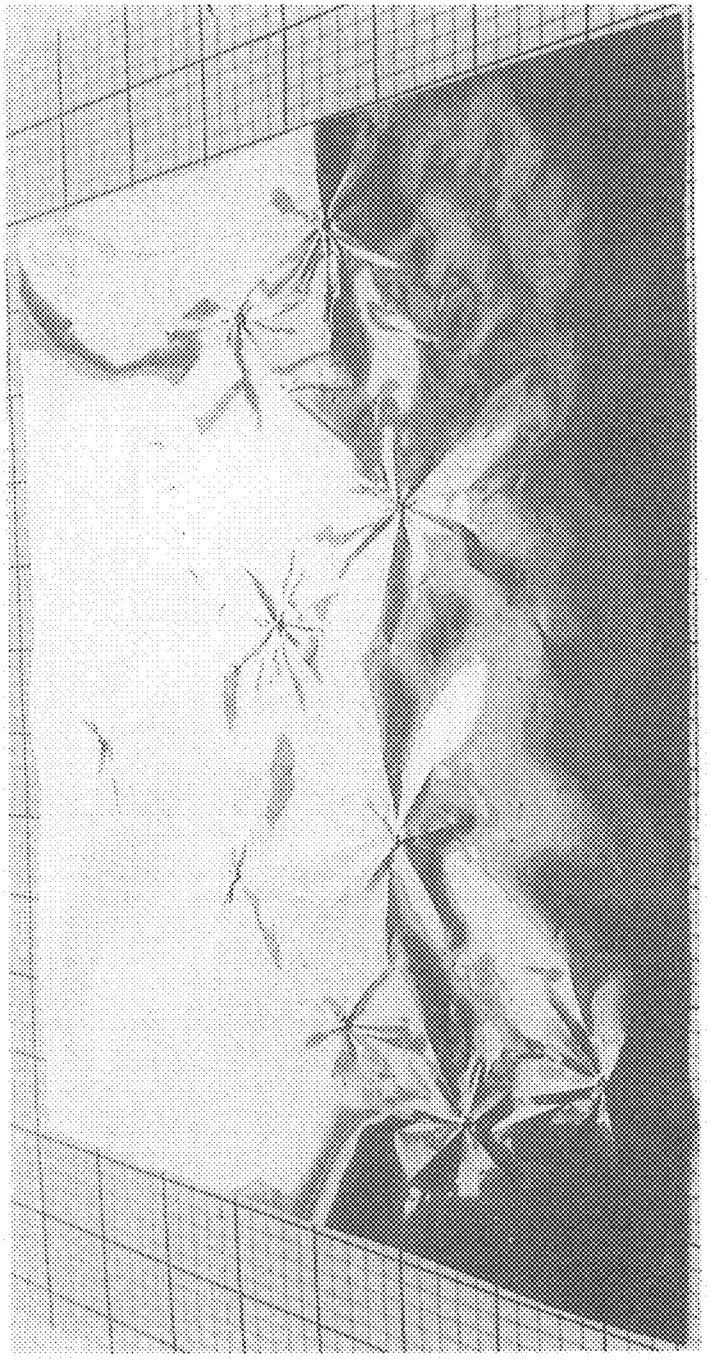
Figure 19:
Figure 20:
Figure 21:
Figure 22:
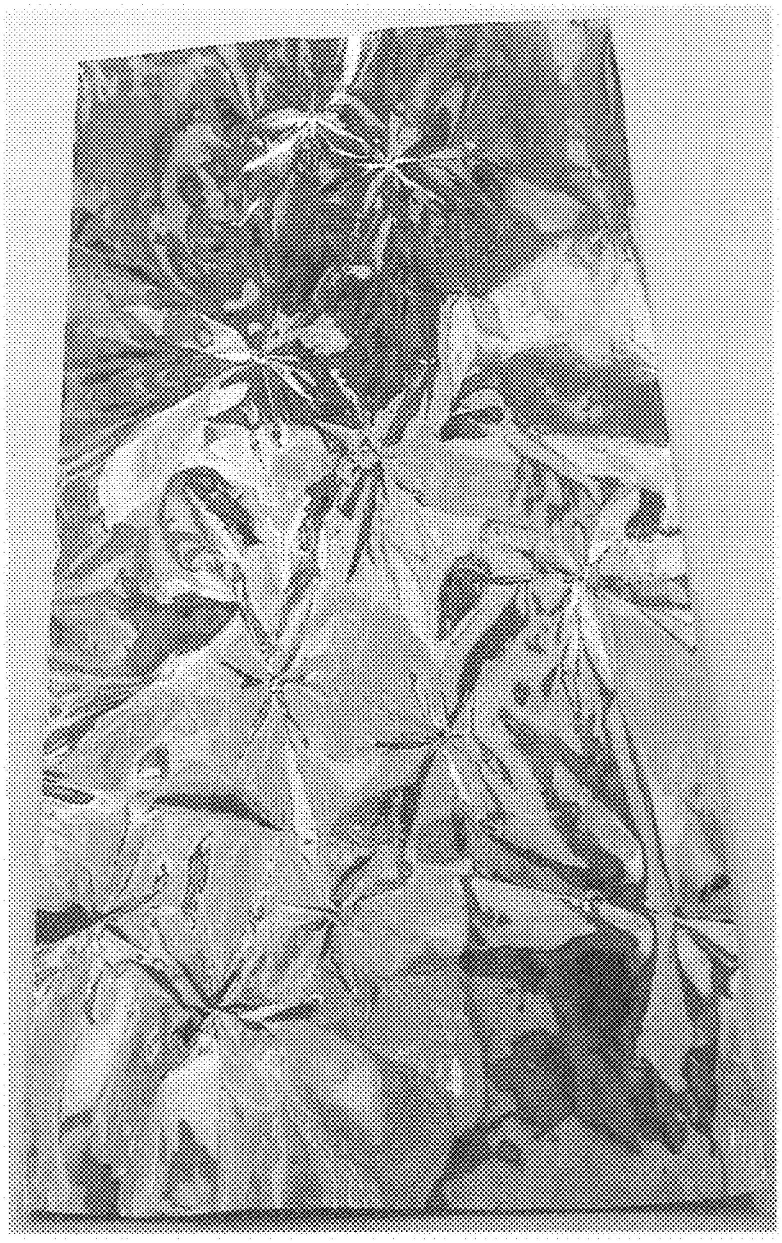
Figure 23:
Figure 24:
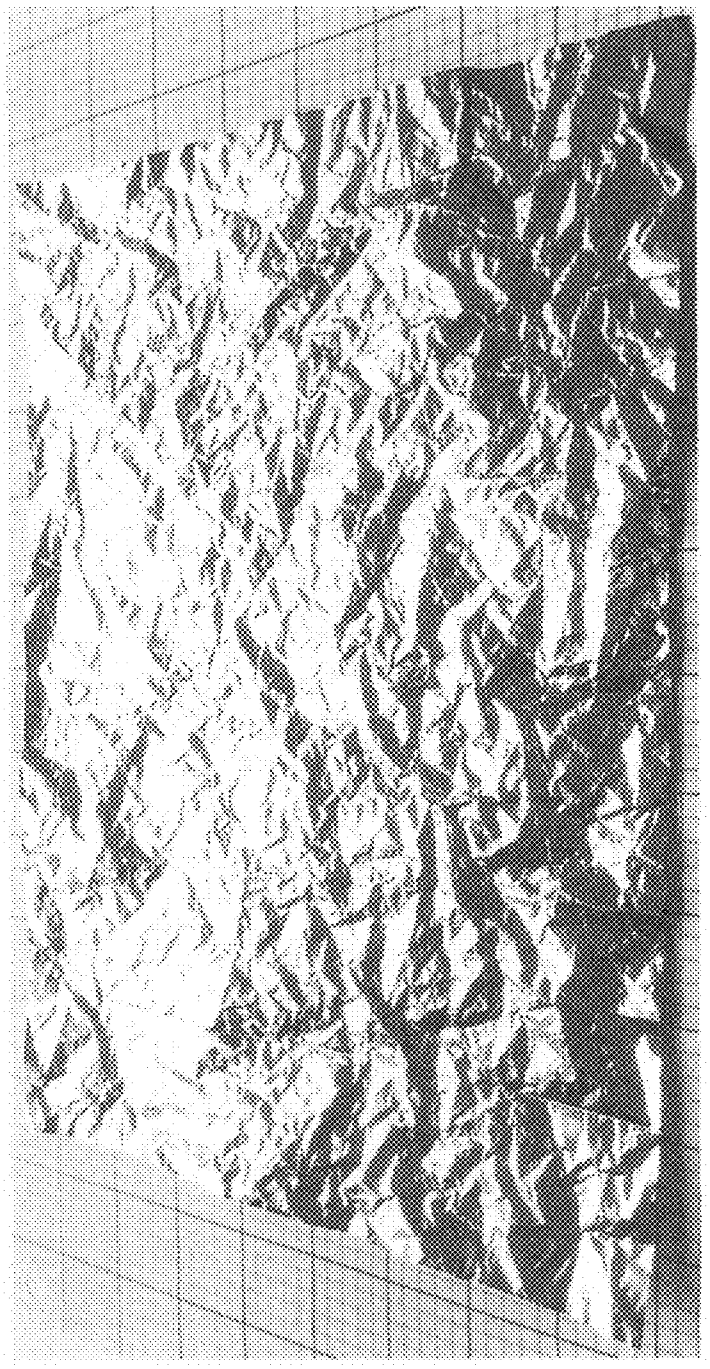
Figure 25:
Figure 26:
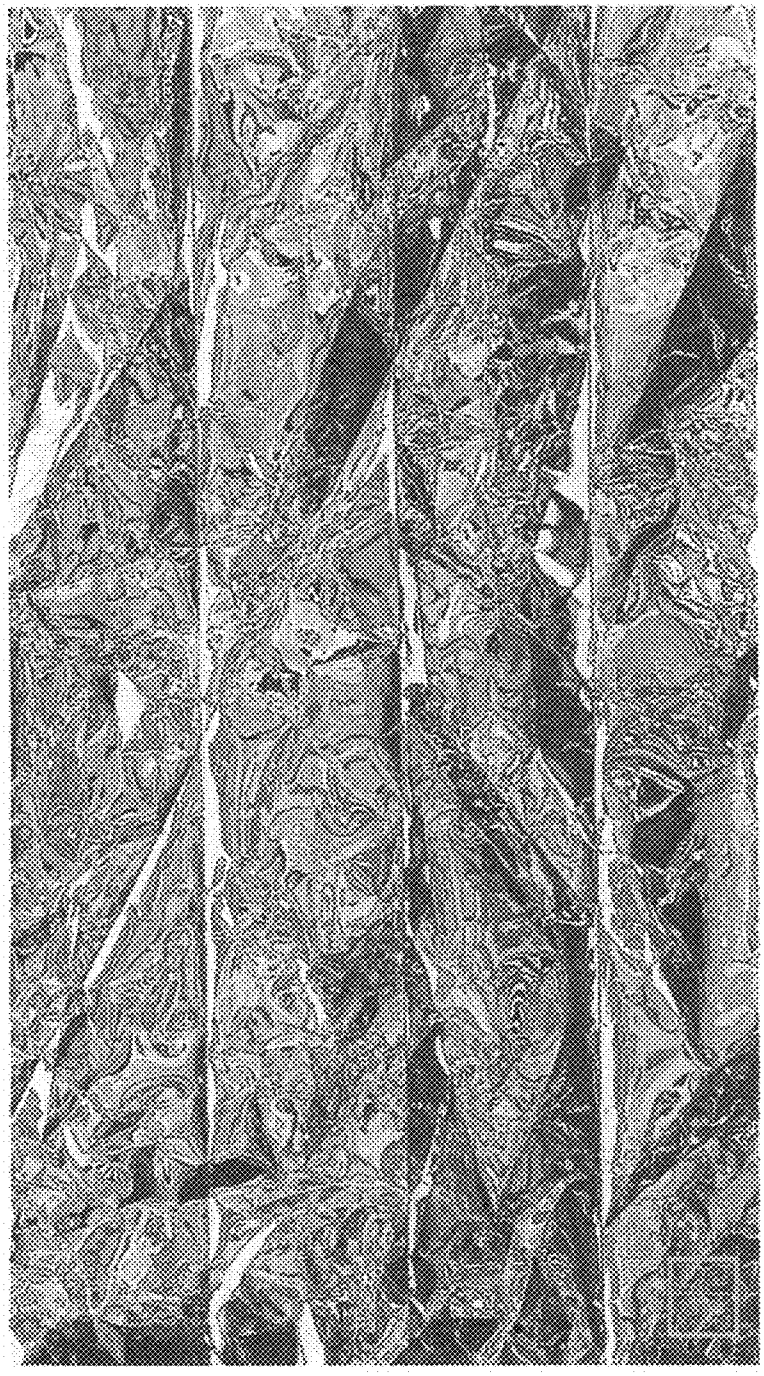
Figure 27:
Figure 28:
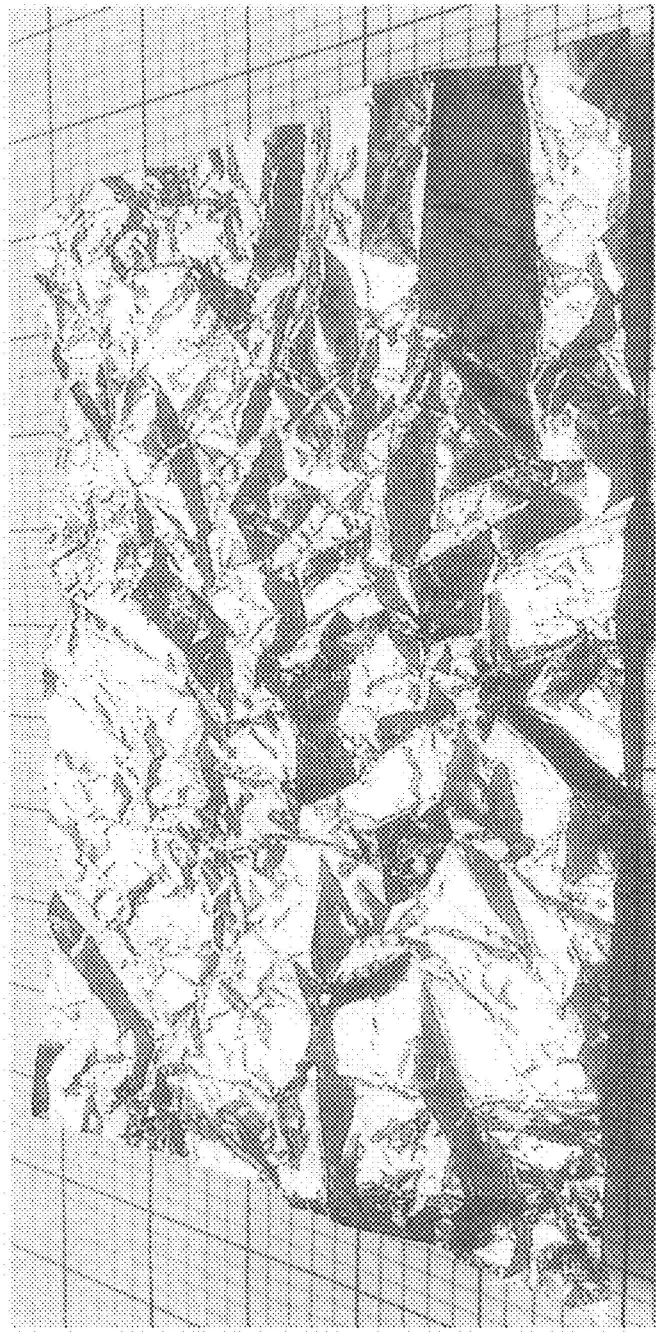
Figure 29:
Figure 30:
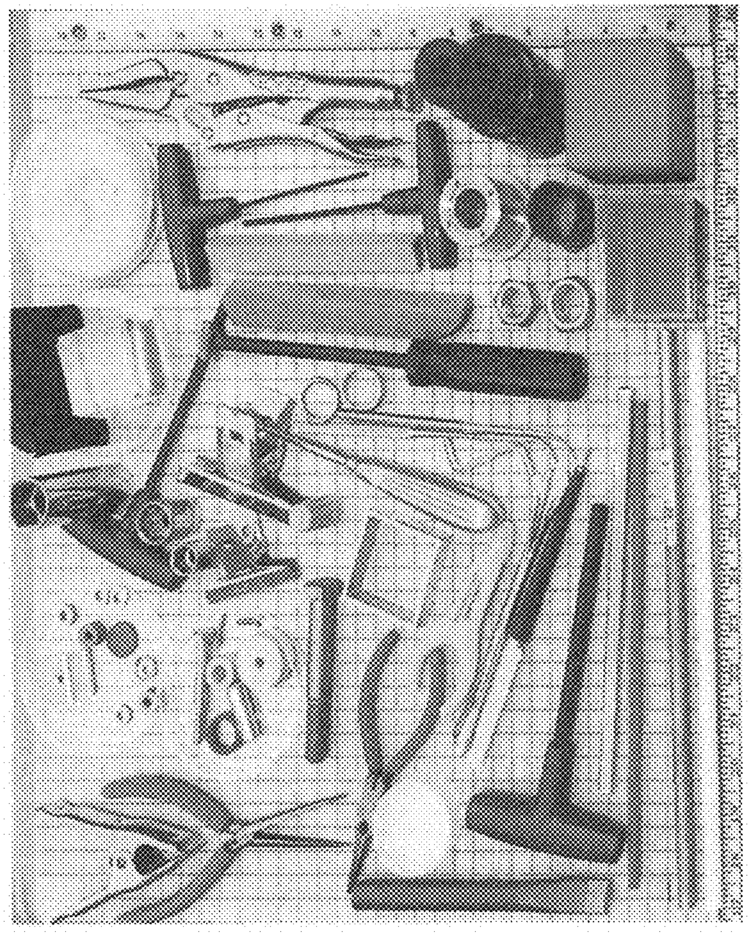
Figure 31:
Figure 32:
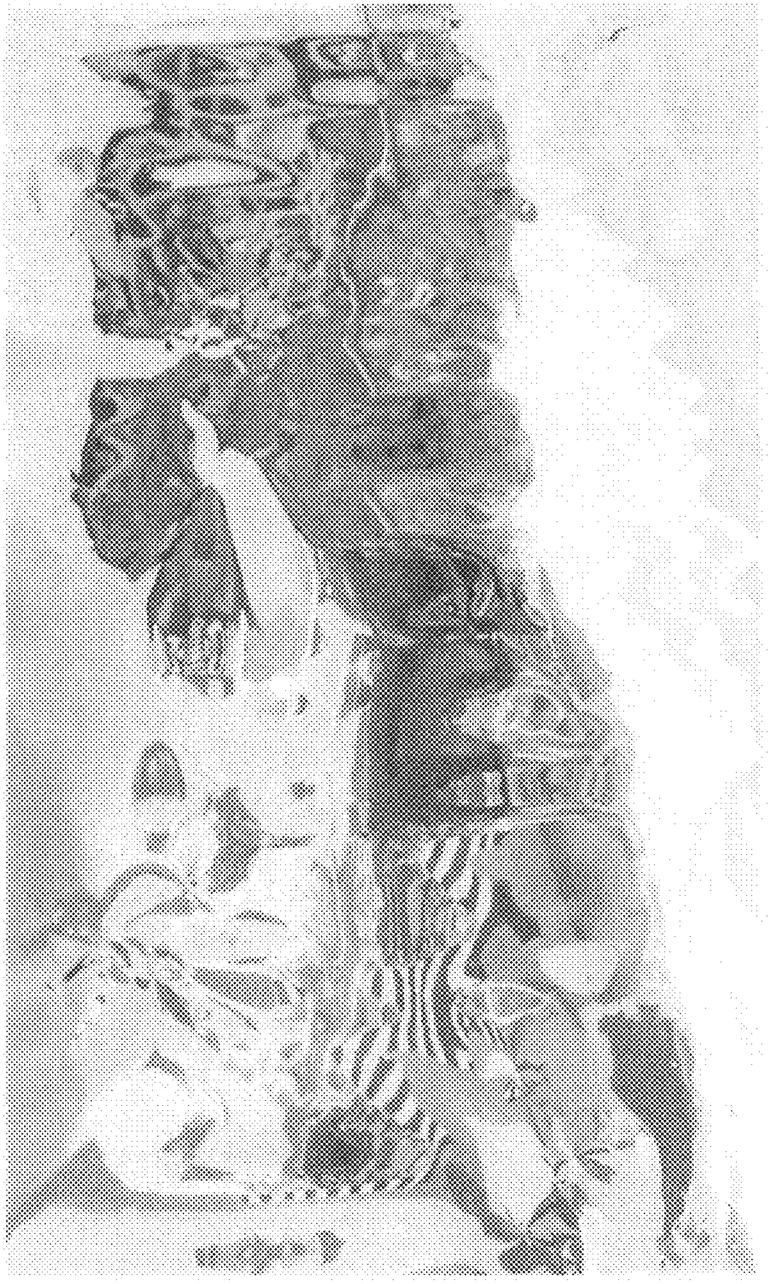
Figure 33:
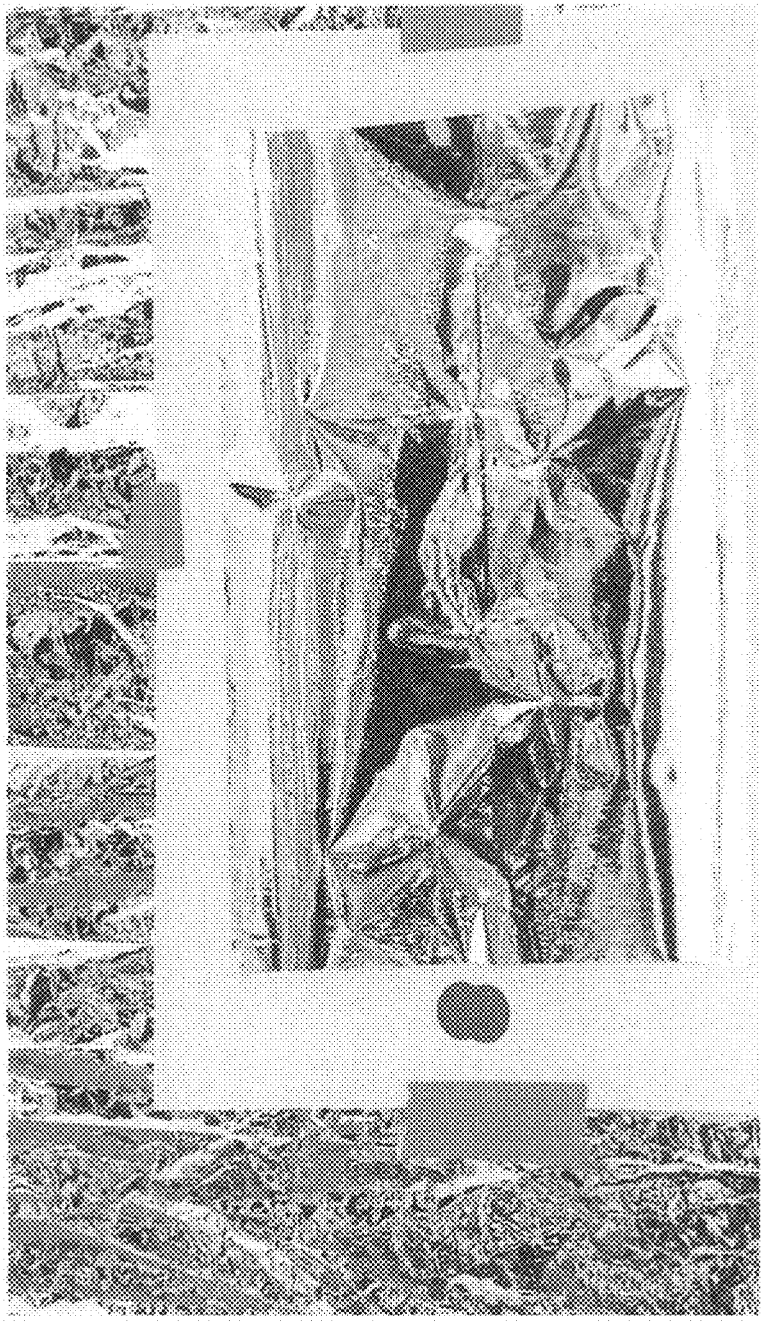
Figure 34:
Figure 35:
Figure 36:
Figure 37:
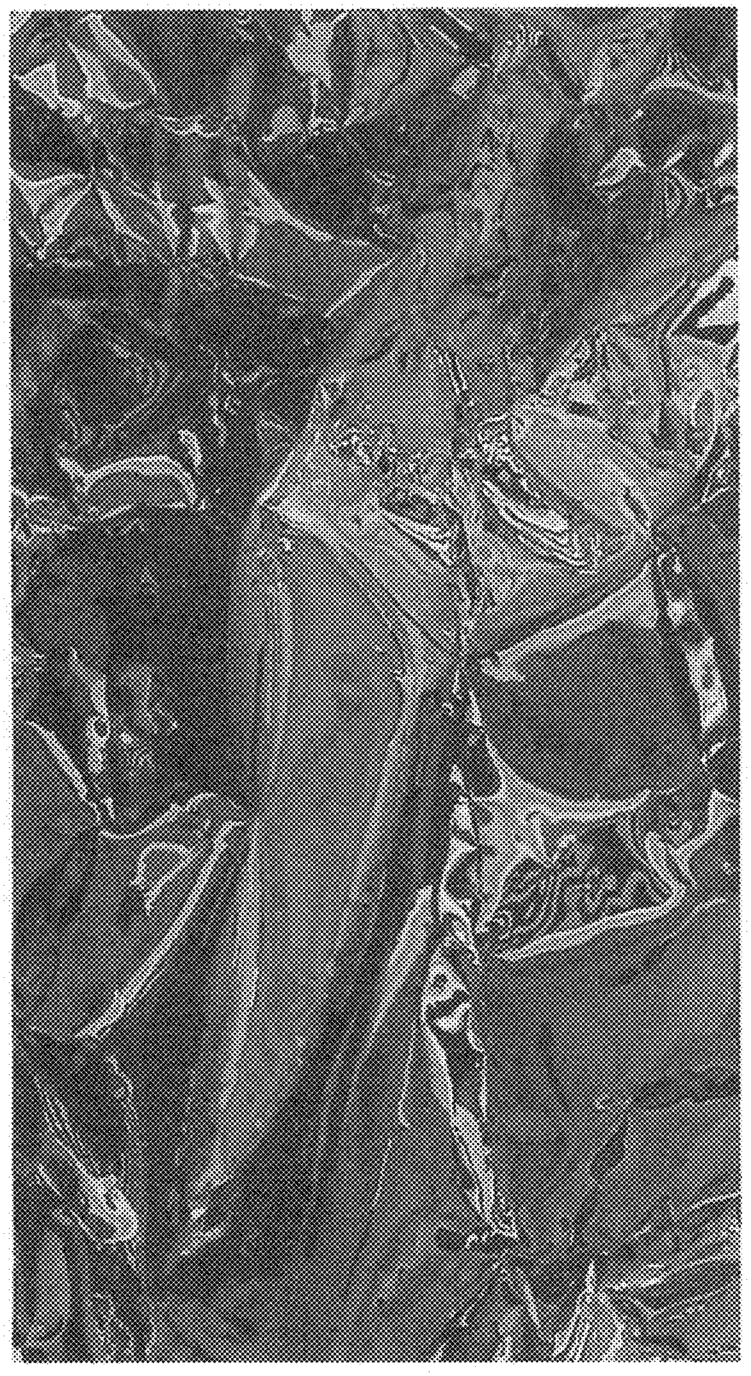
Figure 38:
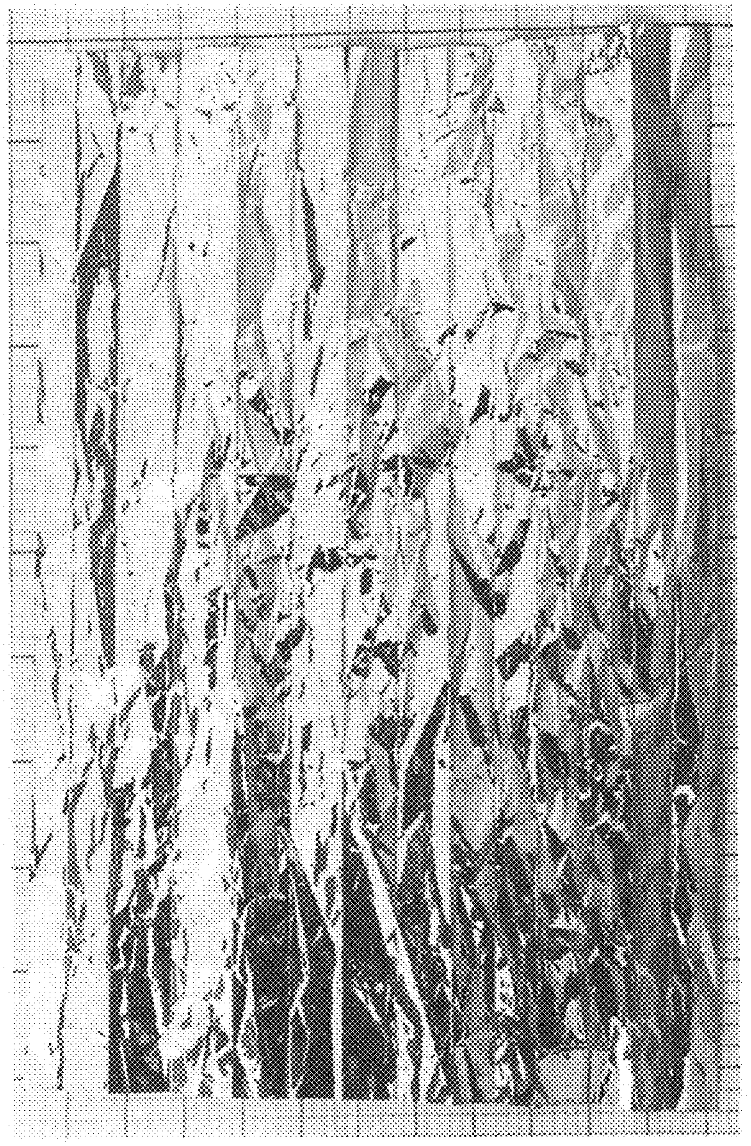
Figure 39:
Figure 40:
Figure 41:
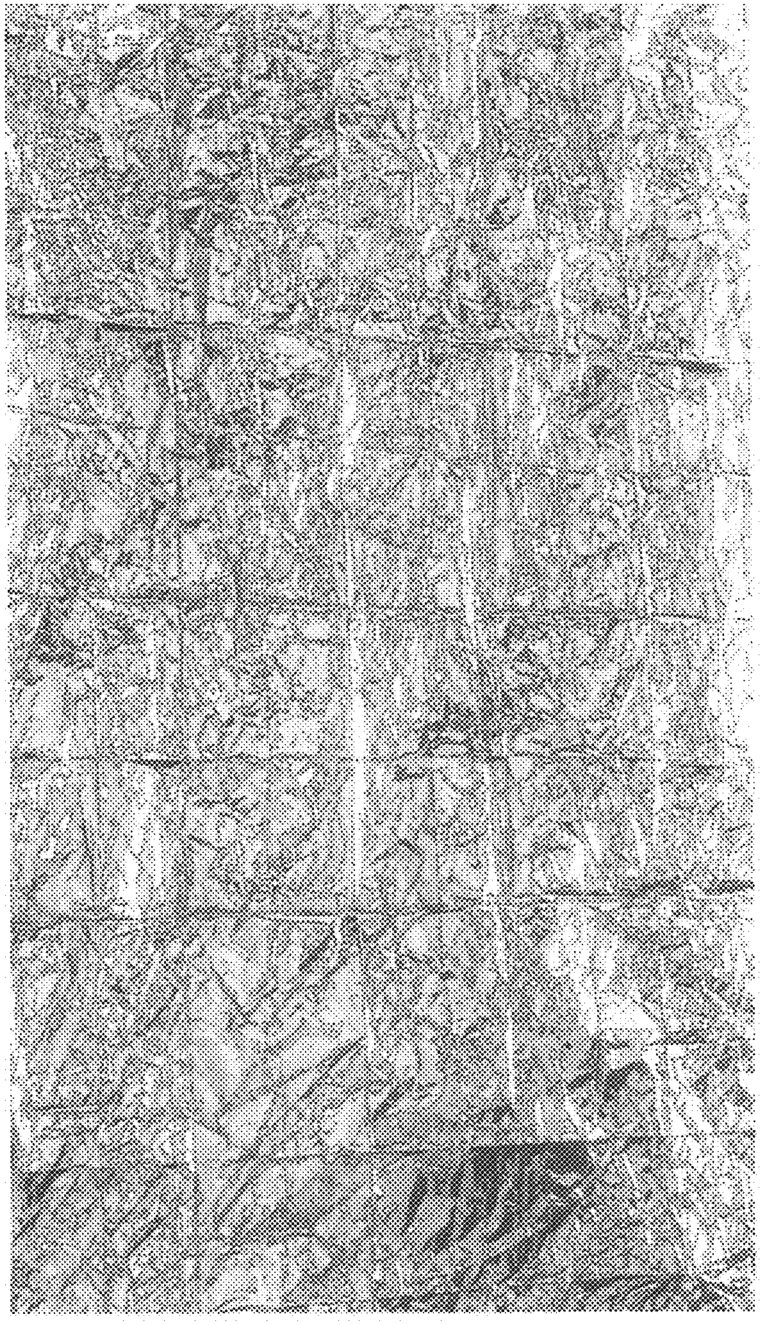
Figure 42:
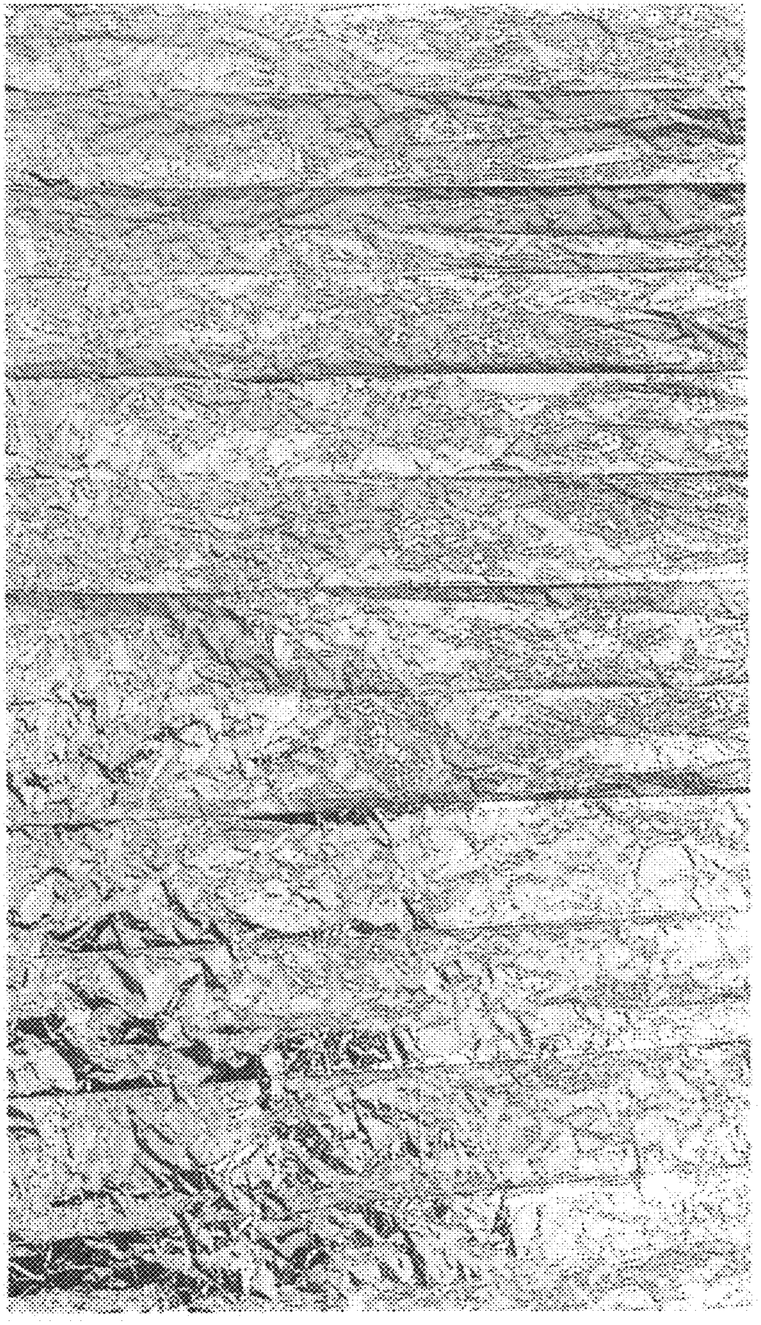
Figure 43:
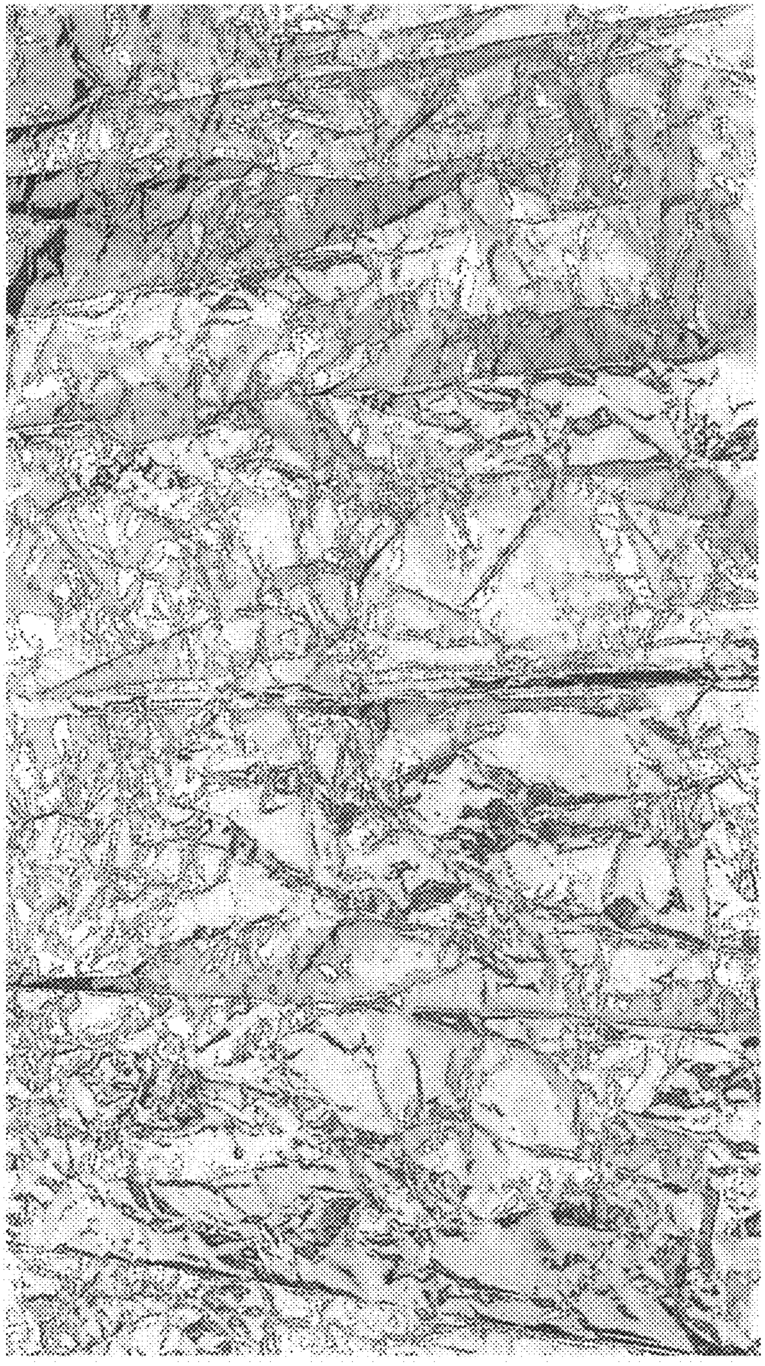
Figure 44:
Figure 45:
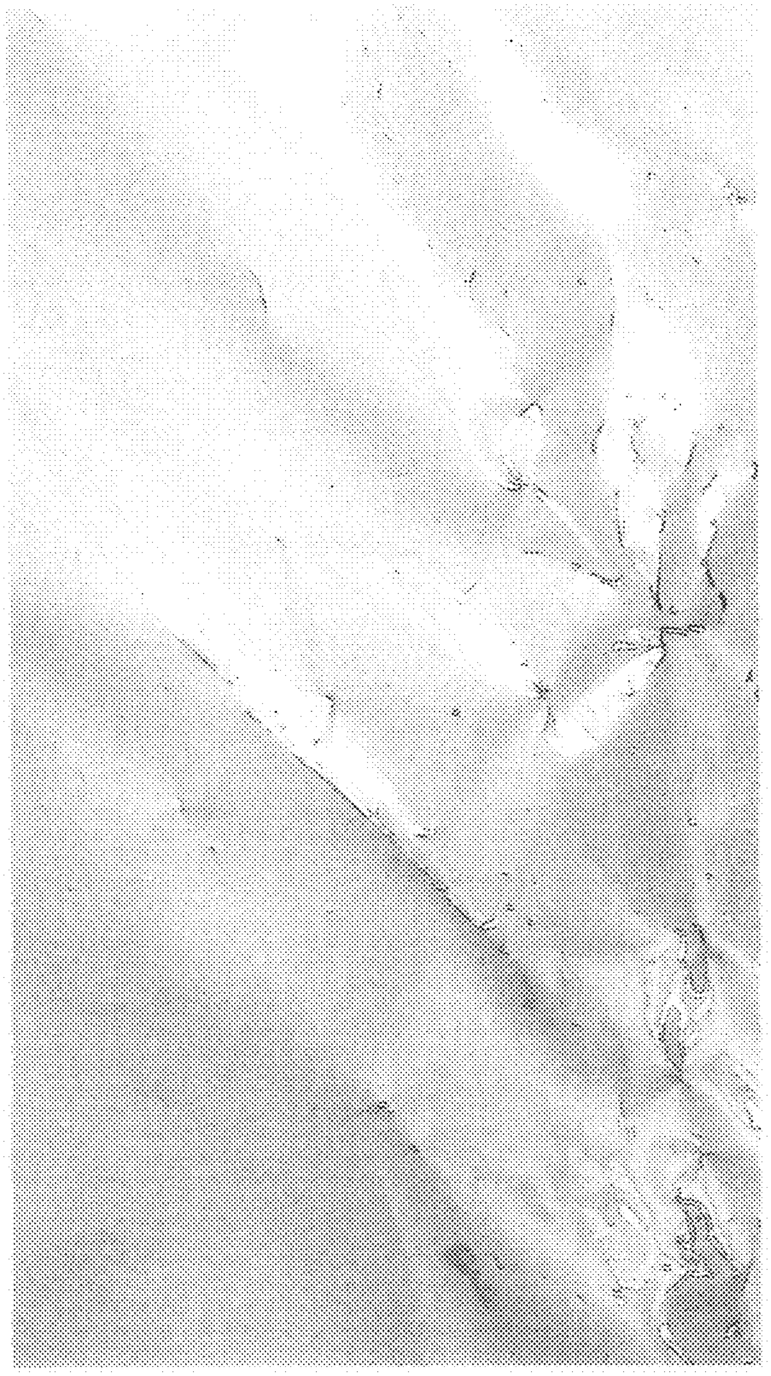
Figure 113:
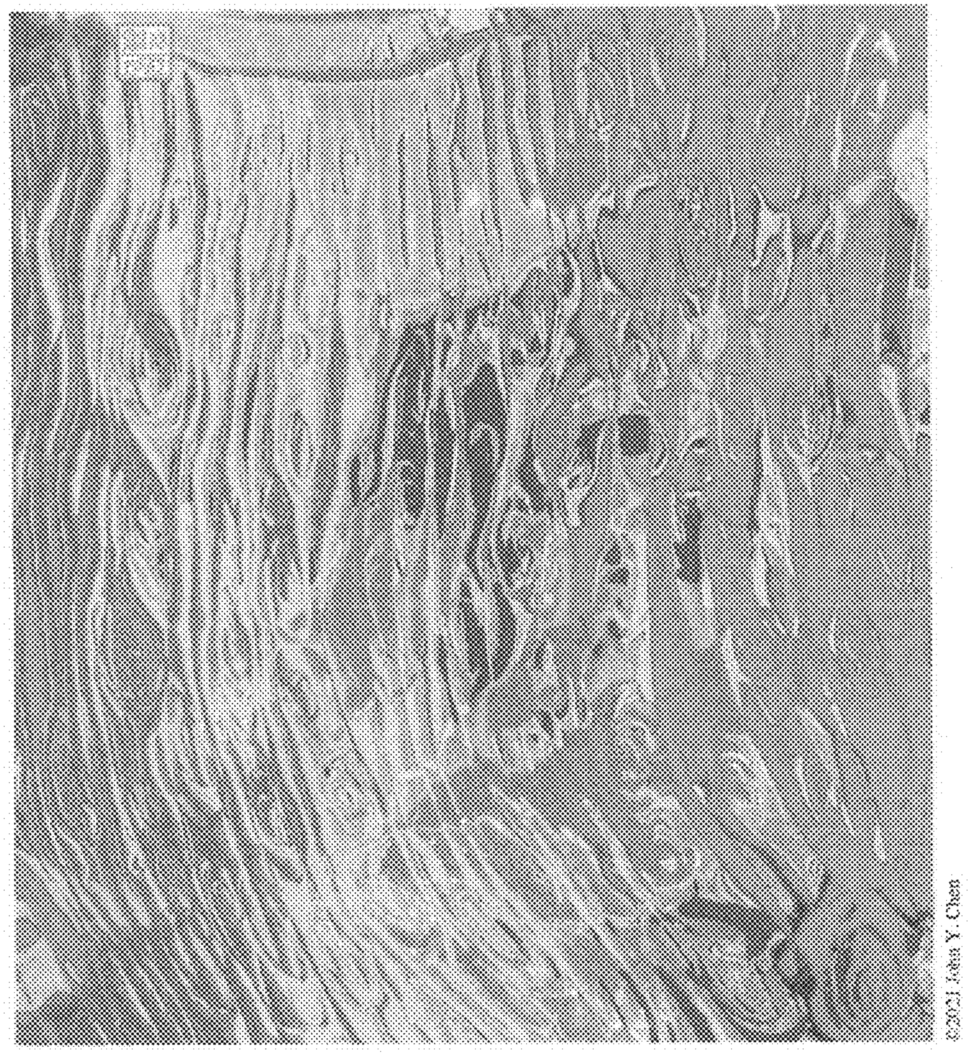
Figure 114:
Figure 115:
Figure 116:
Figure 117:
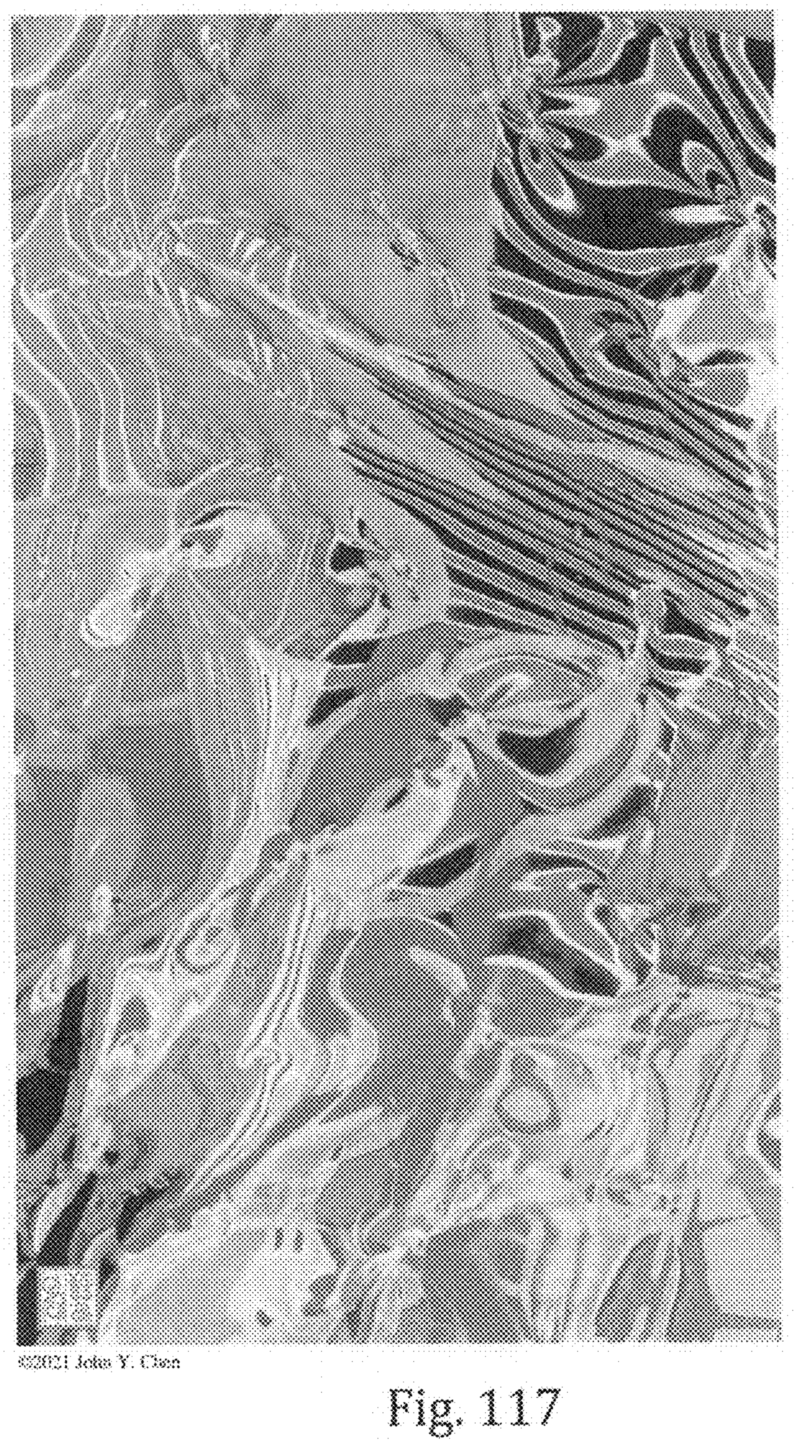
Figure 118:
Figure 119:
Figure 120:
Figure 121:
FIGS. 121 and 122 are created with human touches of extended line ball point pen renderings by hand drawing on mirror films of both right hand and left hand prints, which are example of another one of Nature's evolution handy work designed facets skin folds.
Figure 122:
Figure 123:
FIGS. 123 and 124 are extended lines impressions of a pair of human foot prints rendered with an inkless ball point pen, with both mirror film facing the same scene.
Figure 124:
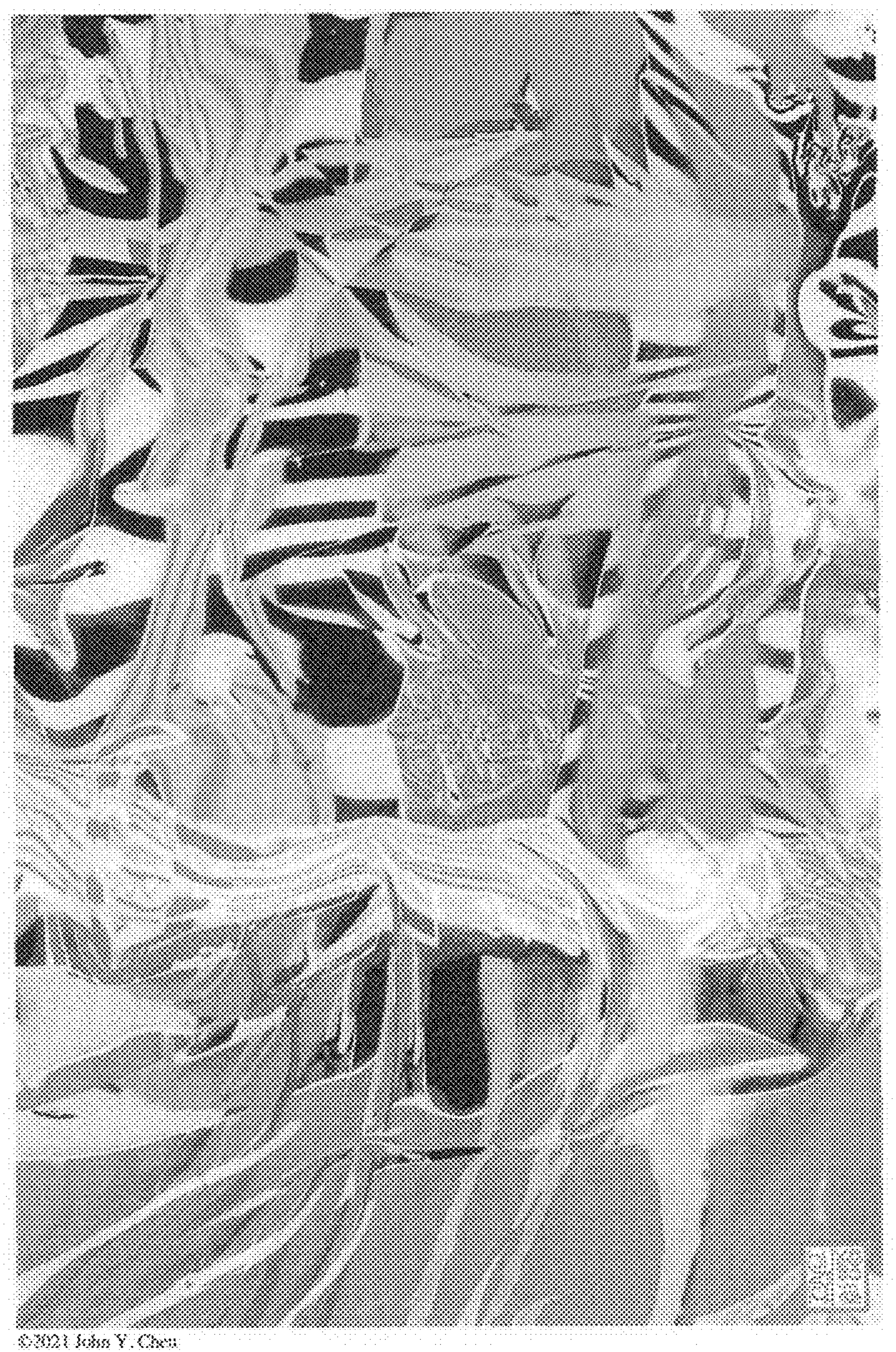

The same can be said of the virtual images' reflections from FIG. 14 (comprises mirror films FIGS. 12, 13, and 41 and virtual images FIG. 113 and FIG. 115) that include (objects) presentations of said observer, building (approximately 8 meters distance away from said films), and blue sky above much farther away in daylight all unrecognizable bits and pieces of the whole scene presented at said distance in front of said mirror films. Those imaged bits and pieces being reflected beck at the camera lens or observer reversed and located at equal distances behind each of those mirror facets' surfaces recorded on a light sensitive surface or reconstructed by the mind (human vision) as a whole, is not congruent with the objects, but symmetrical to it with respect to each of the facets' deformed reflecting planes. This is the guiding physics of practicing the methods and displays of the invention, as no greater virtual imaging details of a real world scene can be achieved any other way and so simply.

The display encompasses both the real-world image of the real world display appearing in the "other-worldly virtual images" seen by an observer and captured in an optical recording means including the real world physical display (at all instants in time continuum) in the very act of reflecting real-world scenes appearing in the captured "other-worldly virtual images" in the presence or absence of an observer.

Figure 46:
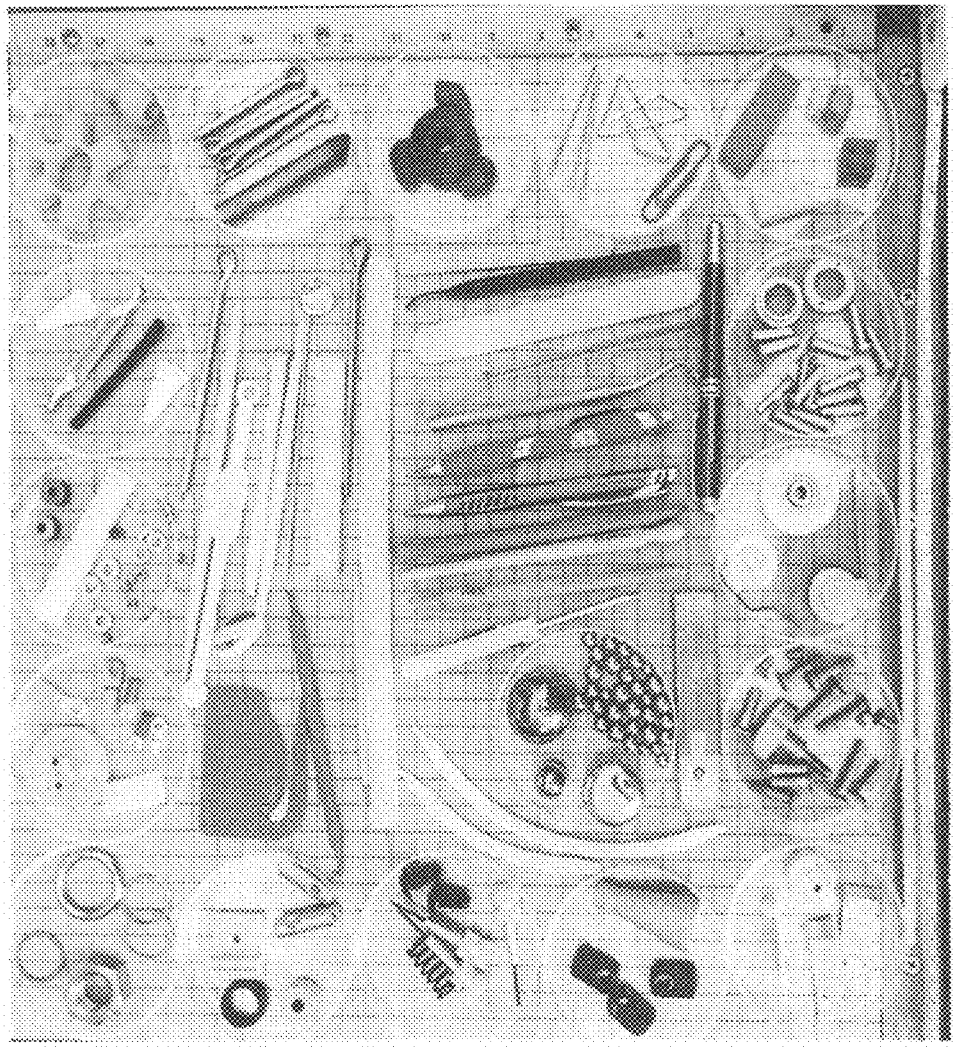
Figure 47:
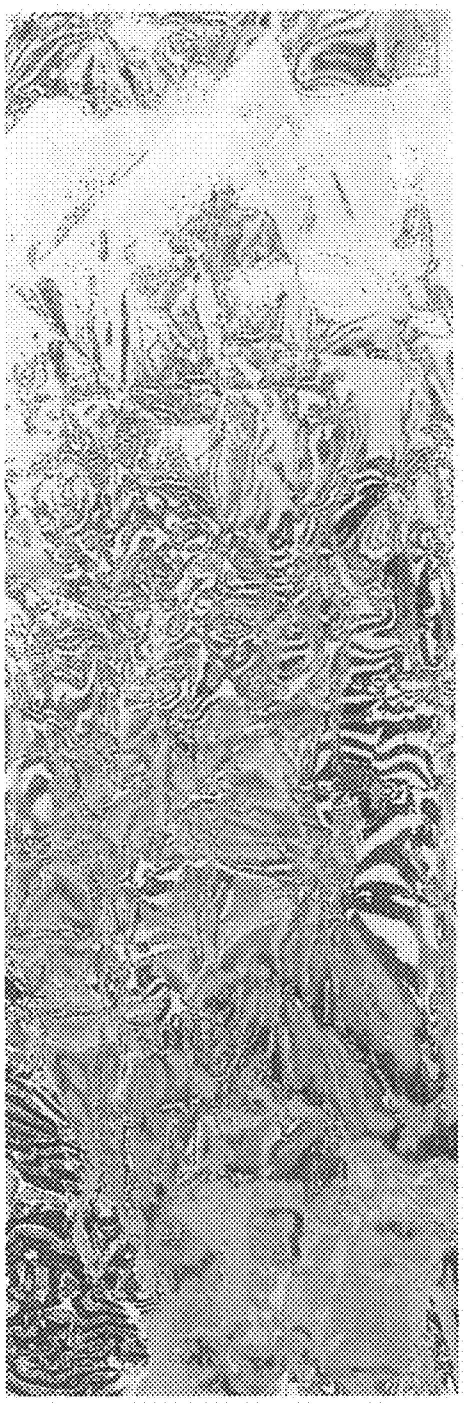
Figure 48:
Figure 49:
Figure 50:
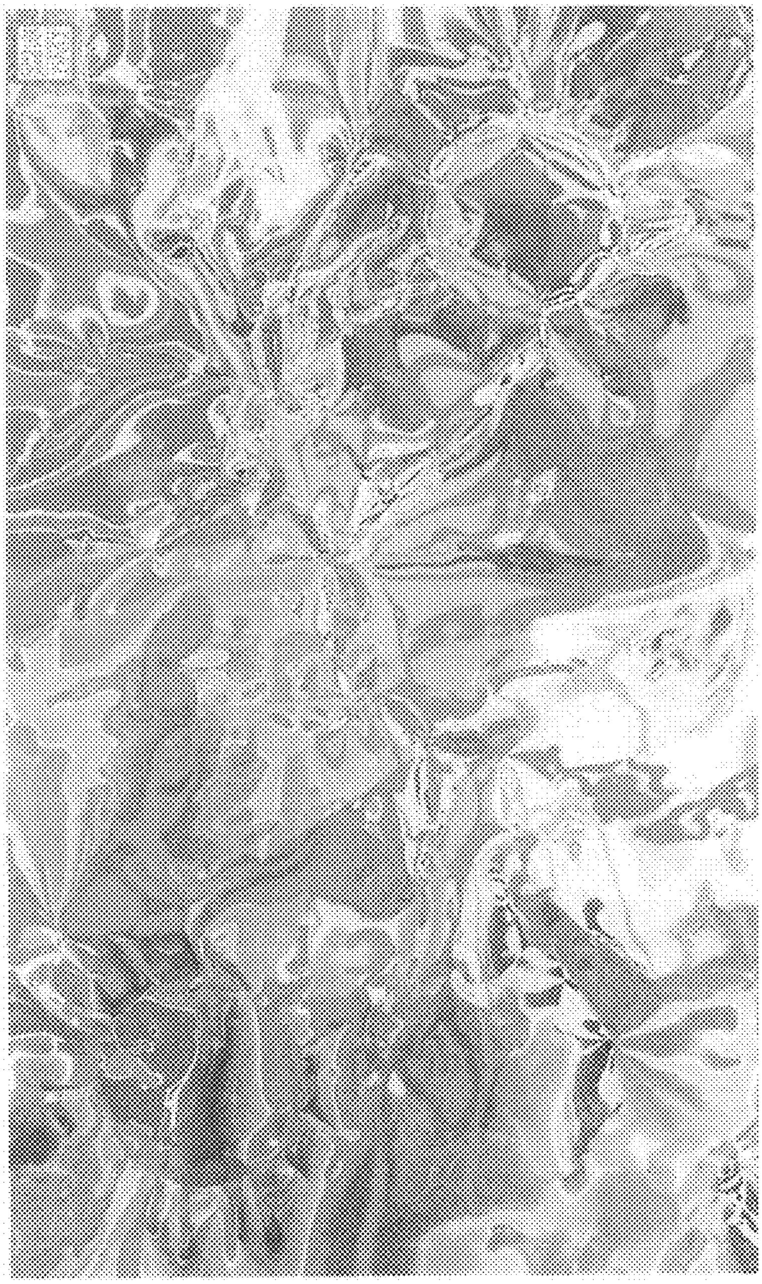
Figure 51:
Figure 167:
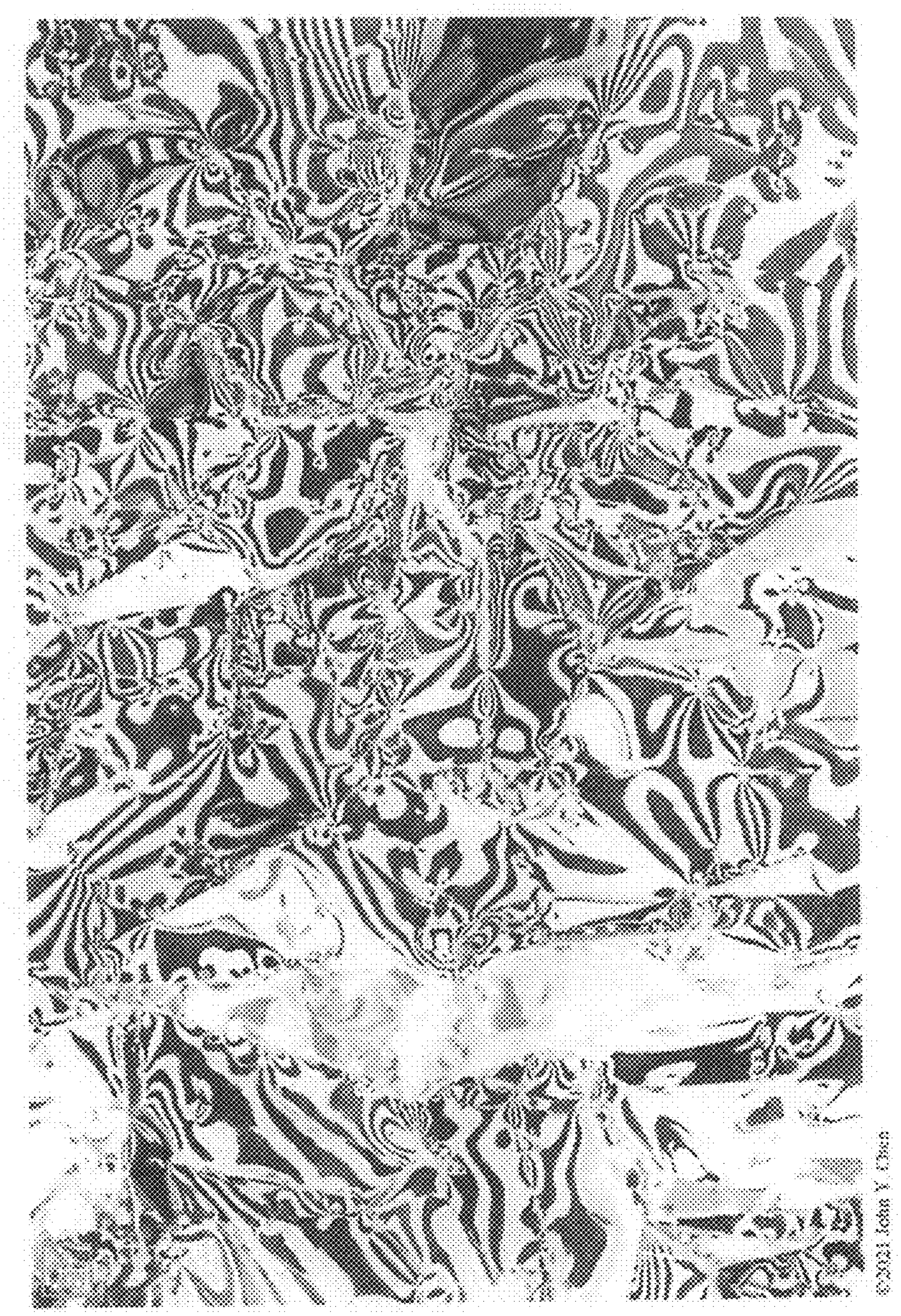

A few more one-of-a-kind virtual images comprising: FIGS. 46 thru 167 are included to demonstrate the potential of an infinite number of possible one-of-a-kind virtual images that can be created (captured with camera imaging means) by anyone (artist or a non-artist alike) practicing this science (methods) for art sake invention, because never two virtual images will look exactly alike, as any minuscule (less than a millimeter) change of a viewer's viewing position (or picture capture means) causes changes in the resulting captured picture of virtual image using an optical imaging means, which optical images capture means are different from a person's binocular pair of eyes looking (into the mirror display) of any real world scene.

An example of a soft material is a thermoplastic elastomer gel described in U.S. Pat. No. 4,369,294 having a gel rigidity of about 20 gram Bloom to about 700 gram Bloom as measured by the gram weight required to depress a gel a distance of 4 mm with a piston having a cross-sectional area of 1 square cm at 23° C.

A source of laser light (mentioned above) used to illuminate mirror films (at night) was from a 9 vote operated Alltrade® Model #480742 digital infrared thermometer (of hand gun blunt-shape designed) rated a Class II Laser Product, which light patterns were reflected on the walls of said room presentations facing said film for viewing.

I claim:

1. An optical mirror display comprising:

(1) a releasably abutting and positionally adjustable structural support backing for securely attaching one or more selected thin, flexible, elastic optical plane mirror films having a selected film thickness and surface topology shaped area characterized by a selected continuous specularly reflective metal-coated surface comprising:

(2) a plurality of selectively formed integrally irreversible three-dimensional deformations of selectively formed shaped reflective deformation planes over said surface topology shaped area including a plurality of substantially flat mirror facets, a plurality of folded mirror ridges, and a plurality of mirror vertices;

(3) wherein said display selectively positioned facing a selected three-dimensional real-world scene illuminated by one or more selected photon illuminations for recording with one or more selected imaging recording means by an observer viewing reflections in said display comprising:

(4) other-worldly encompassing virtual images of varying directional orientations appearing ever changing with respect to said observer's movements and changing viewing positions no matter the scope of said observer's gaze being wide or narrow over different areas of said deformation planes facing said real-world scene being transformed in said display comprising:

(5) a selected complexity of other-worldly imaging areas of fine details including a plurality of large to a myriad of smaller than about one millimeter size selected visual elements of colors, objects, patterns, areas, shapes, textures, including mingling of said elements of said real-world scenes, displaced, rearranged, reversed, symmetrical, scattered in different directions appearing in said display unrecognizable, surprisingly abstract, entirely outside of said observer's viewing experiences, and a complete departure away from said observer's objective views of said facing real-world scenes into other-worldly virtual images;

(6) wherein said other-worldly virtual images having no physical existence arising from realms of other-worldliness encompassing:

(7) a realm of virtual reality other-worldliness, augmented reality other-worldliness, including encompassing a realm epitomize abstractions of artistic other-worldliness virtual images transformed in said display of said real-world scene providing various uses of said other-worldly virtual images comprising:

(8) one or more selected reducible tangible real-world images having utility in virtual reality imaging, augmented reality imaging, and capable of being formed into real-world images comprising:

(9) one or more real-world abstract artistic images created from said other-worldly virtual imagery appearing in said display in combination with employing selected adjustable characteristic workings of one or more selected virtual imaging recording means and one or more selected real imaging production enabling means comprising:

(10) one or more selected camera system recording means including digital cameras, film cameras, video cameras, phone cameras capable of capturing, recording, using, storing said virtual images and real images of said surface topology for playback, and creating selected tangible said real-world images from said other-worldly virtual image recordings of virtual image reflections appearing in said displays selected for augmented reality uses, virtual imaging recording uses, and said abstract artistic other-worldliness imaging production uses;

(11) wherein said selected deformations formed by one or more selected force-displacement means of stretching, buckling, crumpling, forming one or more selected folds, and using one or more selected tool means forming deformations including selected extended line indentations and creases on said mirror films' surfaces comprising:

(a) a plurality of develop ordered deformations,
(b) a plurality of develop disordered deformations,
(c) a plurality of arbitrary develop ordered geometric deformations,
(d) a plurality of ordered in-plane deformations,
(e) a plurality of ordered out-of-plane deformations,
(f) a plurality of localized strain deformations,
(g) a plurality of imposed long ranging ordered deformations upon disordered deformations,
(h) a plurality of imposed long ranging ordered deformations upon ordered deformations,
(i) a plurality of selected sequential disordered deformations,
(j) a plurality of selected sequential develop ordered deformations upon ordered deformations,
(k) a plurality of develop ordered deformations upon disordered deformations,
(l) a plurality of disordered deformations upon ordered deformations,
(m) a plurality of disordered in-plane and out-of-plane said deformations comprising said substantially flat mirror facets, folded mirror ridges, and mirror vertices,
(n) a plurality of drawn selected extended line indentation impressions,
(o) a selected plurality of facets drawn selected line indentation impressions, and
(p) a plurality of selected drawn extended line indentation impressions comprising over lapping loops, circles, intersecting straight and curved lines, extended lines of sharp angle turns, extended quick starts and stops drawn lines, lines turning back around, lines ending abruptly lifting off forming very fine indentation impressions of very fine ending tips;

(12) wherein said selected deformations further characterized by:

(a) a first said mirror topology of said develop disordered deformations comprising a selected mirror network, $N_1$, having said plurality of substantially flat mirror facets, $F_1$, of substantially triangular shapes characterized by a plurality of substantially straight folded said mirror ridges, $R_1$, meeting at a plurality of said mirror vertices, $V_1$, and disorderly distributed spanning a wide range of size scales on said surface;

(b) a second said mirror topology of said develop ordered deformations comprising a selected mirror network, $N_2$, having a plurality of substantially flat develop mirror facets $F_2$ of substantially triangular shapes of a plurality of substantially straight develop mirror ridges $R_2$ sharing a common ridge of substantially equal adjacent angle to one another, said ridges $R_2$ emanating outwardly meeting said plane surface from a commonly joined shared ordered mirror vertex $V_2$;

(c) a third said mirror topology of said develop ordered deformations comprising a selected mirror network, Na having a plurality of neighboring said $N_2$ network deformations distributed on said surface having said plurality of straight develop mirror ridges $R_2$ emanating from one or more different near-by said neighboring ordered mirror vertices $V_2$ outwardly and intersecting other said develop more develop ridges characterized by a plurality of substantially flat develop mirror facets $F_3$ of substantially triangular shapes including a plurality of one or more other substantially flat develop mirror shapes of quadrilaterals and polygons on said surface, said intersecting of ridges characterized by one or more intersections of develop mirror vertices $V_3$;

(d) a fourth said mirror topology of said develop ordered deformations comprising a selected network, $N_4$ having a plurality of substantially flat develop mirror facets, $F_4$, of substantially straight triangular shapes characterized by a plurality of substantially straight line segment ordered mirror ridges $R_3$ each with two opposite end develop mirror vertices $V_4$ and $V_5$, said $V_4$ having a plurality of substantially outwardly directed and substantially straight develop mirror ridges $R_4$ of substantially equal adjacent angle to one another emanating from said $V_4$ meeting said surface, and said $V_5$ having a plurality of substantially outwardly directed and substantially straight develop mirror ridge $R_5$ of substantially equal adjacent angle to one another emanating and meeting said surface;

(e) a fifth said mirror topology of said develop ordered deformations comprising a selected network, $N_5$ having a plurality of substantially flat mirror facets $F_5$ and $F_6$; said $F_5$ comprises substantially straight triangular shapes characterized by one or more selected substantially curve line segment ordered mirror ridges $R_6$ each with two opposite end develop mirror vertices $V_6$ and $V_7$, said $V_6$ having a plurality of substantially outwardly directed and substantially straight develop mirror ridges $R_7$ of substantially equal adjacent angle to one another emanating and meeting said surface, and said V-having a plurality of substantially outwardly directed and substantially straight develop mirror ridges $R_8$ of substantially equal adjacent angle to one another emanating and meeting said surface; and said $F_6$ comprises a plurality of develop mirror vertices Va distributed substantially equally spaced apart on said $R_6$, and each said $V_8$ having one or a plurality of adjacent outwardly directed and substantially straight develop mirror ridges $R_9$, said one $R_9$ emanating in a direction normal to the tangent at said $V_8$ on said Re meeting said surface, and said plurality of $R_9$ sharing a common said $V_8$ emanating outwardly directed at about the center between two congruent said $R_9$ in said direction normal to the tangent at said Va meeting said surface;

(f) a sixth said mirror topology of said develop ordered deformations comprising a selected network, Ne having a plurality of substantially flat ordered mirror facets $F_7$, $F_8$, $F_9$ said $F_7$ comprising one or more selected same or different geometric mirror shapes of one or more selected same or different sizes, including triangles, quadrilaterals, polygons; each of said shapes encompassing a selected said area on said surface bounded by three or more straight line ordered mirror ridges $R_{10}$ join at three or more ordered mirror corner vertices $V_9$ having a plurality of outwardly directed and substantially straight develop mirror ridges $R_{11}$ of substantially equal adjacent angle to one another emanating from each said $V_9$ meeting said surface; said $R_{11}$ forming one or more intersection develop mirror vertices $V_{10}$ with one or more other said $R_{11}$ emanating outwardly from a neighboring one or more different near-by said neighboring said $V_9$; and said $F_6$ bounded by said $R_{11}$ connected at said $V_{10}$ characterized by substantially triangular shapes including a plurality of one or more other substantially flat develop mirror shapes of quadrilaterals and polygons on said surface; said $F_9$ comprising one or more said $R_{10}$ of $V_9$ forming one or more intersection develop mirror vertices $V_{11}$ with one or more said $R_{11}$ of one or more neighboring said $F_7$ bounded by said $R_{11}$, one or more aid $R_{10}$, one or more said Vg, and one or more said V: characterized by substantially triangular shapes including one or more other substantially flat develop mirror shapes of quadrilaterals and polygons within said encompassing area of one or more neighboring said $F_7$ of said geometric shapes:

(g) a seventh said mirror topology of said develop ordered deformations comprising a selected network, Ny having a plurality of substantially flat geometric curve shape ordered mirror facets $F_9$ comprising one or more selected same or different geometric-curved shapes of one or more selected same or different sizes including a circle, a semicircle, a circular sector, a lune, an ellipse, an oval, including a lens; each of said shapes encompassing a selected said area on said surface bounded by one or more curved ridges $R_{12}$ having a plurality of develop mirror vertices $V_{12}$ distributed substantially equally spaced apart on said $R_{12}$, and each said $V_{12}$ having one or a plurality of adjacent outwardly directed and substantially straight develop mirror ridges $R_{13}$, said one $R_{13}$ emanating in a direction normal to the tangent at said $V_{12}$ on said $R_{12}$ meeting said surface, and said plurality of $R_{13}$ sharing a common said $V_{12}$ emanating outwardly directed at about the center between two congruent said $R_{13}$ in said direction normal to the tangent at said $V_{12}$ meeting said surface;

(h) an eighth said mirror topology of said imposed ordered deformations comprising a selected network, $N_5$, having a selected number of substantially flat parallel develop ordered mirror facets $F_{10}$ comprising a plurality of parallel straight line accordion fold imposed ordered mirror ridges $R_{14}$ having a selected separation distance from one another spanning on said plane mirror surface imposed upon said develop disordered deformations of said mirror networks $N_1$;

(i) a ninth said topology of said imposed ordered deformations comprising a selected network, Ng having a plurality of parallel horizontal straight line accordion fold ordered mirror ridges $R_{14}$ of a selected separation distance from one another, and a plurality of substantially flat parallel developed ordered mirror facets $F_{11}$ comprising a plurality of parallel vertical straight line accordion fold ordered mirror ridges $R_{15}$ of a selected separation distance from one another, said ridges $R_{14}$ intersecting said ridges $R_{15}$ at develop mirror vertices $V_{13}$ of approximately 90 degrees on said plane mirror surface imposed upon said develop disordered deformations of said mirror networks $N_1$;

(j) a tenth said topology of said imposed ordered deformations comprising a selected network, $N_{10}$ having a selected plurality of substantially flat parallel develop mirror facets $F_{12}$ comprising a plurality of parallel horizontal straight line accordion fold ordered mirror ridges $R_{16}$ of a selected separation distance from one another, and a plurality of substantially flat parallel develop mirror facets $F_{13}$ comprising a plurality of parallel straight line accordion fold ordered mirror ridges $R_{17}$ of a selected separation distance from one another, said ridges $R_{16}$ intersecting said ridges $R_{17}$ on said plane mirror surface at develop vertices $V_{14}$ of an angle of less than 90 degrees, said mirror surface imposed upon said develop disordered deformations of said mirror networks $N_1$;

(13) wherein said selected photon illuminations comprising:

(a) an outdoor sunlight illuminated selected real-world scene, (b) an indoor sunlight illuminated selected real-world scene, (c) an indoor selected one or more said different photons illuminated selected real-world scene, (d) a selected night time surround real-world scene facing one or more selectively positioned displays situated in said surround real-world scene having said displays independently illuminated by one or more selected night time photon illumination sources including stroboscope light of sufficient photon intensity directed at selected surface areas of each said displays for providing specular reflections off of each said displays' photon illuminated surface areas used for illuminating said facing real-world scenes in proximity of each said display causing diffuse reflections from said real-world scene appearing in corresponding said facing displays creating special effects of other-worldly virtual images appearing in corresponding facing said displays, (e) a selected real-world scene illuminated by one or more different laser photon emissions, (f) a fire works illuminated selected real-world scene, (g) a chemical luminance illuminated selected real-world scene, (h) a microwave illuminated selected real-world scene comprising said mirror film having a selected metal coating thickness suitable for said display and capable of selective reflection of microwave photons illumination; and

(14) wherein virtual image reflections in said display of said one or more real-world scenes comprising:

(a) a selected stationary real-world scene, (b) a selected moving real-world scene, (c) a recorded video playback images of one or more selected real-world scene, (d) a live video of a selected real-world scene, (e) a television screen image of a selected real-world scene, (f) a walk around real-world scene in substantially face-apart relation with one or more selectively positioned portable displays comprising one or more three dimensional shaped real objects securely attached on a selected area of said displays for creating an augmented view of said real objects encompassed on said displays by said other-worldly virtual images including fine detailed visual elements appearing in said displays viewed by an observer at a selected viewing position using a said recording means situated in substantially space-apart relation arrangements facing said displays for recording real-world images of said real objects positioned over one or more said other-worldly virtual imaging areas appearing in said displays, as exemplified in representative views of the Drawings of FIGS. 14, 31, 33, 38, and 82-90;

(g) a surrounding real-world scene in substantially face apart relation with one or more selectively positioned displays comprising transformed other-worldly virtual images including fine detailed visual elements appearing in said displays for viewing by an observer at a selected viewing position using a selected recording means situated in substantially space-apart relation arrangements facing said displays for recording reflections of other-worldly virtual images appearing unrecognizable in said displays as exemplified in representative views of the Drawings of FIGS. 11, 20-23, 25-27, 29, 32, 34-36, and 47-167;

(h) a plurality of selected real-world scenes of virtual imaging elements appearing in said displays for recording of other-worldly virtual images as exemplified in said representative views of the Drawings of FIGS. 11, 14, 16, 17, 19-23, 25-29, and 47-167 exhibiting said other-worldly virtual imaging areas comprising complexities of fine details appearing in said displays recorded by said observer using said recording means for production of said figures of the Drawings; and (i) a real-world scene having one or more displays selectively positioned and situated in the following said real-world scene facing displays arrangement relationships and the number of resulting virtual images produced in said displays' relationships, comprising: facing a single display produces one virtual image, facing two displays at 90 degrees produces three virtual images, facing two displays at 60 degrees produces more than three virtual images, facing two displays at zero degrees (displays in parallel facing relationship) produces infinite number of virtual images.

2. A method comprising selected steps of forming one or more mirror topology comprising extended line indentation deformations on a selected thin, non-directional high gloss polished mirror metal sheet display surface of selected properties including flexibility, rigidity, tensile strength, and elongation at fracture, wherein said method steps comprising: imposing one or a plurality of selected extended line indentations on said display surface, (a) using nil or one or more of a removable selected surface additives in combination with (b) using one or more of a selected sizes high force load rolling ball bearings indentation means forming controlled said extended line ordered deformations of selected short and extended continuous line indentation deformations over said mirror metal surfaces comprising: continuous curves and circular lines formed by turning and twisting said bearing movements forming: (i) intersecting crescent facets, (ii) extended lines of ripples, (iii) straight extended intersecting lines forming facets patterns by dividing surface spaces, and forming (iv) intersecting line angles; imposing one or a plurality of selected in-plane and out-of-plane said extended line deformations on said display surface in combination with using said line deformations for displaying and transforming of one or more three-dimensional real-world scene into one or a plurality of other-worldly virtual images including using said virtual images for producing a higher ordered virtual imaging display; recording one or more real images of said virtual images including storing said real images of said virtual images recorded for play back and printing one or more selected said real images recorded of said virtual images for selected uses comprising:

video, production, transmission, broadcasting, recording, playback, printing, display and art education uses; wherein said printing comprising:

(1) printing said real images recorded of said virtual images of one or more selected virtual images appearing in another one or more selected virtual imaging displays positioned in face-to-face relation with one or more selected real-world scenes;

(2) printing said real images recorded of one or more said virtual images of one or more other selected real image recorded of one or more same said virtual images;

(3) printing said real images resulting from of steps (1) and (2) on one or more selected fabrics materials.

3. A method comprising selected alternative $Y_1$, $Y_2$, and $Y_3$ method steps of forming one or more selected deformations on a selected thin, flexible, elastic optical mirror film display surface comprising:

(a) imposing one or a plurality of indentation impressions on said display surface into one or more selected soft materials at one or more selected indentation depths for forming said selected deformations, in combination with (b) imposing one or more develop disordered deformations on said display surface by one or more selected means of crumpling said film for forming said selected deformations, in combination with (c) imposing one or more selected ordered deformation mirror folds on one or more said selected deformations;

(d) wherein said elastic mirror film being capable of stretching and buckling by one or more selected means of imposing said indentation depths using a selected amount of force on said elastic film generating a compressive stress in said elastic film for forming one or more integrally irreversible three-dimensional networks of said selected deformations having a plurality of substantially flat mirror facets, a plurality of substantially straight folded mirror ridges, meeting at a plurality of mirror vertices and distributed spanning a wide range of size scales on said display surface for use in producing virtual imaging effects comprising:

(e) using said deformations on said display surface for transforming one or more three-dimensional real-world scene into one or a plurality of other-worldly virtual images, (f) recording one or more said virtual images of said scene, (g) storing said recording of said virtual images for play back, transmitting said virtual images for recording of said virtual images for selected uses, including using said virtual images, and said recording of said virtual images for forming higher ordered virtual imaging displays, (h) producing special effects using said other-worldly virtual images of real-world scene, (i) combining said virtual images with visual (real-world) reality scene, (j) using said virtual images with real-world scene for experiencing augmented reality, (k) printing said images on paper, fabrics, and on other materials;

(l) wherein said $Y_1$ method steps comprising: said steps (a) with (b), (d), (e), (f), (g), (h), (i), (j), and (k);

(m) wherein said $Y_2$ method steps comprising: said steps (a) with (c), (d), (e), (f), (g), (h), (i), (j), and (k);

(n) wherein said $Y_3$ method steps comprising: said steps (a) with (d), (e), (f), (g), (h), (i), (j) and (k); and wherein said method steps $Y_1$, $Y_2$, $Y_3$ further comprising selected components for inclusion in a kit selected for virtual imaging of real world scenes including video, production, transmission, broadcasting, recording, storing, playback, printing, display and art education uses comprising:

(A) written instructions of method steps for forming said deformations on said mirror film display surface including safety use instructions, (B) one or a plurality of selected extended line indentation impression tool means for forming ordered and disordered line deformations on said mirror film surface(s), and (C) a selected number of mirror films of various selected thicknesses for interchangeably mounting on said mirror film display.

* * * * *